(12) United States Patent
Harrington

(10) Patent No.: US 11,788,346 B2
(45) Date of Patent: *Oct. 17, 2023

(54) SECURABLE PET DOOR

(71) Applicant: Lisa Harrington, Somerville, MA (US)

(72) Inventor: Lisa Harrington, Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,425

(22) Filed: Dec. 2, 2022

(65) Prior Publication Data

US 2023/0099432 A1 Mar. 30, 2023

Related U.S. Application Data

(63) Continuation-in-part of application No. 17/947,608, filed on Sep. 19, 2022, which is a continuation of
(Continued)

(51) Int. Cl.
| | |
|---|---|
| *E06B 7/00* | (2006.01) |
| *E06B 7/32* | (2006.01) |
| *A01K 29/00* | (2006.01) |
| *E05F 15/00* | (2015.01) |
| *E05C 3/04* | (2006.01) |
| *E05C 3/00* | (2006.01) |
| *E05C 17/56* | (2006.01) |
| *E05D 7/12* | (2006.01) |

(52) U.S. Cl.
CPC ............... *E06B 7/32* (2013.01); *A01K 29/00* (2013.01); *E05C 3/004* (2013.01); *E05C 3/041* (2013.01); *E05C 17/56* (2013.01); *E05D 7/12* (2013.01); *E05F 15/00* (2013.01); *E05Y 2201/46* (2013.01); *E05Y 2800/71* (2013.01); *E05Y 2900/132* (2013.01)

(58) Field of Classification Search
CPC .......... E06B 7/32; E06B 1/52; E05B 47/0038; E05F 15/73; E05F 15/00; E05D 7/1044; E05D 11/1028; E05D 7/12; E05Y 2400/856; E05Y 2900/132; E05Y 2201/46; E05Y 2800/71; A01K 29/00; E05C 3/004; E05C 3/041; E05C 17/56
See application file for complete search history.

(56) References Cited

U.S. PATENT DOCUMENTS

| | | |
|---|---|---|
| 2,758,646 A | 8/1956 | Johnson |
| 3,120,032 A | 2/1964 | Burnette |
| (Continued) | | |

FOREIGN PATENT DOCUMENTS

CN 113006669 A 6/2021

*Primary Examiner* — Chi Q Nguyen
(74) *Attorney, Agent, or Firm* — Camille A. Wilson; Wilson Dutra, PLLC

(57) ABSTRACT

A securable pet door is disclosed. The securable pet door may comprise at least one door, at least one knob, one or more windows, at least one frame, and/or at least one hinge. The knob comprises a latch for secure closing. When the pet door comprises at least one hinge, the hinge(s) may be inserted into at least one hinge recess so that the door may be securely locked via at least one locking mechanism. The different elements of the securable pet door are configured to be oriented in a predetermined, securable, or customizable manner. The door is configured to open from, slide into, revolve within, or move in some other non-limiting equivalent way from or relative to a frame.

20 Claims, 39 Drawing Sheets

Related U.S. Application Data application No. 17/836,942, filed on Jun. 9, 2022, now abandoned, which is a continuation-in-part of application No. 17/486,068, filed on Sep. 27, 2021, now Pat. No. 11,384,595.

(56) References Cited

U.S. PATENT DOCUMENTS

| | | | |
|---|---|---|---|
| 3,184,803 A | 5/1965 | Peel | |
| 4,430,836 A | 2/1984 | McKann | |
| 4,760,872 A | 8/1988 | Hale, Jr. | |
| 4,776,133 A | 10/1988 | Green | |
| 5,269,097 A | 12/1993 | Davlantes | |
| 5,406,748 A | 4/1995 | Davlantes | |
| 5,735,079 A | 4/1998 | Davlantes | |
| 6,385,909 B1 | 5/2002 | Marsh | |
| 6,681,524 B1* | 1/2004 | Tillson | E06B 7/32 160/180 |
| 7,913,454 B2* | 3/2011 | Sullivan | E06B 7/32 160/180 |
| 8,074,606 B1 | 12/2011 | Schrey | |
| 8,316,803 B2* | 11/2012 | Turner | E06B 7/32 D30/119 |
| 8,434,264 B2* | 5/2013 | Bosserdet, Jr. | E06B 7/32 49/168 |
| 8,567,137 B2 | 10/2013 | Sullivan | |
| 8,826,594 B2 | 9/2014 | Graves | |
| 9,145,731 B1* | 9/2015 | McCoy | A01K 1/035 |
| 9,874,055 B1* | 1/2018 | Flannery | E06B 11/02 |
| 10,920,484 B2* | 2/2021 | Miller | E05F 15/611 |
| 11,384,595 B1* | 7/2022 | Harrington | E06B 1/526 |
| 2006/0053693 A1* | 3/2006 | Sullivan | E06B 7/32 49/168 |
| 2008/0184940 A1 | 8/2008 | Bosserdet | |
| 2011/0219695 A1 | 9/2011 | Ivasiv | |
| 2012/0167511 A1* | 7/2012 | Laudenklos | E06B 7/32 52/386 |
| 2014/0190081 A1* | 7/2014 | Wanjohi | A47G 29/126 49/504 |
| 2016/0186485 A1* | 6/2016 | Taylor | E05F 15/611 49/31 |
| 2019/0098874 A1 | 4/2019 | Burton | |
| 2019/0203527 A1 | 7/2019 | Stricklin | |
| 2020/0131842 A1 | 4/2020 | Thomas | |
| 2021/0123287 A1* | 4/2021 | Miller | A01K 29/00 |
| 2021/0144956 A1 | 5/2021 | Bohannon | |

* cited by examiner

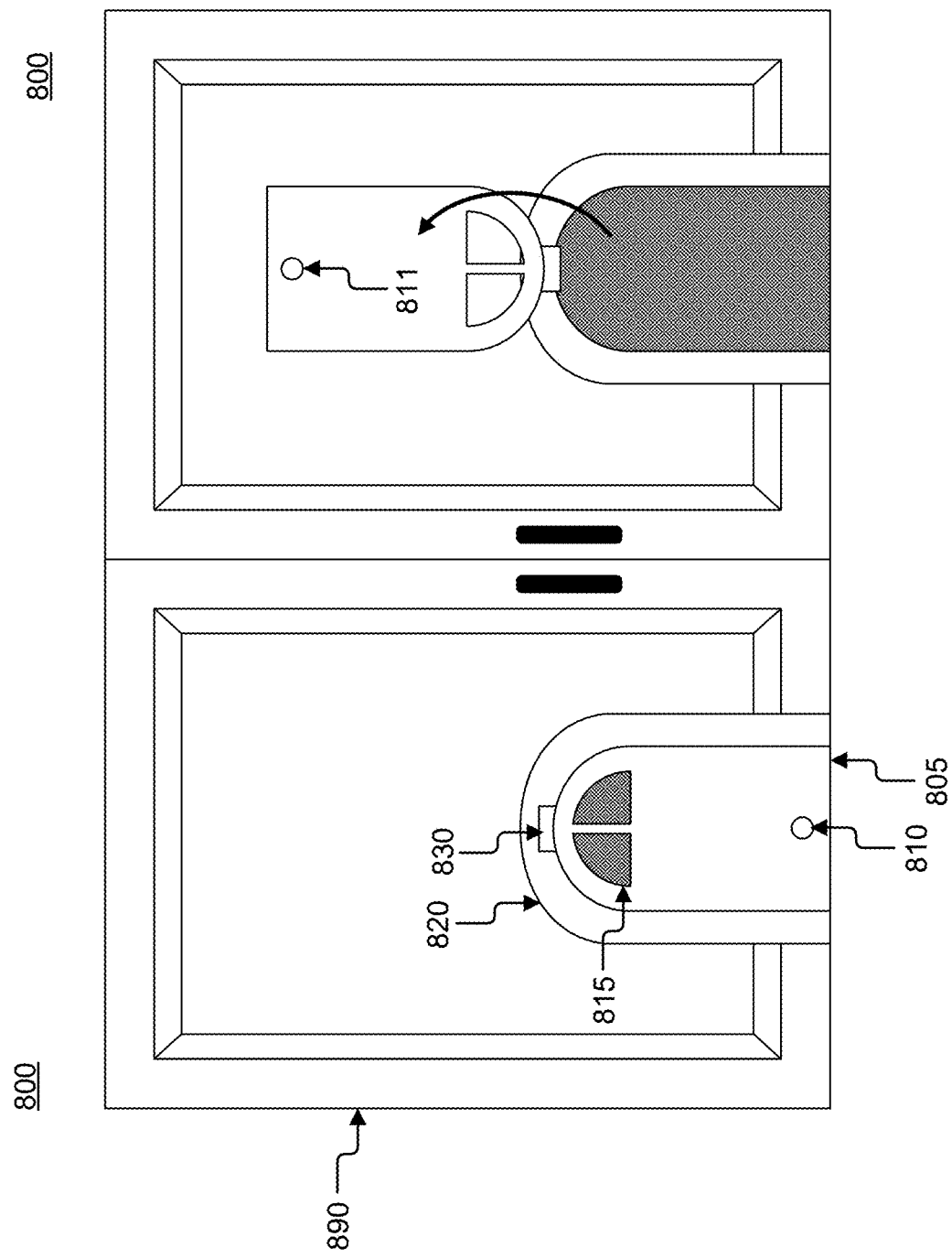

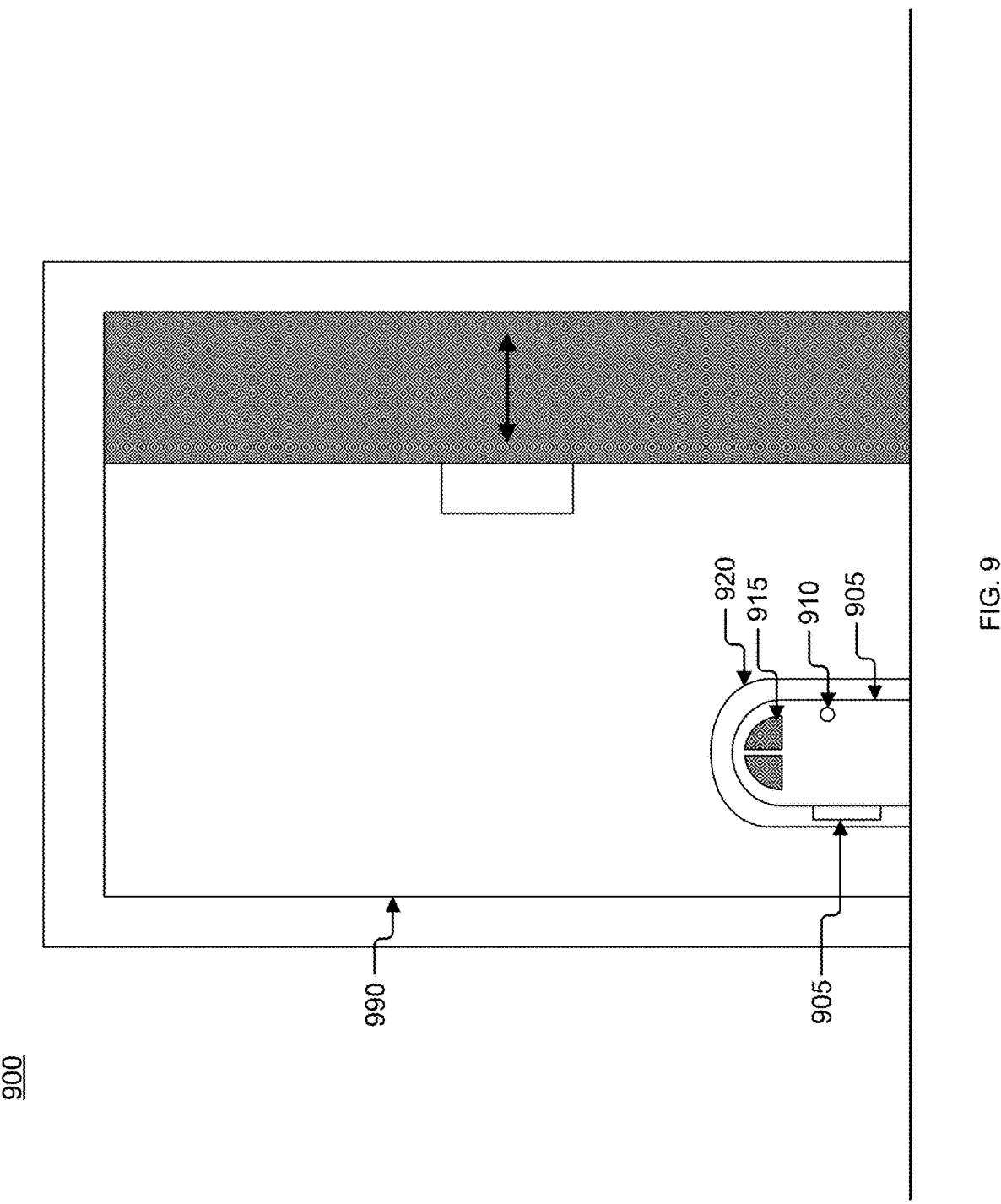

1100

1100

1300

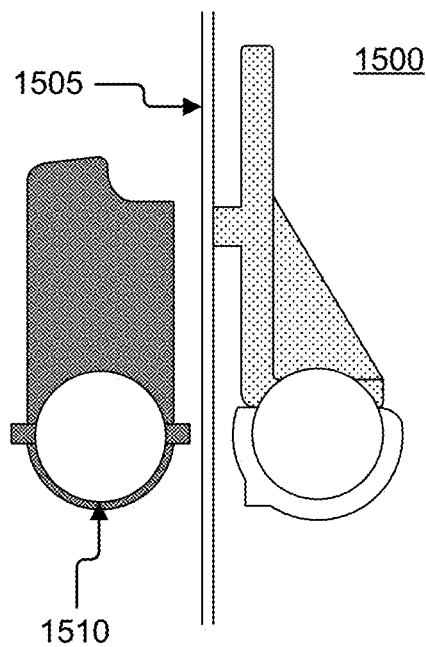
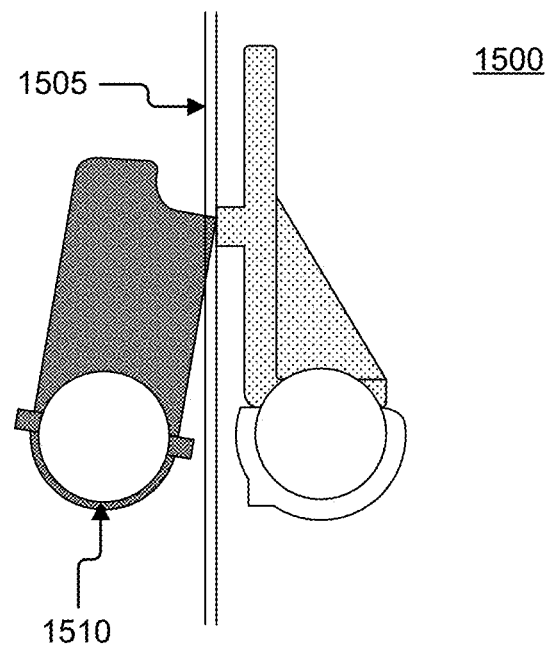
FIG. 15A  FIG. 15B
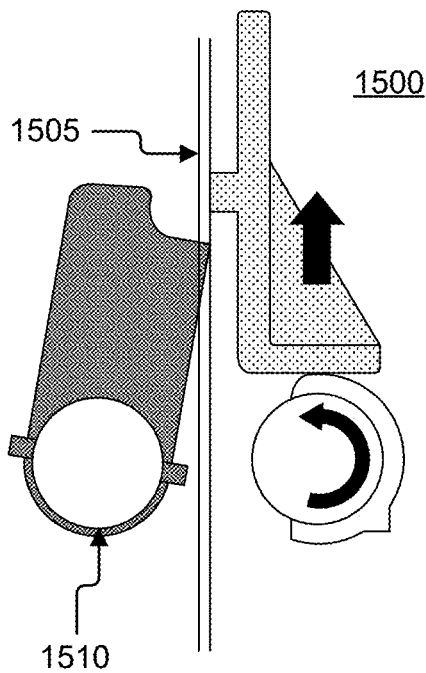
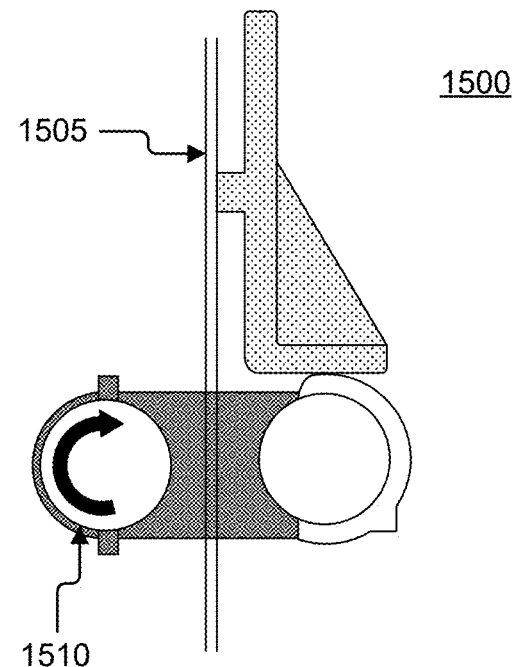
FIG. 15C  FIG. 15D

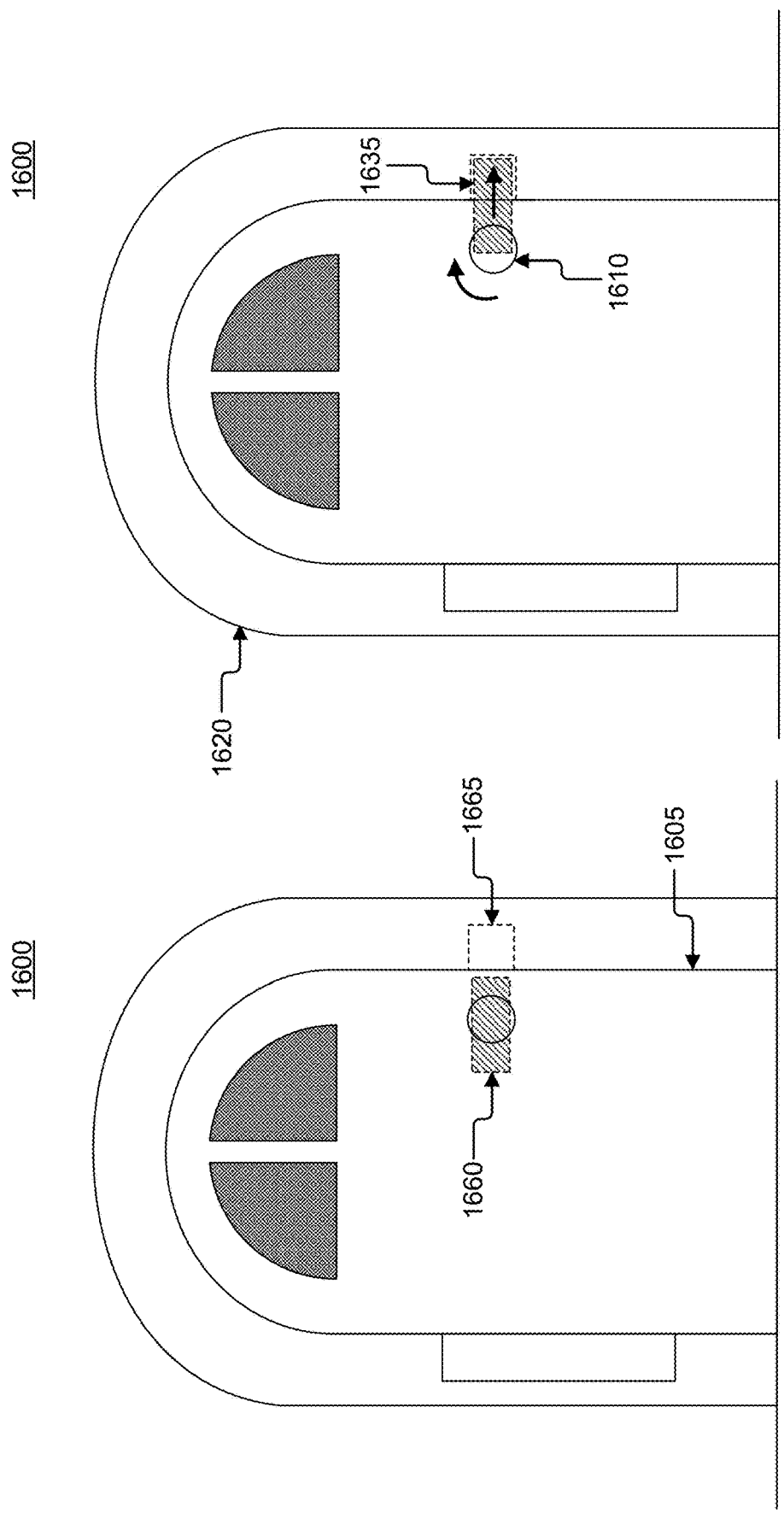

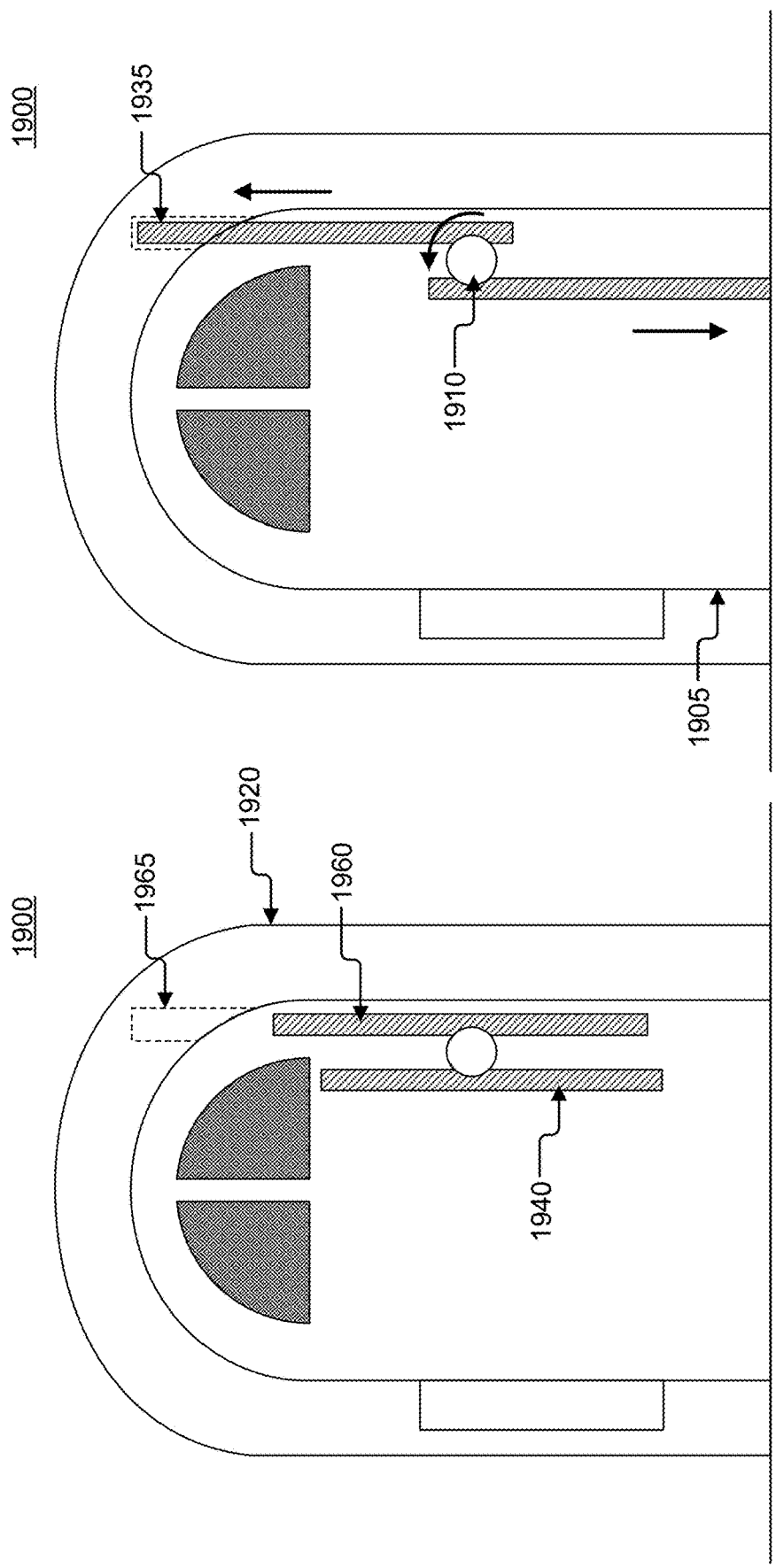

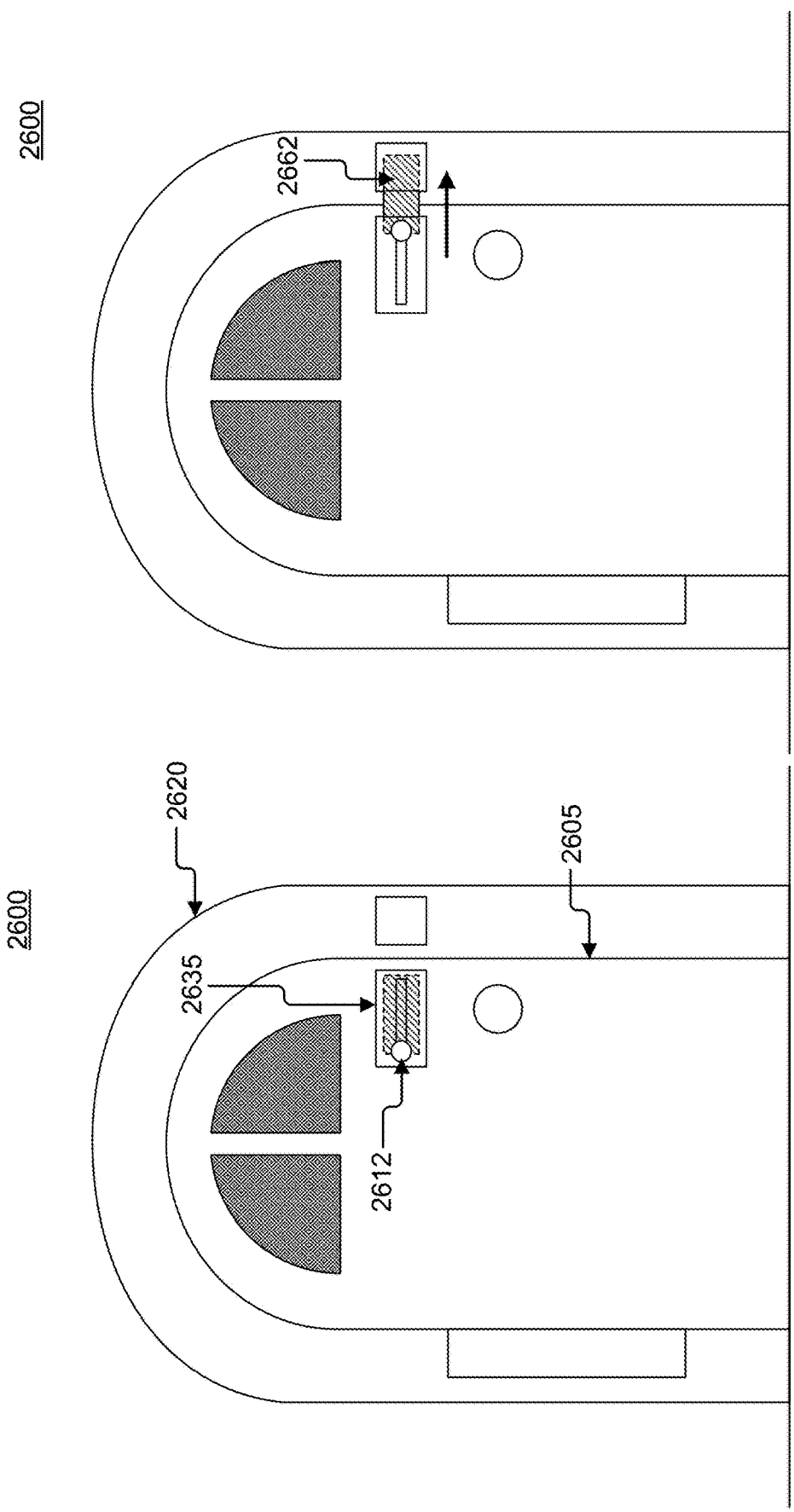

SECURABLE PET DOOR

CROSS-REFERENCE TO RELATED APPLICATION

This application is a continuation in part of and claims priority to U.S. Non-provisional patent application Ser. No. 17/947,608 (filed Sep. 19, 2022, and titled "SECURABLE PET DOOR"), which claimed priority to U.S. Non-provisional patent application Ser. No. 17/836,942 (filed Jun. 9, 2022, and titled "SECURABLE PET DOOR"), which claimed priority to now patented U.S. Non-provisional patent application Ser. No. 17/486,068 (filed Sep. 27, 2021, and titled "SECURABLE PET DOOR"), the entire contents of which are incorporated herein by reference.

BACKGROUND

Doors are pathways to new places and spaces. Passing through a door may also allow a homeowner to get from one room of the house to another, or a professional to pass between rooms in an office. Passing through a door allows a traveler to leave a known area and venture into an unknown one. Equally as important, doors can be locked, offering security to the spaces they help define. An open door often implies a welcoming environment, while a closed door implies a desired environment of privacy or even secrecy.

Doors come in a variety of shapes and sizes, to accommodate different kinds of travelers. Some are plain, some are decorated with ornate detail. A common festivity around the world is to seasonally decorate doors to celebrate sports teams, holidays, and other miscellaneous celebrations. Many doors can be replaced when after they accumulate significant wear and tear. Some doors have windows, are completely transparent, or can be incrementally opened, such as a Dutch door. Many doors open and close manually, but other doors may do these actions automatically, with the help of an activation button or motion sensor. However, these features are often lacking, if not completely absent, from the market for pet doors.

Pet doors are often used internally and externally to help pet owners control how their pets navigate within and into or out of their homes. Pet doors may connect the inside of a home to the external elements, or may simply connect one room of a home to another. Due to their nature, pet doors are often hard to control once installed. The true users of pet doors are animals, who are unaware of proper door etiquette such as ensuring an exterior door is completely closed, so as to prevent a way of entry for bad actors or the elements.

Typically, once they are installed, pet doors are hard to maintain, secure, and customize. Most pet doors available in the market today add to the amount of dirt being tracked into the home, do not completely close, and cannot be completely secured. As a result, pet owners who utilize pet doors often clean the area surrounding the installation area more, relying on third party equipment to close and secure the door when not in use, and needing to remember to subsequently remove any securing devices when the door is actually be used by a pet. Interior pet doors are often used to control a pet's access to certain areas inside the house. Furthermore, since most pet doors are manually operated, should a pet door get stuck or break, the pet may be either deterred from further use or be injured in the process.

SUMMARY OF THE DISCLOSURE

What is needed is an installable, customizable, and securable pet door. The pet door may resemble a standard human door, with a knob, hinge, and windows, as non-limiting examples. In some embodiments, the knob may comprise a latch for secure closing. When the pet door comprises a hinge, the hinge may be inserted into a hinge recess so that the door may be securely locked in an open position. Additionally, various types of locking mechanisms or systems can be overcome see to safely secure the pet door. In some implementations, the pet door may include a sliding mechanism to insert itself into a frame. In some implementations, the orientation of the knob to the door, the door to the frame, the hinge to the door and the frame, and the plurality of windows to the door may be predetermined or customizable. Having the ability to choose how these elements fit together, and even the option to change them later, allows the pet owner to truly customize the pet door system for their needs.

In some implementations, the door may be open from, slide into, open up and out of, revolve within, or move in some other non-limiting equivalent way from or relative to the frame. The knob or door, or both, may be interchangeable within the pet door system. For example, the door may be replaced with a seasonal door during the relevant holiday or season. This would allow the pet owner to include the pet door system in the overall design and feel of their home, as opposed to being stuck with a pet door that may amount to no more than an eye sore.

In some aspects, the frame may comprise a sensor. When the frame comprises a sensor, the sensor may interface with an external device, such as a doormat, to open and close the door automatically as a result of a change in motion, temperature, or other non-limiting sensible feature or method. The sensor may work in tandem with or separately from, or some combination thereof, with the external device to detect a pet's presence and open or close the door, accordingly. This would enable the pet door system to be semi-automatic and responsive to the actions and presence of a pet, not just a pet owner. Pets would be able to operate this door themselves, without the aforementioned cleanliness and security repercussions. For example, the pet door may securely lock once the sensor no longer detects a pet trying to pass through.

The present disclosure relates to a pet door that may include a first frame, where the first frame may be configured to partially embed within a first external surface; a hinge, where the hinge may be configured to pivot along a pivot axis defined by the first frame; a door, where at least one edge connects to the hinge; a knob, where the knob may be attached to a surface of the door. In some embodiments, the pet door includes a latch, where the latch extends from a rotational axis of the knob and interfaces with the first frame; a first connector frame extending from the first frame, where the first connector frame may be configured to be fully embedded within the first external surface; a second frame, where the second frame may be configured to partially embed within a second external surface, where when the first frame and the second frame are embedded, a portal from the first external surface to the second external surface may be created; and a second connector frame extending from the second frame, where the second connector frame may be connectable on a distal end to the first connector frame, and where when connected, the second connector frame may be configured to be fully embedded within the second external surface.

In some implementations, the pet door where the first frame may comprise a hinge recess that secures the hinge in a plurality of predetermined positions. In some aspects, the door may be secured in a fixed position by a door stopper.

In some embodiments, the door stopper may be attached to the first external surface and interfaces with a door edge. In some implementations, the door stopper may be attached to the first external surface and interfaces with the knob.

In some aspects, the door stopper may be part of the first frame and interfaces with a door edge. In some embodiments, the door stopper may be part of the door and interfaces with a recess in the first frame. In some implementations, the frame may comprise a latch receiver configured to receive a latch extending from the door. In some aspects, the latch receiver may be internal to the first frame. In some embodiments, the latch receiver may be external and attached to the first frame. In some implementations, the door extends into a region between the first external surface and the second external surface. In some aspects, the first frame or second frame, or both, may comprise a sensor. In some embodiments, the sensor interacts with an external device. In some implementations, the first external surface may comprise a panel insertable proximate to a sliding glass door.

The present disclosure relates to a pet door that may include a first recessed frame, where the first recessed frame may be configured to recess into a first external surface; a first hinge, where the hinge pivots along a pivot ax may be defined by a first side of the first recessed frame; a first door, where at least one edge connects to the first hinge; a first knob, where the first knob may be attached to a surface of the first door. In some aspects, the pet door includes a second hinge, where the hinge pivots along a pivot ax may be defined by a second side of the first recessed frame; a second door, where at least one edge connects to the first hinge.

In some embodiments, the pet door includes a second knob, where the second knob may be attached to a surface of the second door; a first connector frame, where the first connector frame may be attached to the first recessed frame; a second connector frame, where the second connector frame may be configured to connect to the first connector frame; and a second recessed frame configured to recess into a second external surface, where the second frame extends distally from the second connector frame and where when the first frame and the second frame are recessed, a portal from the first external surface to the second external surface may be created.

In some implementations, the pet door may comprise at least one locking mechanism. In some aspects, the locking mechanism may comprise at least one of: a latching mechanism (such as, by way of example and not limitation, one or more latches), a securing member, a manipulation element, a positioning mechanism, and a latch receiver. In some implementations, the latching mechanism may be located on the first knob and a positioning mechanism located proximate to the second knob, where the positioning mechanism may be configured to limit a position of the latching mechanism, and where the latching mechanism may be configured to fit over the second knob when in a locked position.

In some embodiments, the first door and the second door extend into a region between the first external surface and the second external surface. In some implementations, the first frame or the second frame, or both, may comprise magnets for retaining one or both the first door and the second door in a fixed position. In some aspects, the external device controls a position of one or both the first door and the second door.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 8A illustrates an exemplary pet door, according to some embodiments of the present disclosure.

FIG. 8B illustrates an exemplary pet door, according to some embodiments of the present disclosure.

FIG. 9 illustrates an exemplary pet door, according to some embodiments of the present disclosure.

FIG. 15A illustrates an exemplary locking mechanism in an unlocked position, according to some embodiments of the present disclosure.

FIG. 15B illustrates an exemplary locking mechanism in an unlocked position, according to some embodiments of the present disclosure.

FIG. 15C illustrates an exemplary locking mechanism in a locking position, according to some embodiments of the present disclosure.

FIG. 15D illustrates an exemplary locking mechanism in a locked position, according to some embodiments of the present disclosure.

FIG. 16A illustrates a front view of an exemplary pet door comprising a locking mechanism, according to some embodiments of the present disclosure.

FIG. 16B illustrates a front view of an exemplary pet door comprising a locking mechanism, according to some embodiments of the present disclosure.

FIG. 19A illustrates a front view of an exemplary pet door comprising a locking mechanism, according to some embodiments of the present disclosure.

FIG. 19B illustrates a front view of an exemplary pet door comprising a locking mechanism, according to some embodiments of the present disclosure.

FIG. 26A illustrates a front view of an exemplary pet door comprising a locking mechanism, according to some embodiments of the present disclosure.

FIG. 26B illustrates a front view of an exemplary pet door comprising a locking mechanism, according to some embodiments of the present disclosure.

DETAILED DESCRIPTION

The present disclosure provides generally for an installable, customizable, and securable pet door. According to the present disclosure, the pet door may comprise a door, a knob, a plurality of windows, a frame, and a hinge.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Knob: as used herein, refers to any kind of appendage that can be fixed on a door and turned, pulled, pushed, or moved in another non-limiting way to open and close the door.

The knob may comprise a generic doorknob or any kind of handle, point, grip, sliding mechanism, or other non-limiting equivalent.

The present disclosure describes an installable, customizable, and securable pet door. In some embodiments, the pet door may comprise a door, a knob, a plurality of windows, a frame, a hinge, a latch, a sensor, and other non-limiting features that may allow the pet door system to operate semi-automatically, securely open and close, and be better suited for safe use by a pet.

Figure 1:
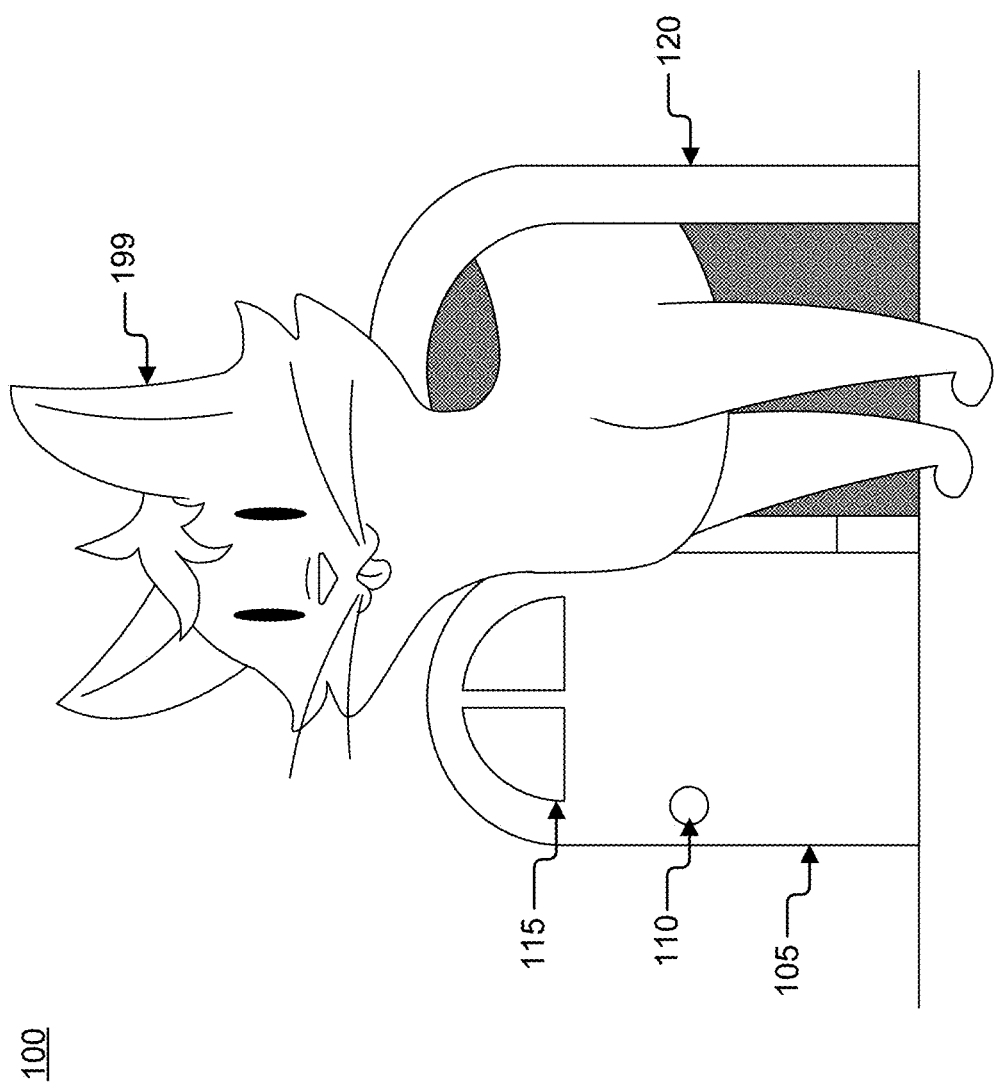
FIG. 1 illustrates a pet traveling through an exemplary pet door, according to some embodiments of the present disclosure.

Referring now to FIG. 1, an exemplary pet door 100 is illustrated. In some embodiments, the pet door 100 may comprise a door 105, a knob 110, a window 115, and a frame 120. In some implementations, the pet door 100 may be used to travel between two spaces separated by a barrier, such as a wall or door, by a pet 199. In some aspects, the pet 199 may be a large or small feline, canine, or other non-limiting examples.

In some embodiments, the door 105 may comprise plastic, vinyl, wooden, carpet, metallic, textured, hook-and-loop, or other non-limiting equivalent material. In some implementations, the door 105 may be customizable to match or complement the exterior or interior design of the pet 199 owner's home or room. For example, the door 105 may comprise a material that allows seasonal decorations to be added or removed from the door 105. In some aspects, the door 105 may also be interchangeable, so the pet 199 owner has more than one option to choose from to match or complement the surrounding décor. This ability to alter the pet door 100 allows the pet 199 owner to fully incorporate the pet door 100 into their home.

In some implementations, the knob 110 may resemble a generic doorknob, handle, bar, grip, fixture, or other non-limiting examples. The knob 110 may enable the pet 199 owner to securely close the pet door 100 when not in use. In some embodiments, the knob may enable the pet 199 owner to open the pet door 100 with ease, as opposed to having to apply pressure to the pet door 100 itself, which may damage the pet door 100 if too much force is applied.

For example, the knob 110 may turn, push in and out, slide, or be static. In some embodiments, the knob 110 may comprise the same or a different material than the door 105. In some aspects, the knob 110 may be interchangeable or removed entirely, depending on the pet 199 owner's preference.

In some embodiments, the window 115 may comprise a pane of glass, pane of plastic, pane of vinyl, some other non-limiting equivalent, or simply be an opening in the door 105. For example, the window 115 may comprise one pane or a plurality of panes. In some aspects, the window 115 may allow the pet 199 owner to see through the pet door 100 if it is securely closed. For example, the pet 199 may want to reenter the home through an exterior pet door 100. The window 115 would enable the pet 199 owner to keep the exterior pet door 100 closed while the pet 199 is not traveling through the door 105 and see the pet 199 waiting outside of the closed door 105. In some embodiments, the window 115 may provide a barrier from external particles, dust, dirt, and other non-limiting examples from entering the interior of the passageway.

The barrier may prevent tracking in dirt that is common with other pet doors.

In some implementations, the door 105 may comprise more than one window 115. For example, there may be a plurality of windows 115 at the top, near the bottom, along a side, or variably placed throughout the door 105, as non-limiting examples. In some aspects, the window 115 may comprise a material that is translucent, frosted, textured, or some other non-limiting equivalent.

In some embodiments, the frame 120 may comprise the same or a different material than the door 105, the knob 110, the window 115, or some combination thereof. In some implementations, the frame 120 may align with the shape of the door 105. In other aspects, the frame 120 may comprise a different shape than the door 105. In some aspects, the frame 120 may insert into an exterior or interior wall or door so the pet door 100 may be used by a pet 199.

In some embodiments, the frame 120 may comprise an appendage or nodule that allows the door 105 to be secured in place, whether in a closed, completely open, or partially open position, to either the frame 120 or the wall the pet door 100 is inserted into. In other implementations, the frame 120 may comprise an extrusion that may prevent the door 105 from swinging in multiple directions within the frame 120.

For example, for an exterior pet door 100, the door 105 may be limited to only swinging inside as opposed to outside by and within the frame 120. In some embodiments, this limit in the range of the door 105 may assist in aligning the latch of the door 105 to the corresponding slot in the frame. This may be a critical assistance when the latch and corresponding slot are sufficiently small to impede normal manual alignment. In some aspects, the frame 120 may allow the door 105 to open and close in multiple directions.

Figure 2:
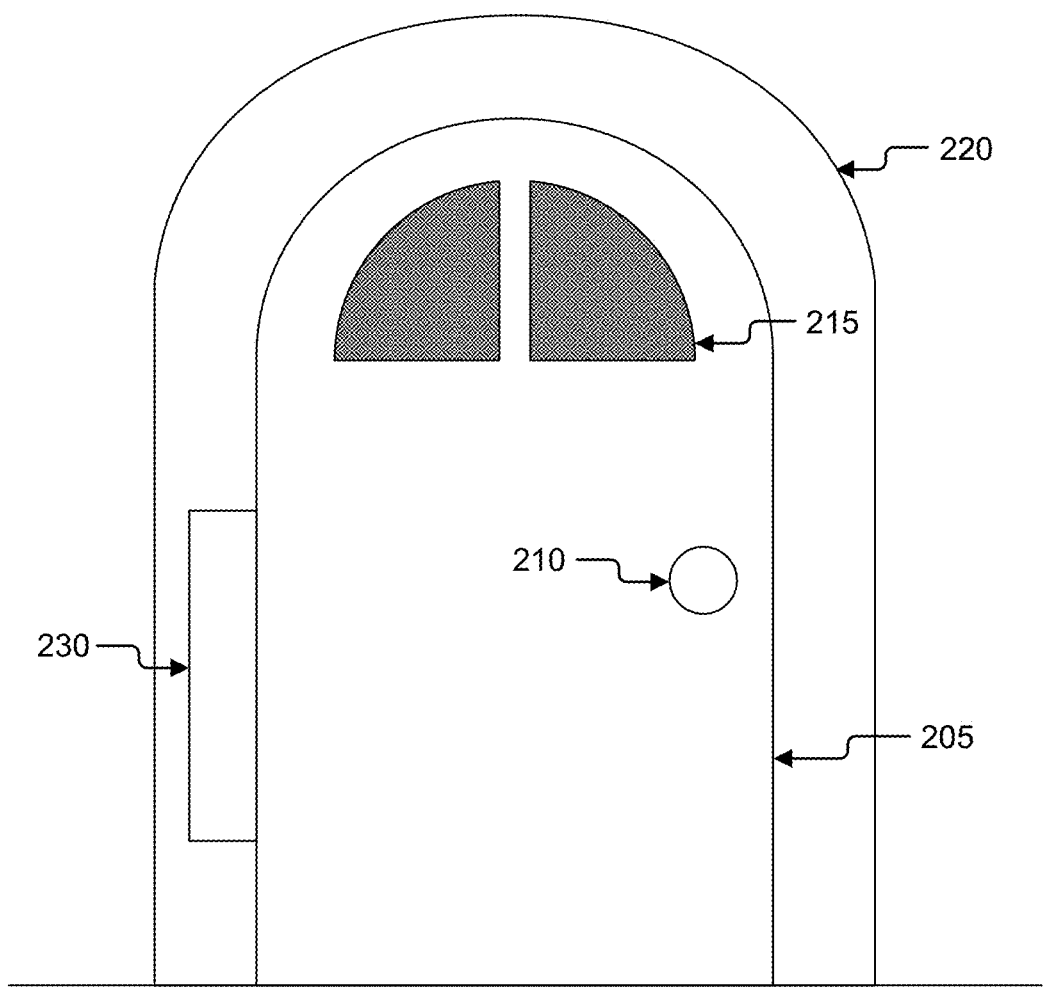
FIG. 2 illustrates a front view of an exemplary pet door, according to some embodiments of the present disclosure.

Referring now to FIG. 2, a front view of an exemplary pet door is illustrated. In some embodiments, the pet door 200 may comprise a door 205 and a knob 210. In some implementations, the pet door 200 may comprise a plurality of windows 215, a frame 220, and a hinge 230. In some aspects, the hinge 230 may couple to the door 205 and the frame 220, so the door 205 may open and close.

In some embodiments, the hinge may comprise a strap hinge, butt hinge, spring-loaded hinge, concealed hinge, piano hinge, offset hinge, overlay hinge, hidden barrel hinge, scissor hinge, gate hinge, or other non-limiting equivalents. In some implementations, the hinge 230 may be removable, so a pet owner may customize the orientation and opening of the door 205. This may allow the pet owner to reuse the pet door 200 in a plurality of locations.

For example, if the pet owner purchased the pet door 200 while living in one house and then moved to another, the pet owner may need to adjust the orientation of the components of the pet door 200 in order to better suit the new space. In some aspects, the hinge 230 may be exposed or concealed by either the door 205 or frame 220, or both. The hinge 230 may allow the door 205 to be secured in a closed, completely open, or partially opened position, depending on the needs of the pet and the pet owner.

Figure 3:
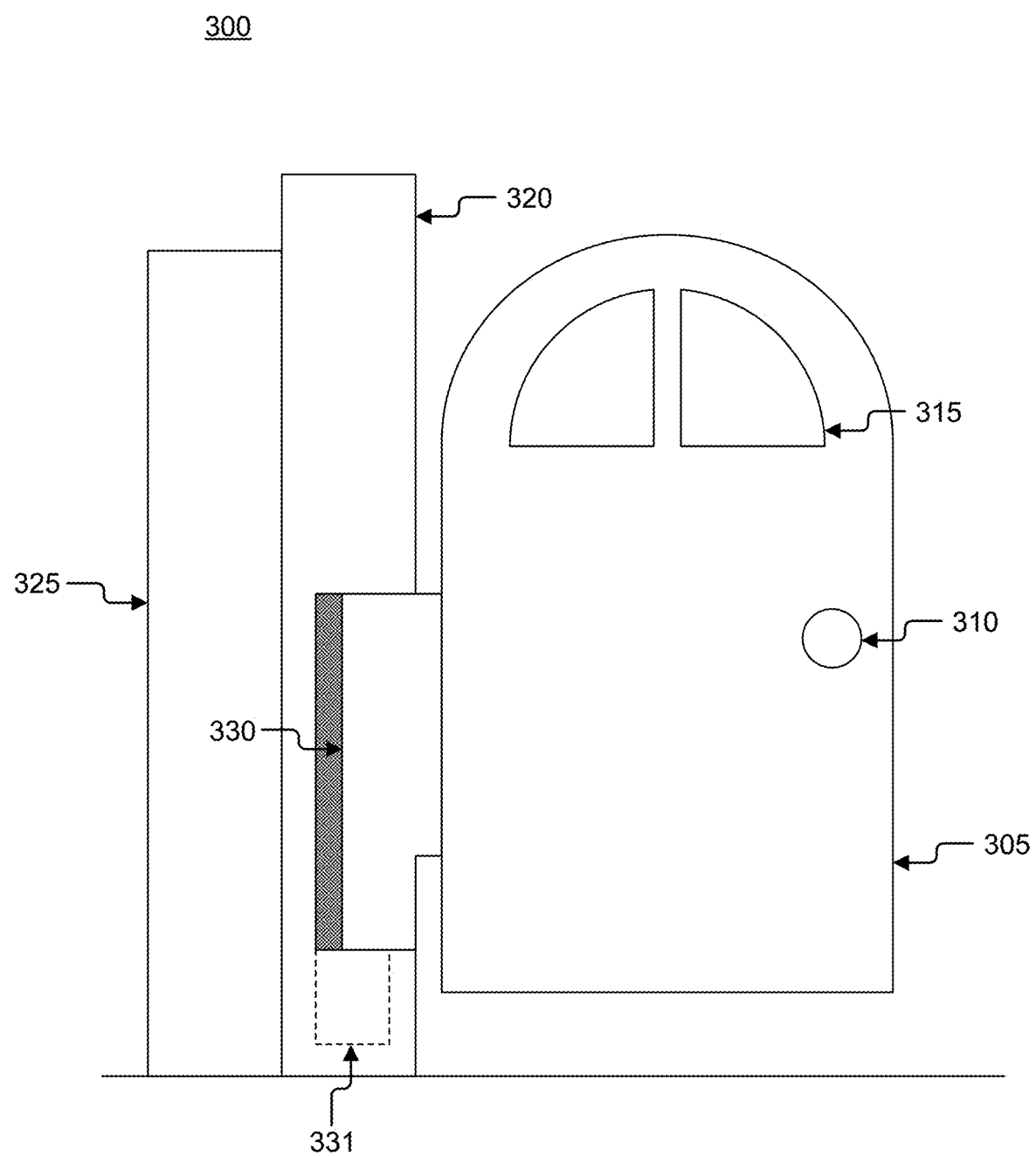
FIG. 3 illustrates a side view of an exemplary pet door, according to some embodiments of the present disclosure.

Referring now to FIG. 3, a side view of an exemplary pet door is illustrated. In some aspects, the pet door 300 may comprise a door 305. In some embodiments, the pet door 300 may comprise a knob 310. In other implementations, the pet door 300 may comprise a plurality of windows 315. In some embodiments, the pet door 300 may comprise a frame 320, a recessed frame 325 coupled to the frame 320, and a hinge 330. In some implementations, the frame 320 may comprise a hinge recess 331. The hinge 330 may insert into the hinge recess 331 to secure the door 305 in an open position. In some implementations, the hinge recess 331 may be housed within the frame 320.

For example, a pet owner may wish to keep the door 305 securely ajar. In some aspects, the door 305 may begin in a closed position, aligned with the frame 320. When opened, the door 305 may be pushed toward the frame 320, prompting the hinge 330 to align with and insert into the hinge recess 331.

In this example, to open and close the door and not keep it in a particular fixed position, the pet owner may have to perform an additional securing motion to prevent the door 305 from accidentally clicking into a fixed position. This additional securing motion may involve lifting the door 305 up so that the hinge 330 uncouples from or misaligns with the hinge recess 331. In some embodiments, the hinge recess 331 may be accessed at only one or a plurality of open positions. In some aspects, the hinge 330 and hinge recess 331 may be oriented vertically, as shown, or horizontally.

In some embodiments, the recessed frame 325 is coupled to the frame 320, providing stability when inserted into an exterior or interior wall or door for use. The recessed frame 325 may be the same or different size or shape from the frame 320 or door 305. In some implementations, the recessed frame 325 comprises the same or a different material from the frame 320 or the door 305. The recessed frame 325 may prevent tails or pet hair from being caught in the hollow cavity that may otherwise be exposed between the outer panels of a wall or door, allowing for safe, pain-free passage of the pet through the pet door 300. The recessed frame 325 may also allow for a snugger fit when the pet door 300 is installed.

Figure 4B:
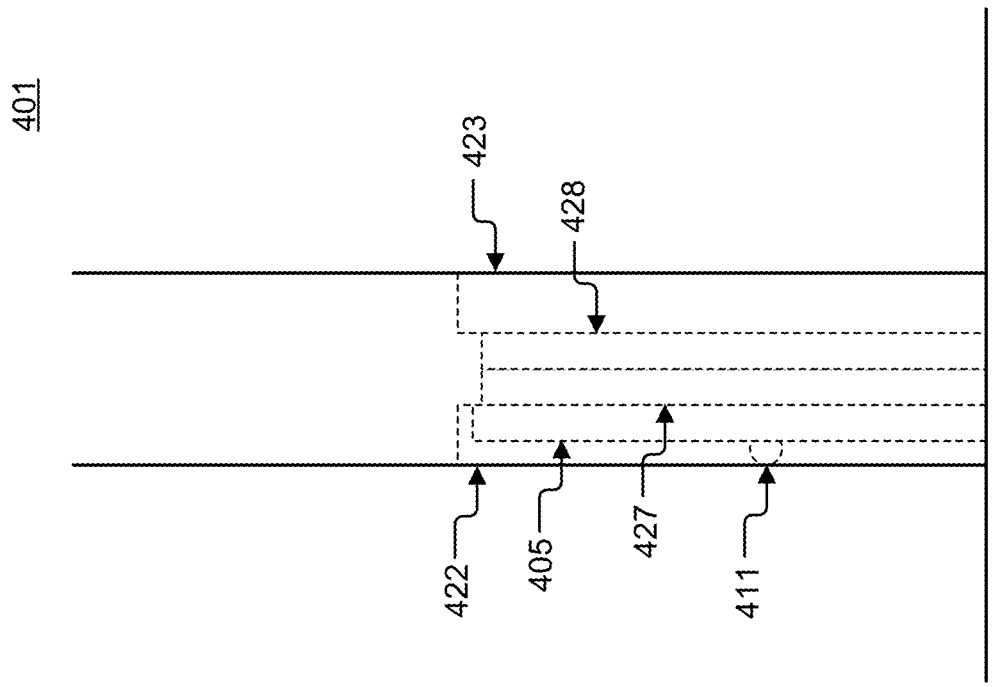
FIG. 4B illustrates a side view of an installed exemplary pet door, according to some embodiments of the present disclosure.
Figure 4A:
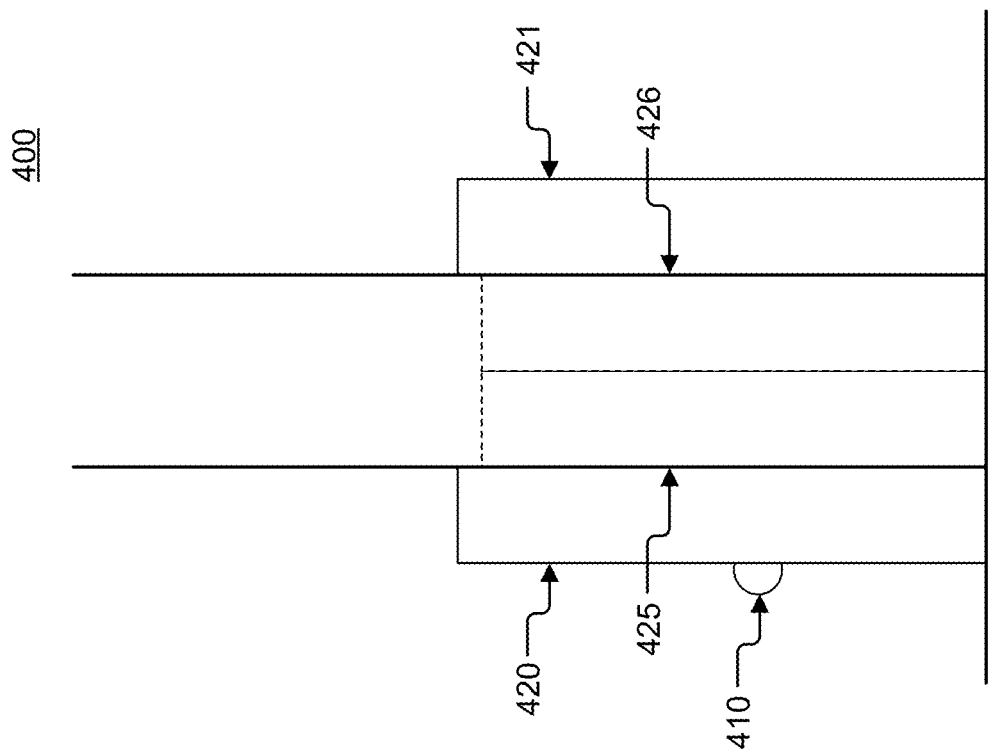
FIG. 4A illustrates a side view of an installed exemplary pet door, according to some embodiments of the present disclosure.
Figure 5A:
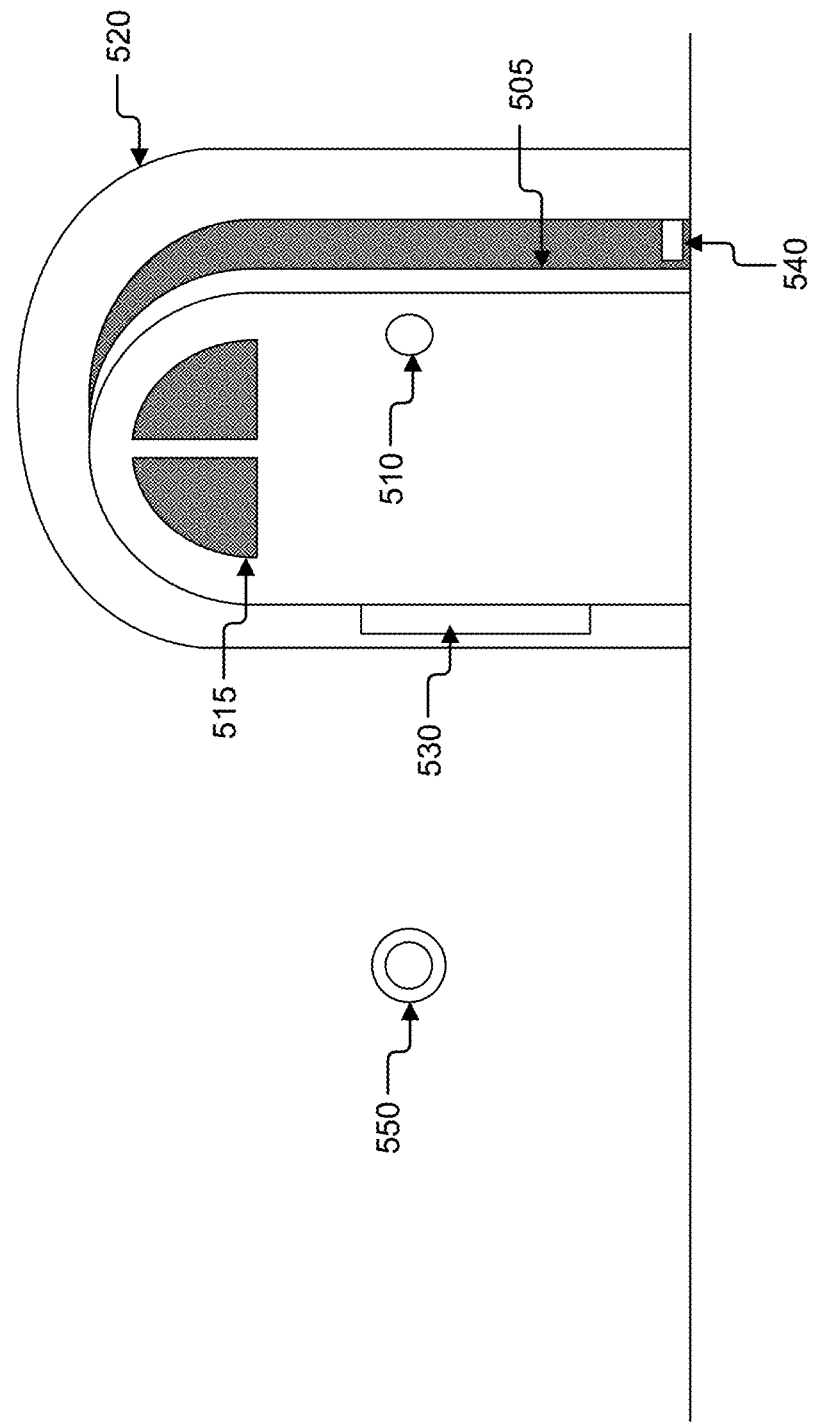
FIG. 5A illustrates an exemplary pet door with an external door stopper, according to some embodiments of the present disclosure.
Figure 5B:
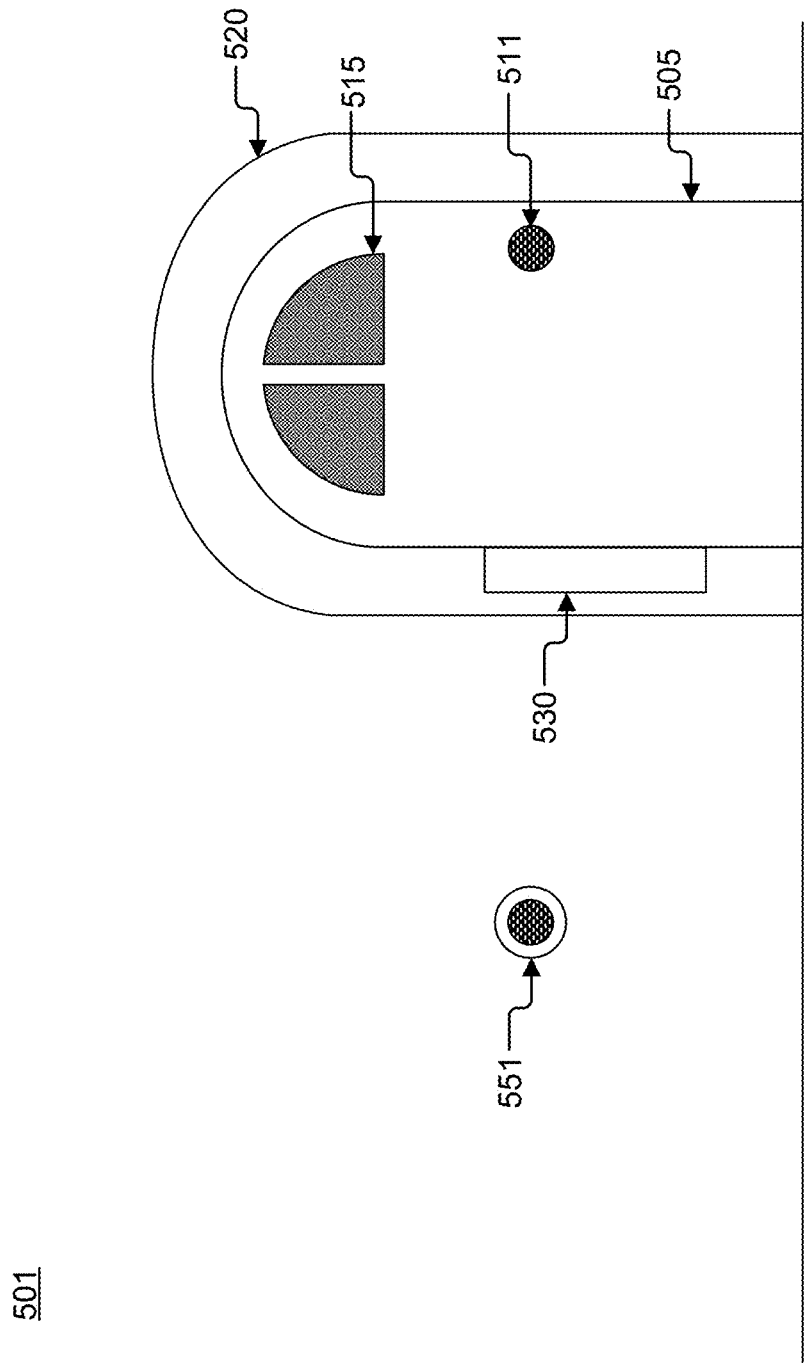
FIG. 5B illustrates an exemplary pet door with an external door stopper, according to some embodiments of the present disclosure.
Figure 5C:
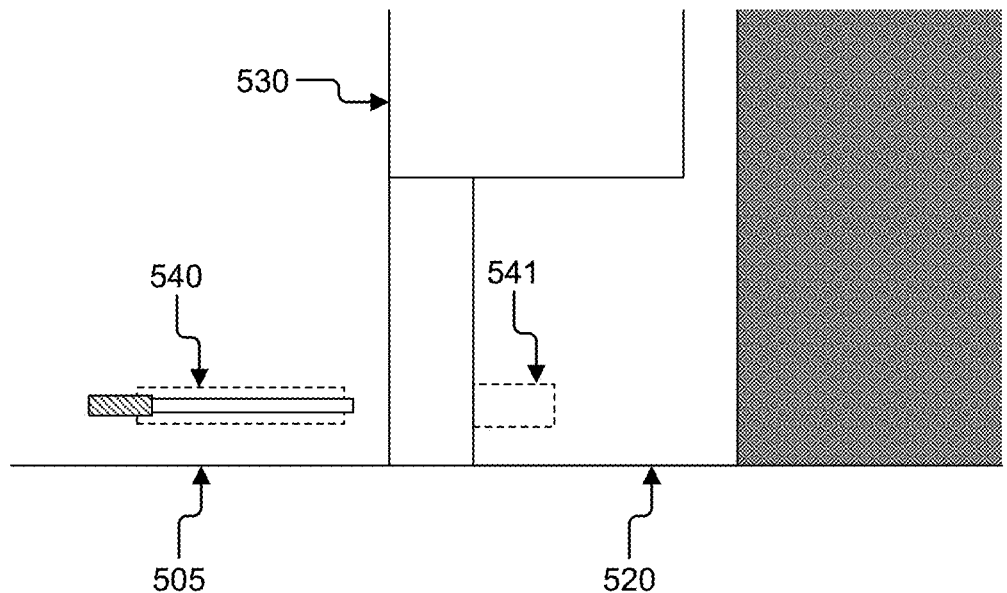
FIG. 5C illustrates an exemplary pet door with an external door stopper, according to some embodiments of the present disclosure.
Figure 5D:
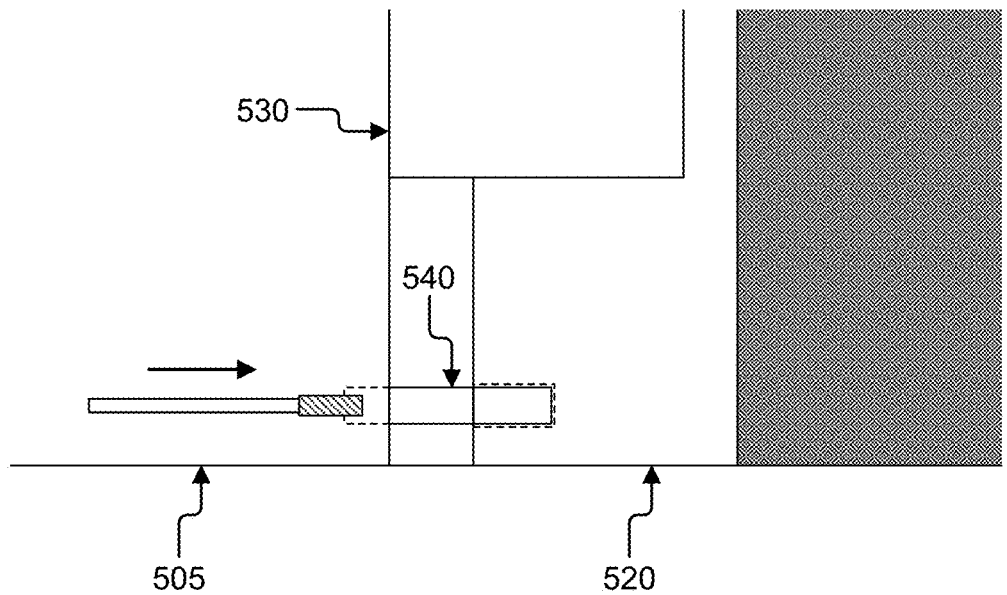
FIG. 5D illustrates an exemplary pet door with an external door stopper, according to some embodiments of the present disclosure.
Figure 5E:
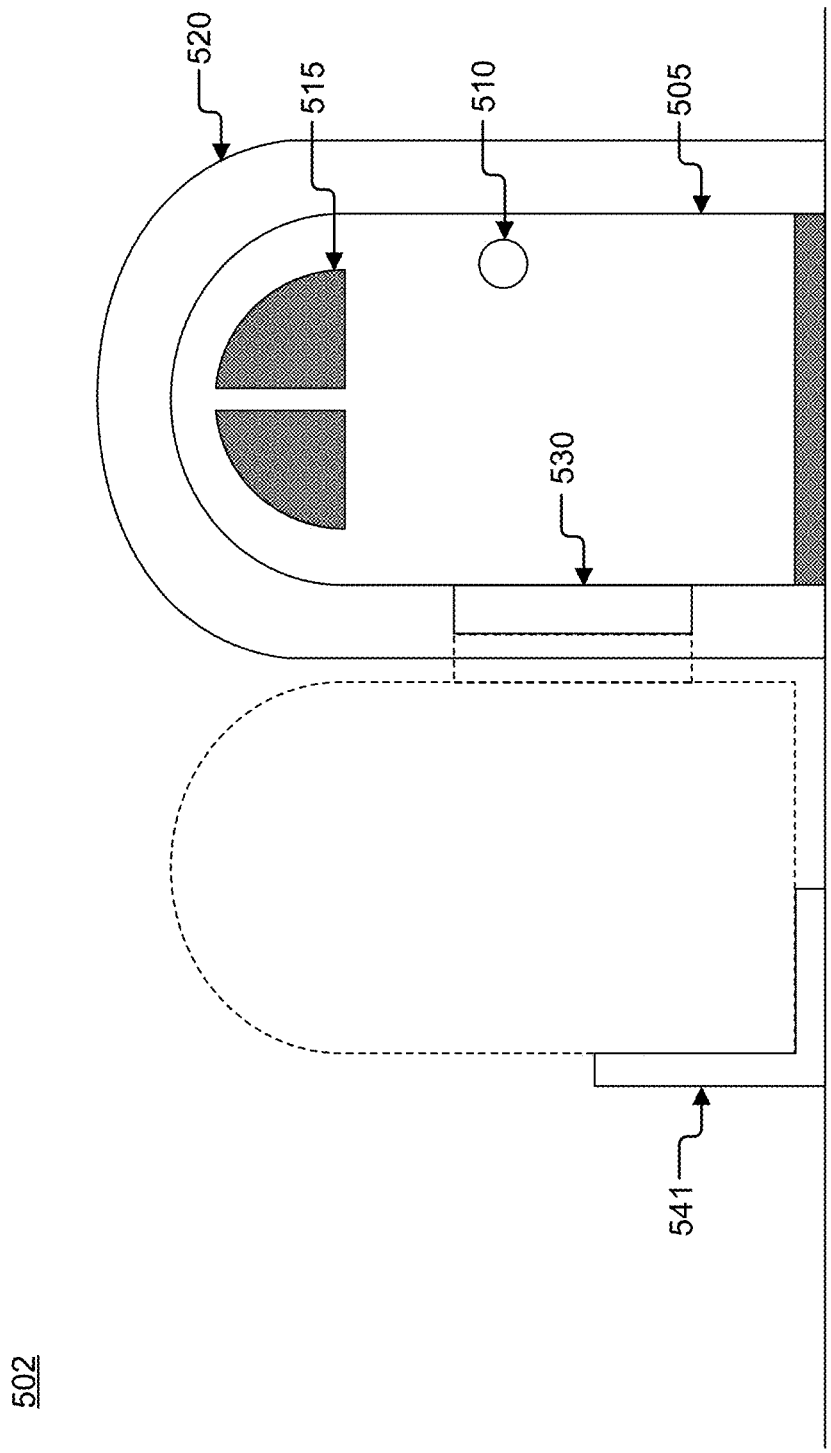
FIG. 5E illustrates an exemplary pet door with an external door stopper, according to some embodiments of the present disclosure.

Referring now to FIGS. 4A-B, a side view of an exemplary pet door 400, 401 is illustrated. In some embodiments, the pet door 400 may comprise a knob 410. In some implementations, the pet door 400 may comprise a first frame 420 and a second frame 421. When the pet door 400 comprises a first 420 and second 421 frame, the pet door 400 may also comprise a first connected frame 425 and a second connected frame 426. The first connected frame 425 may be coupled to the first frame 420 and the second connector frame 426 may be coupled between the first connected frame 425 and the second frame 421. This configuration may allow the pet door 400 to insert into an exterior or interior wall or door so that the first frame 420 and second frame 421 protrude from the opposing surfaces of the exterior or interior wall or door.

In some implementations, the pet door 401 may comprise a knob 411, a first recessed frame 422, a second recessed frame 423, a first connector frame 427 coupled to the first recessed frame 422, and a second recessed frame 428 coupled between the first connector frame 427 and the second recessed frame 423. This configuration may allow the pet door 401 to insert into an exterior or interior wall or door so that the entire pet door 401, when closed, is at most flush with the existing exterior or interior wall or door. In some embodiments, a pet door 400 may drop into a pocket where it can lock in place.

For example, an interior door in a home may slide into a pocket in the wall. If a pet owner wanted to install a pet door 400 to the interior door, the interior door may be unable to function normally. If a pet owner, however, installed a pet door 401 to the interior door, the door would still be able to slide into and out of the associated pocket in the wall.

Referring now to FIGS. 5A-E, an exemplary pet door 500, 501, 502 with a door stopper 540, 541, 550, 551 is shown. In some embodiments, the pet door 500 may comprise a door 505, a knob 510, a plurality of windows 515, a frame 520, and a hinge 530. In some implementations, the frame 520 may comprise an interior door stopper 540.

In some aspects, the interior door stopper 540, 541, 550, 551 may protrude from the frame 520 and catch the door 505, preventing it from fully closing. In some embodiments, the interior door stopper 540 may protrude from the door 505 and insert into a recess in the frame 520, securing the door 505 within the frame 520 when closed. In some aspects, the pet door 500, 501, 502 may interface with an external door stopper 541, 550, 551.

In some implementations, the external door stopper 541 may align to a corner of the door 505 so when the door 505 is in its maximally opened position, the corner of the door 505 may rest on, couples to, or attaches to the external door stopper 541. In some embodiments, the connection between the external door stopper 541 may be maintained by a lock-and-key mechanism, magnets, hook-and-loop fastener, adhesive material, or other non-limiting examples.

In some implementations, the external door stopper 550, 551 may receive the knob 510 of the door 505 when the door 505 is in its maximally opened position. In some embodiments, the external door stopper 550, 551 may be sized to accommodate the knob 510. In some aspects, the connection between the external door stopper 550, 551 and the knob 510 may be maintained by a lock-and-key mechanism, magnets, hook-and-loop fastener, adhesive material, or other non-limiting examples. In some embodiments, the external door stopper 550, 551 may couple to the same exterior or interior wall or door as the pet door 500, 501 is installed into at a predetermined distance from the pet door 500, 501 so the external door stopper 550, 551 may properly receive the knob 510. This may allow the pet owner to secure the door 505 in an open position, so the pet may pass freely through the pet door 500.

Figure 6:
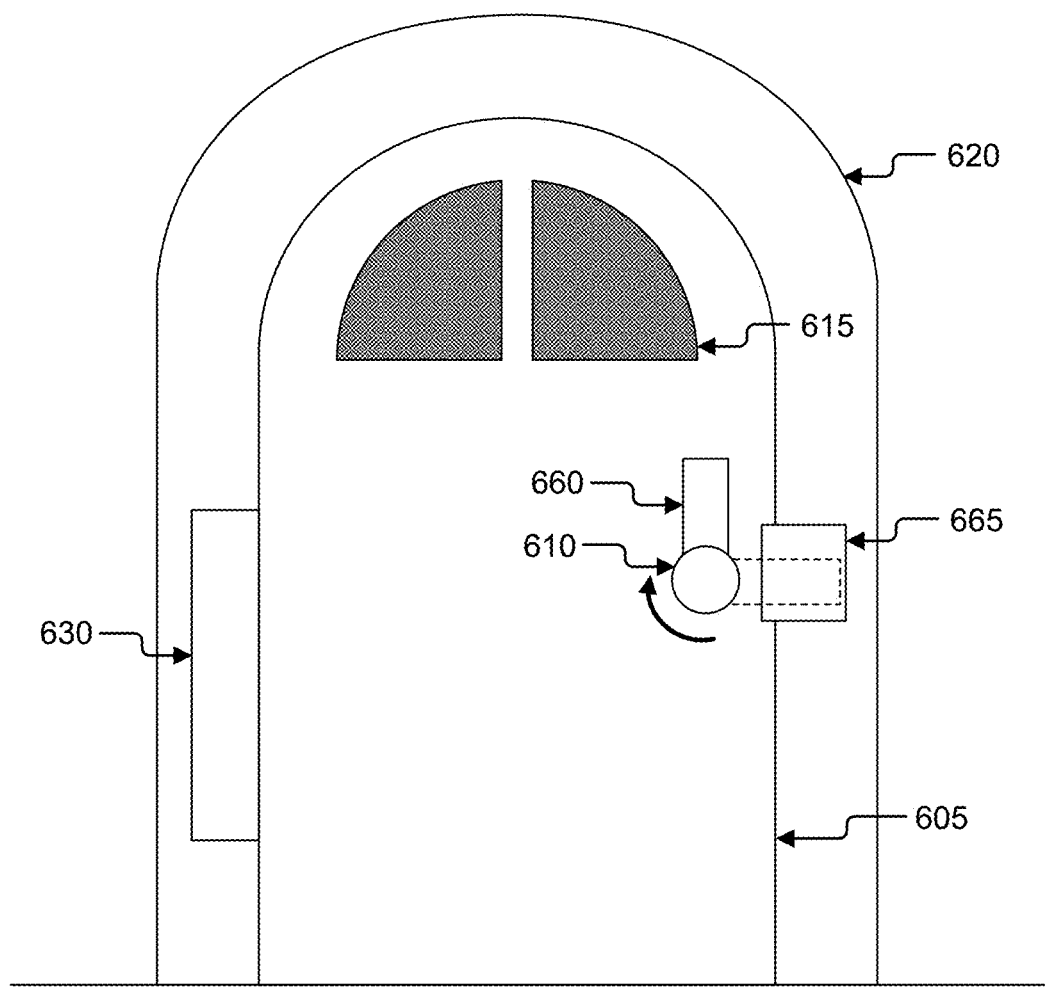
FIG. 6 illustrates an exemplary pet door comprising a latch, according to some embodiments of the present disclosure.

Referring now to FIG. 6, an exemplary pet door 600 is illustrated. In some aspects, the pet door 600 may comprise a door 605. In some embodiments, the pet door 600 may comprise a knob 610. In some aspects, the pet door 600 may also comprise a one or more windows 615. In some implementations, the pet door 600 may comprise a frame 620. In some aspects, the pet door 600 may comprise a hinge 630. In some embodiments, the knob 610 may comprise a locking mechanism. For example, the locking mechanism may comprise a latch 660 and the frame 620 may comprise a latch receiver 665.

For example, the knob 610 may comprise a latch 660 that rotates and inserts into a latch receiver 665 to secure the door 605 in a completely closed position. The latch receiver 665 may be removable so that a pet owner could freely decide the orientation of the door 605 within the frame 620. In some implementations, the latch receiver 665 may couple to the frame 620, magnetically or by some other non-limiting adhesive, or be permanently carved into the frame 620. The latch 660 may be coupled to the knob 610, but this is not limiting.

In some aspects, the latch 660 may be coupled to any part of the pet door 600 and the latch receiver may also be coupled to any part of the pet door 600 or located at some point near it for use. The latch 660 and corresponding latch receiver may allow the pet owner to secure the door 605 in a closed position when the pet door 600 is not in use by a pet, such as when the pet door 600 is an exterior pet door and the pet owner does not want dirt and other outside elements to be tracked or blown into their home.

Figure 7C:
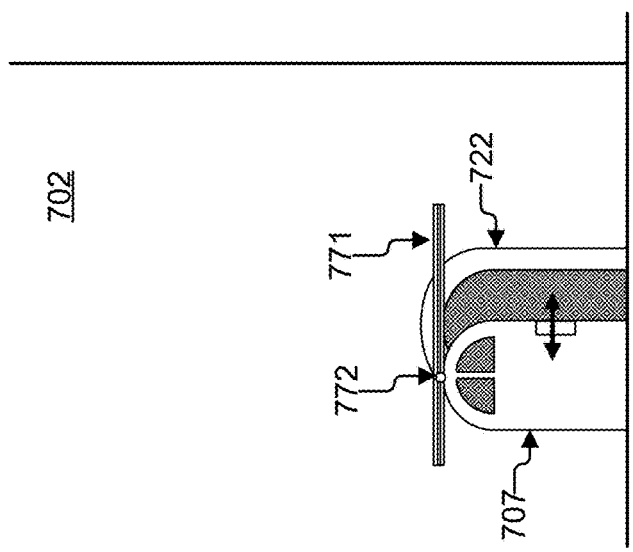
FIG. 7C illustrates an exemplary sliding pet door, according to some embodiments of the present disclosure.
Figure 7B:
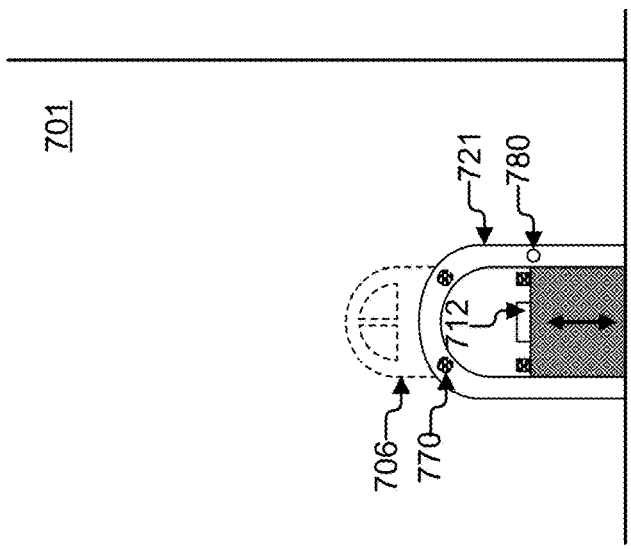
FIG. 7B illustrates an exemplary sliding pet door, according to some embodiments of the present disclosure.
Figure 7A:
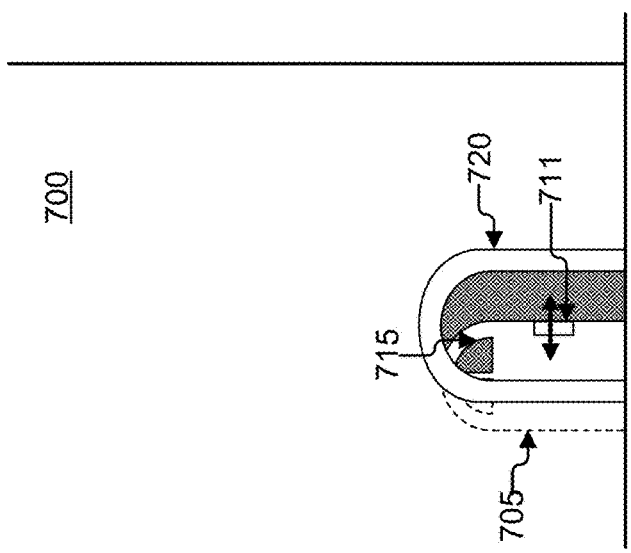
FIG. 7A illustrates an exemplary sliding pet door, according to some embodiments of the present disclosure.

Referring now to FIGS. 7A-C, an exemplary sliding pet door 700, 701 is illustrated. In some embodiments, the sliding pet door 700, 701 may comprise a door 705, 706, a knob 711, 712, and a frame 720, 721. In some implementations, the sliding pet door 700 may comprise a plurality of windows 715. In some aspects, the sliding pet door 701 may comprise attachment mechanism 770 or an activation mechanism 780, or both. The attachment mechanism 770 may comprise a plurality of magnets, a plurality of hook-and-loop closures, or other non-limiting equivalents. In some implementations, the activation mechanism 780 may comprise a doorbell. In some aspects, there may be one or more connector points that guide the placement of the sliding pet door 700, 701, which may differ from a hinge or hinge mechanism.

In some embodiments, the door 705, 706 may slide into and out from the door frame 720, 721. The door 705, 706 may slide either horizontally or vertically. In some implementations, the door 705, 706 may be adjustable within the door frame 720, 721 to be able to slide both horizontally or vertically, depending on which mode is in use. In some aspects, the door fixture 711, 712 may secure the door 705, 706 in an open or closed position by coupling to opposite ends of the door frame 720, 721. This may allow the door 705, 706 to be secured in a preferred position based on the needs of the pet owner and the pet using the door 705, 706.

In some embodiments, the door 706 and the door frame 721 may comprise magnets 770 that couple together when the door 706 is in a partial or maximally open position. These magnets 770 may secure the door 706 in place, so the door 706 does not close on a pet traveling through. In other implementations, the door frame 721 may comprise an activation mechanism 780. In some aspects, the activation mechanism 780 may comprise a doorbell. The pet may be trained to use the activation mechanism 780, allowing the door 706 to be operated semi-automatically in response to the pet's stimulus.

In some aspects, the door 707 may slide along a rail 771, similar to a barn door, wherein movement may be based on the position of the connector point 772. The door may slide in front of the door frame 722. In some embodiments, the rail 771 may be attachable to the door. In some implementations, the rail 771 may be attachable to the door frame 722.

Referring now to FIGS. 8A-B, an exemplary pet door 800 is illustrated. In some embodiments, the pet door 800 may comprise a door 805. In some aspects, the pet door 800 may comprise a knob 810. In some implementations, the pet door 800 may comprise one or more windows 815. In some embodiments, the pet door 800 may comprise a frame 820. In some aspects, the pet door may comprise a hinge 830. In some implementations, the hinge 830 may be arranged on the door 805 and the frame 820 so that the door 805 flips open either vertically or horizontally. In some embodiments, the pet door 800 may interface with an interior or exterior household door, such as a cabinet door as a non-limiting example.

Current solutions for pet doors are limited to certain types of doors or walls. The ability of the pet door 800 to interface with any household barrier or surface, including a kitchen cabinet 890, as a non-limiting example, allows the pet door 800 to be used universally throughout a pet owner's home. The customizable orientation of the frame 820 and hinge 830 also provide more options to pet owners to serve a variety of spaces and décor.

In some aspects, the knob 810 may twist in order for the pet door 800 to be opened. In a closed position, the knob 810 may interact with an interior or exterior locking mechanism to secure the door 805 in the closed position. In some embodiments, twisting the knob 810 for a certain number of degrees may secure the door 805 in a plurality of positions between a fully closed and a fully opened position, including the fully opened position. For example, the knob 810 may pair with an interior knob 811. When twisted, the interior knob 811 may lock the door 805 in a fully opened position. This would allow for safe passage of the pet through the door 805 without clipping a tail or catching any fur, which may cause undue pain to the pet if these things occurred.

Referring now to FIG. 9, an exemplary pet door 900 is illustrated. In some implementations, the pet door 900 may be installed on an interior or exterior household door, such as a sliding or pocket door 990, as a non-limiting example. In some aspects, the pet door 900 may comprise a door 905 and a knob 910. In some embodiments, the pet door 900 may comprise one or more windows 915, a frame 920, and a hinge 905. In some implementations, the pet door 900 may be completely flush to the paired household door, in order to allow the existing household door to function properly. For example, the ability for the pet door 900 to be installed in a way in which the door 905 and frame 920 are completely flush with the sliding or pocket door 990 allows pet owners to install the pet door 900 in places otherwise previously unable to utilize a pet door.

Figure 10:
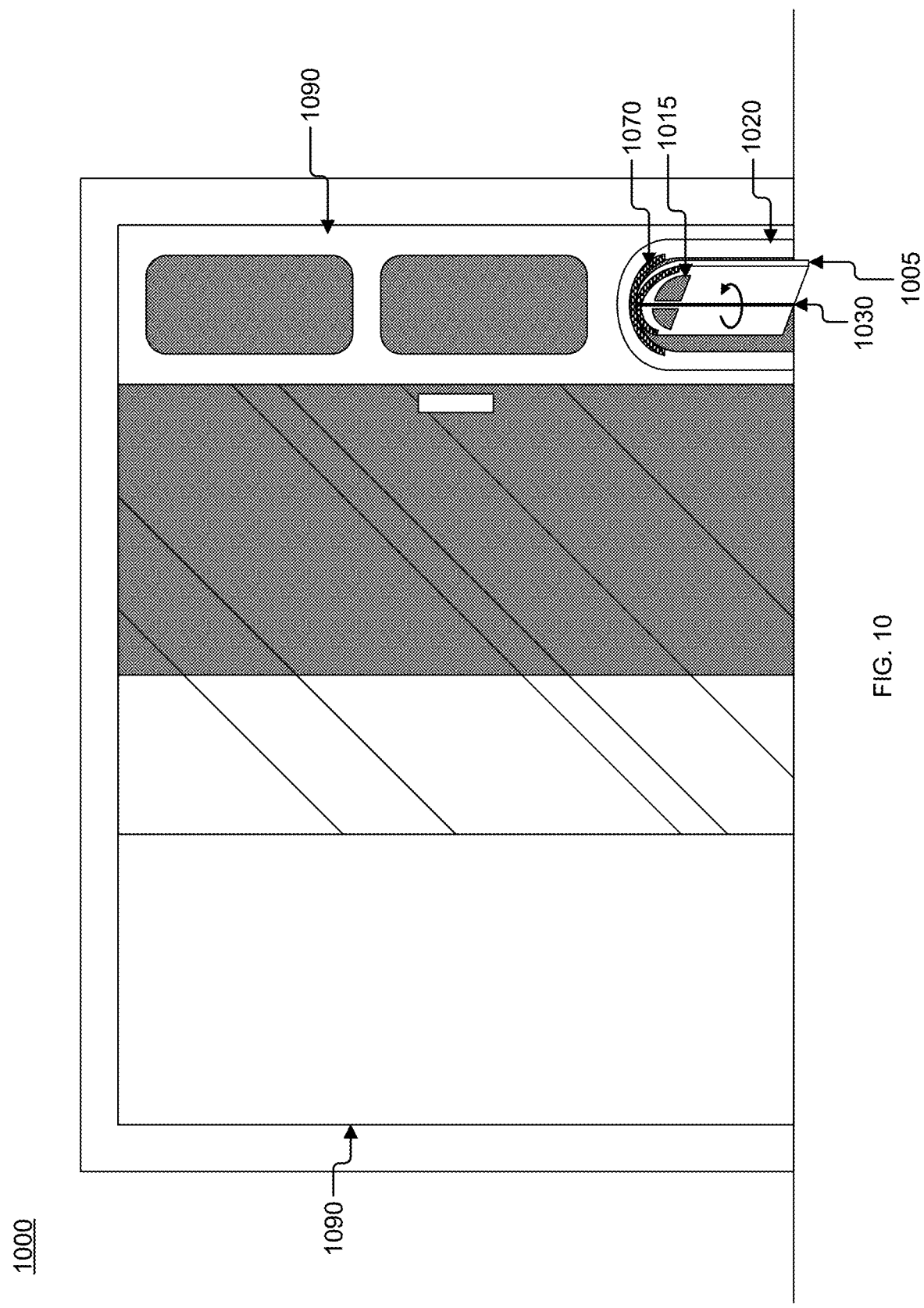
FIG. 10 illustrates an exemplary pet door, according to some embodiments of the present disclosure.
Figure 11A:
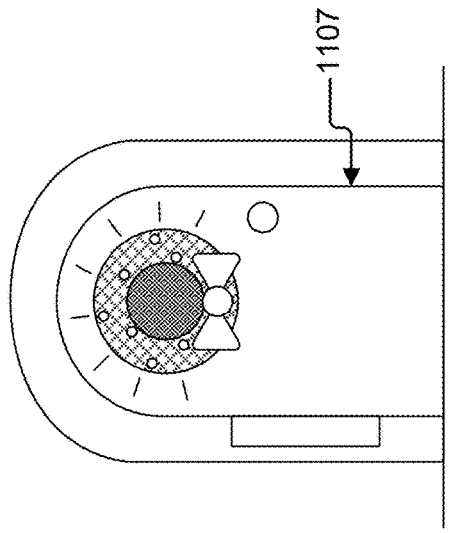
FIG. 11A illustrates an exemplary pet door, according to some embodiments of the present disclosure.
Figure 11C:
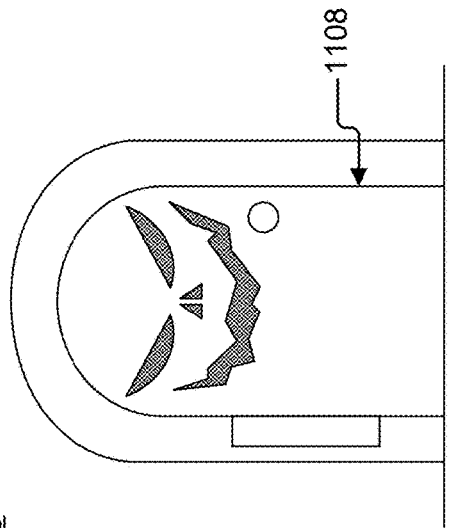
FIG. 11C illustrates an exemplary pet door, according to some embodiments of the present disclosure.
Figure 11B:
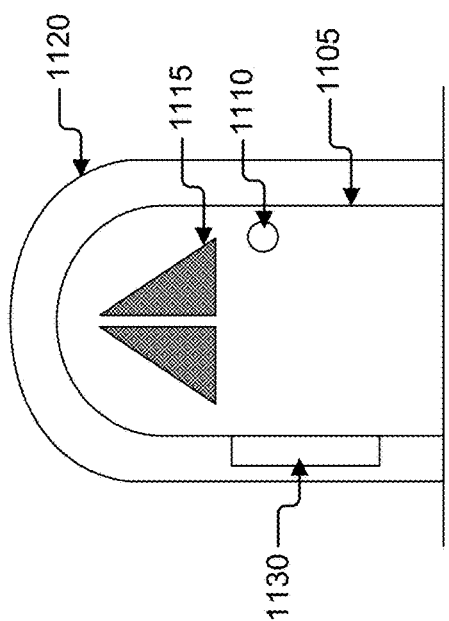
FIG. 11B illustrates an exemplary pet door, according to some embodiments of the present disclosure.
Figure 11D:
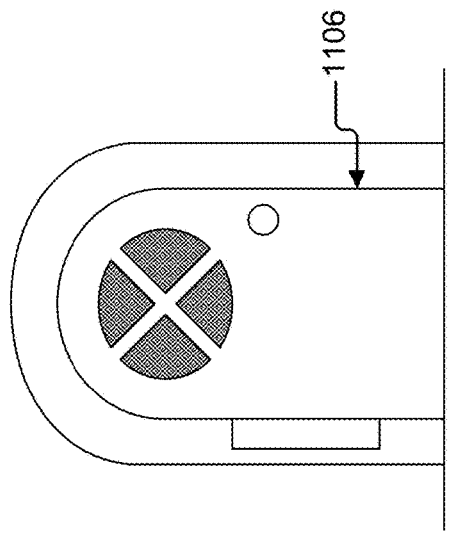
FIG. 11D illustrates an exemplary pet door, according to some embodiments of the present disclosure.
Figure 11E:
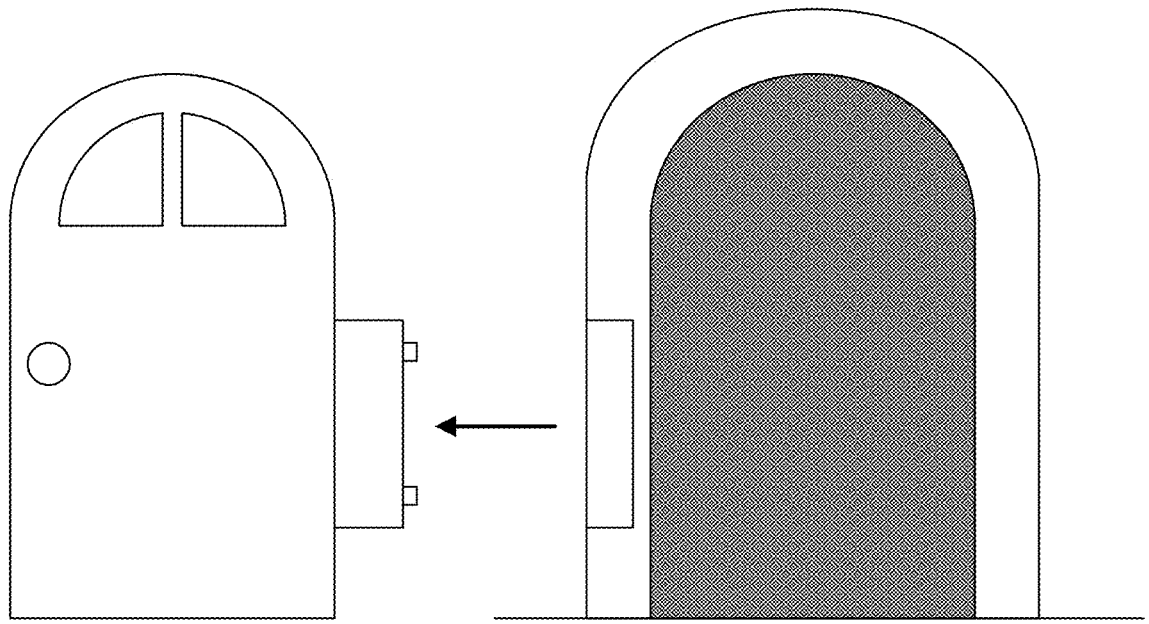
FIG. 11E illustrates an interchangeable exemplary pet door, according to some embodiments of the present disclosure.
Figure 11F:
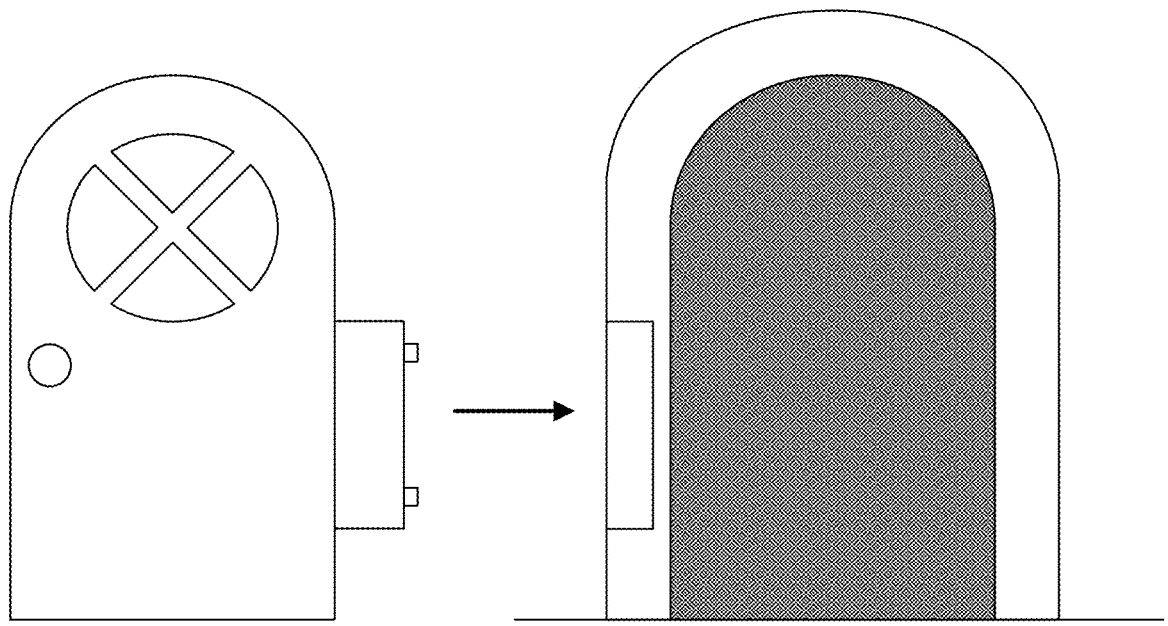
FIG. 11F illustrates an interchangeable exemplary pet door, according to some embodiments of the present disclosure.

Referring now to FIG. 10, an exemplary revolving pet door 1000 is illustrated. In some aspects, the revolving pet door 1000 may comprise a door 1005, a plurality of windows 1015, a frame 1020, and an axis 1030. When force is applied, the door 1005 may revolve about the axis 1030 within the frame 1020. In some embodiments, the door 1005 and the frame 1020 may comprise paired magnets 1070 so the door 1005 may be secured in a completely closed position when not in use. The secured door 1005 allows the pet owner to control traffic flow of their pet or pets through the pet door 1000. For example, if the pet owner has guests over, they might not want their pet to travel through an interior or exterior pet door 1000 for security and sanitation purposes. The ability to secure the pet door in a closed position allows pet owners the ability to enable their pets to use the pet door 1000 as they prefer and need.

In some implementations, the door 1005 may revolve about the axis 1030 in one or more directions. In some aspects, the revolving pet door 1000 may be installed in a panel accompanying an interior or exterior household door or on the interior or exterior household door, itself. As a non-limiting example, the revolving pet door 1000 may be installed in a panel 1090 beside an exterior sliding glass door. The panel 1090 may allow for a secure seal with a sliding glass door without requiring cutting into the glass of the window. This installation method enables a pet owner to utilize the pet door 1000 in multiple scenarios, such as when they would like to install the pet door 1000 near a glass door in their home.

For example, it may be overly expensive and unreasonable to carve a hole in an existing glass door, or order a custom glass door to accommodate a pet entryway. The pet door 1000 enables simplified installation of a pet entryway near a specialty home door, such as a sliding glass, without disrupting the present configuration in a pet owner's home.

Referring now to FIGS. 11A-F, exemplary pet door 1100, 1101, 1102, 1103 are shown. In some embodiments, the pet door 1100, 1101, 1102, 1103 may comprise a door 1105, 1106, 1107, 1108. In some implementations, the pet door 1100, 1101, 1102, 1103 may comprise a knob 1110. In some aspects, the pet door 1100, 1101, 1102, 1103 may comprise one or more windows 1115. In some embodiments, the pet door 1100, 1101, 1102, 1103 may comprise a frame 1120.

In some implementations, the pet door 1100, 1101, 1102, and 1103 may comprise a hinge 1130. The pet door 1100, 1109 may detach from the hinge 1130 and be interchangeable within the frame with pet doors 1101, 1102, 1103, 1104. This may allow for pet owners to customize the appearance of the pet door 1100, 1101, 1102, 1103, such as in response to changing holiday seasons, as a non-limiting example.

For example, pet door 1100, 1101 may comprise an appearance similar to that of a standard household door and an interchangeable pet door 1102, 1103 may comprise an appearance relating to a particular season or holiday. The pet owner may choose to replace pet door 1100, 1101 with either 1102, 1103 or some other non-limiting embodiment so that the pet door 1102, 1103 coincides with the present season or holiday.

Figure 12A:
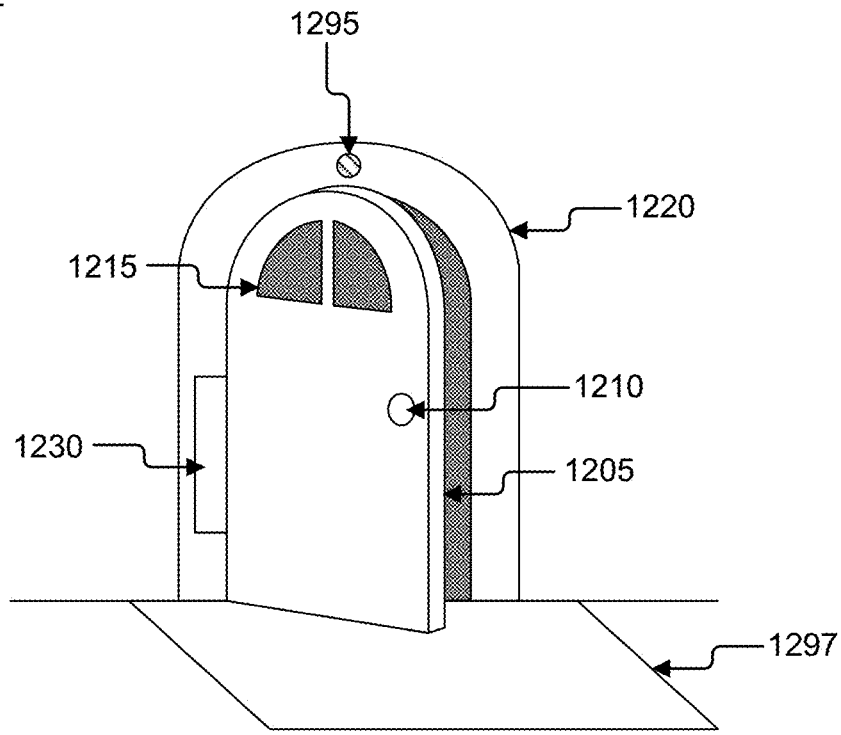
FIG. 12A illustrates an exemplary pet door, according to some embodiments of the present disclosure.
Figure 12B:
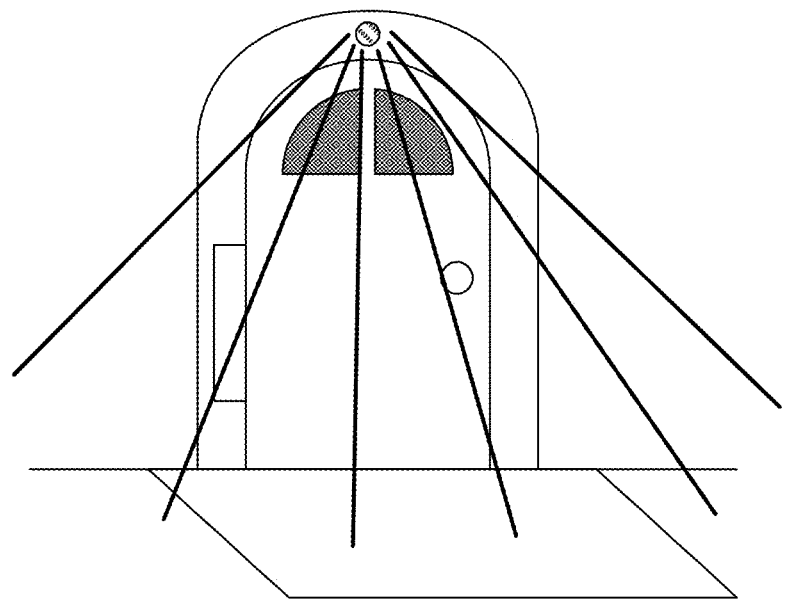
FIG. 12B illustrates an exemplary pet door, according to some embodiments of the present disclosure.

Referring now to FIGS. 12A-B, an exemplary pet door 1200 is shown. The pet door 1200 may comprise a door 1205, a knob 1210, a plurality of windows 1215, a frame 1220, and a hinge 1230. In some implementations, the pet door 1200 may comprise a sensor 1295. This sensor may use a sensing technology, such as motion, infrared, temperature, or other non-limiting equivalent, to detect the presence of a pet. In some embodiments, the sensor 1295 may open the door 1205 so the pet may pass through.

In some aspects, the sensor 1295 may also be also to sense once a pet has passed through the door, and after a predetermined or manually-programmed time period, the sensor 1295 may close the door 1205. This would allow the pet door 1200 to operate the door 1205 semi-automatically in response to a predetermined stimulus.

In some implementations, the pet door 1200 may pair with an external device 1297, such as a doormat, that communicates with the sensor 1295, via a logical communication such as Bluetooth, so that when a pet applies pressure to the external device 1297, the sensor 1295 receives a signal to open the door 1205. Once the pet has relieved pressure from the external device 1297, after a predetermined or pet owner-programmed time period, the external device 1297 may communicate with the sensor 1295, which in turn may close the door 1205. Having the ability to program the time period during which the pet door 1200 may be opened, or the time it would take to open or close after being prompted by the pet owner, enables the pet door 1200 to operate semi-automatically.

In some implementations, the external device 1297 may be programmable to accept a certain threshold of pressure to communicate with the sensor 1295. For example, if the pet weighs 10 pounds, the pet owner may program the external device 1297 to trigger the sensor 1295 when at least 2 pounds of pressure is applied to the external device 1297.

In some aspects, the sensor 1295 may operate in tandem and separately from the external device 1297. As non-limiting examples, the sensor 1295 may detect motion or utilize infrared technology in addition to receiving logical communication from the external device 1297 in order to open the door 1205. This would enable the pet door 1200 to open or close based on sensing the presence of a pet, or in response to a combination of stimulus provided by a trained pet, in order for the pet door 1200 to operate semi-automatically.

In some embodiments, the sensor 1295 may also act as an attraction mechanism, drawing pets to the location of the door so that the pets may, over time, learn where the door is located and how to travel through it. This attraction mechanism may comprise a blinking light, a specialized sound emitter, or some other non-limiting equivalent that would attract, and not deter, a pet. For example, a trained pet could learn to trigger the pet door 1200 to open and close, and in response the pet door 1200 may react semi-automatically depending on the stimulus.

In some implementations, the sensor 1295 may comprise a camera and a radio frequency, Bluetooth, or another non-limiting signal that allows the pet door 1200 to communicate with a mobile device, such as a cell phone. The pet owner may download an application onto the cell phone for use with the pet door 1200. In some aspects, the sensor 1295 may sense the arrival or departure of a pet, inform the pet owner via the cell phone application, and allow the pet owner to remotely open or close the door 1205, accordingly. This may enable semi-automatic operation of the pet door 1200 via a smartphone application, motion or presence of a pet, a stimulus executed by a trained pet, and other combination of non-limiting equivalent examples.

Figure 13A:
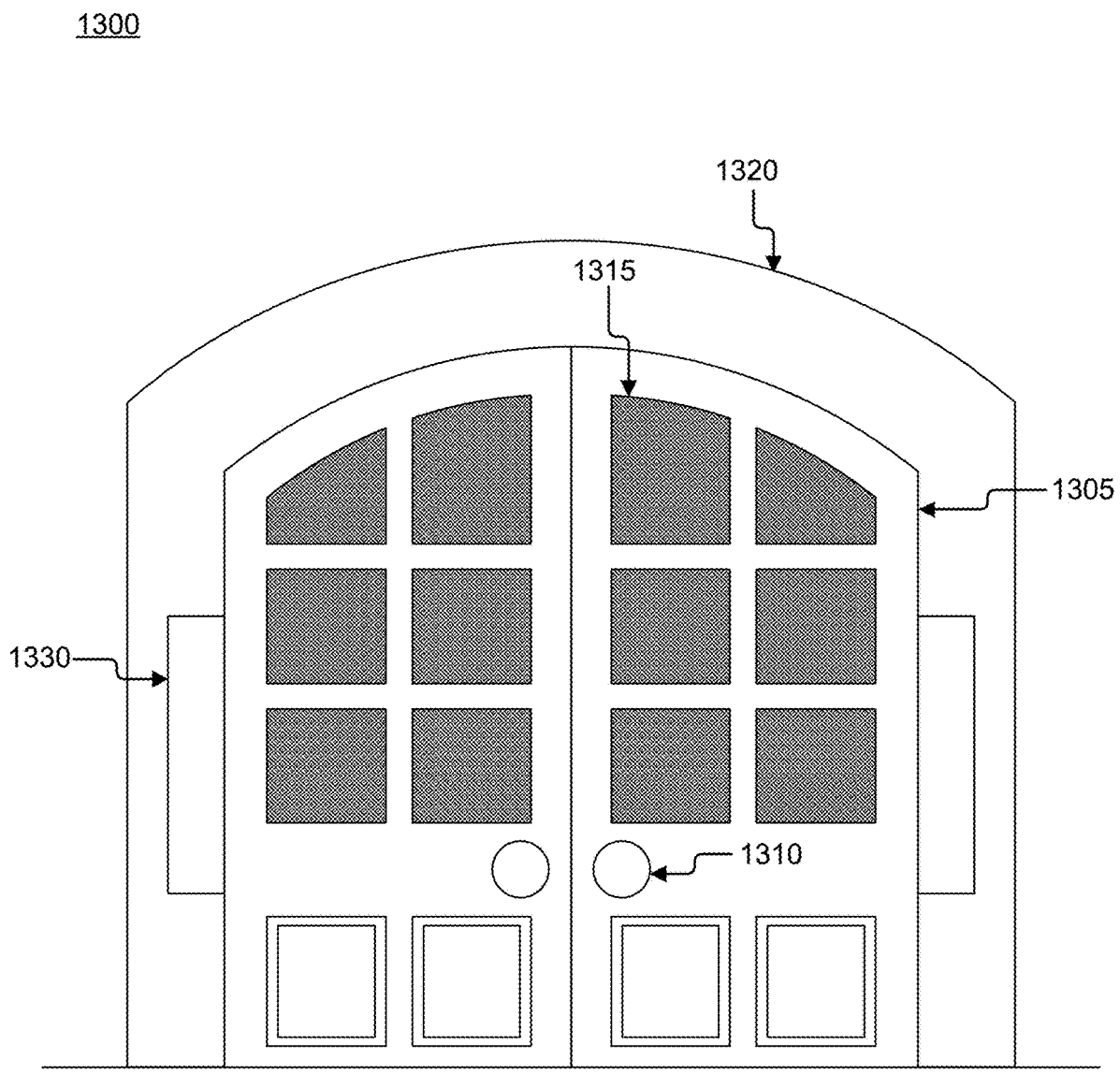
FIG. 13A illustrates a front view of an exemplary pet door, according to some embodiments of the present disclosure.
Figure 13B:
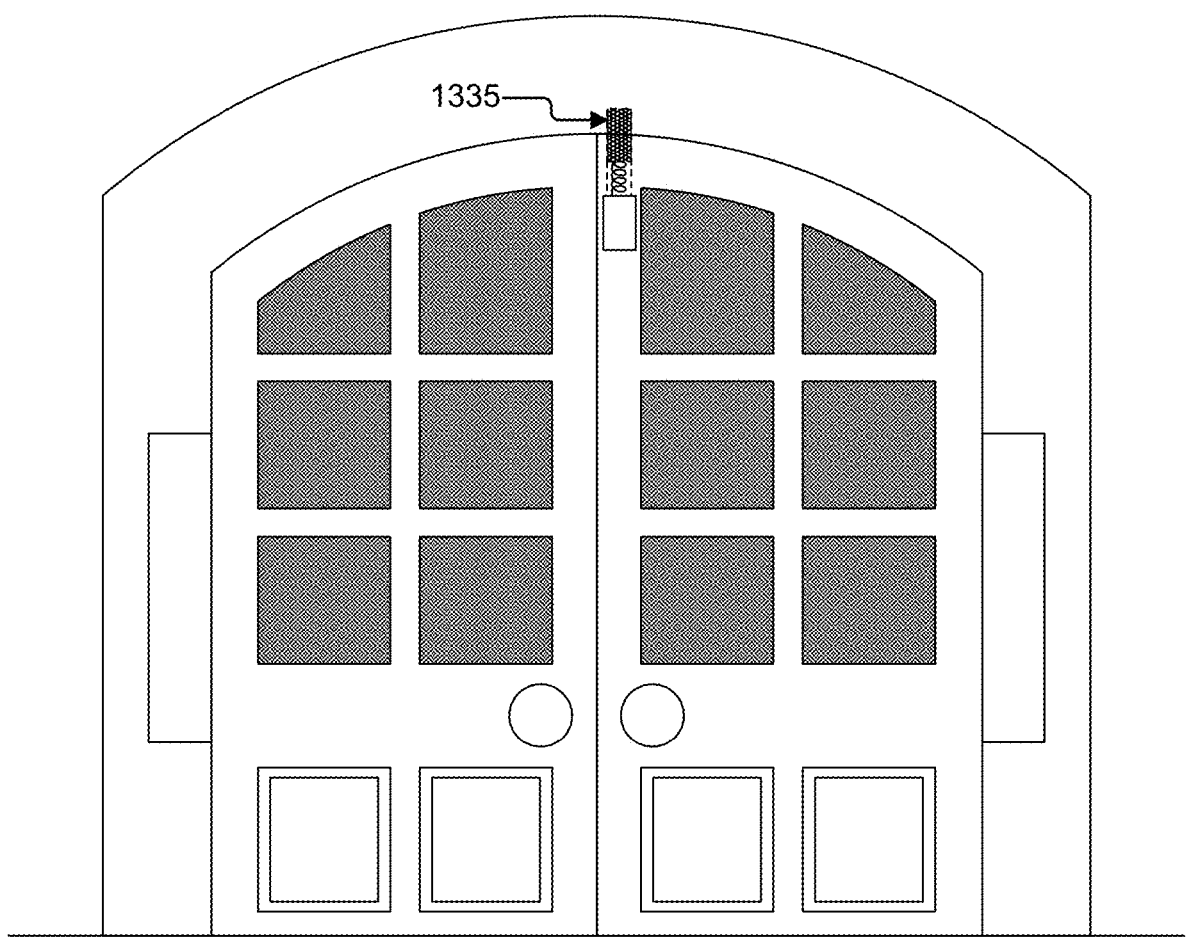
FIG. 13B illustrates a front view of an exemplary pet door comprising a locking mechanism, according to some embodiments of the present disclosure.

Referring now to FIGS. 13A-B, a front view of an exemplary pet door 1300 is illustrated. In some embodiments, a pet door 1300 may comprise double doors 1305 that may open by a hinge 1330. In some aspects, a pet door 1300 may comprise windows 1315 and door knobs 1310. In some implementations, the windows 1315 may be decorative, such as where they may not be transparent.

In some embodiments, the pet door 1300 may comprise a locking mechanism 1335. In some aspects, the locking mechanism 1335 may be spring-loaded. In some embodiments, the locking mechanism 1335 may secure the pet door 1300 in a closed state.

In some implementations, the locking mechanism 1335 may alter the size of the accessible entryway. For example, the locking mechanism 1335 may secure a singular door from a pair of French doors that restricts the size of the entryway from the size of two open doors to the size of one open door.

In some aspects, the locking mechanism 1335 may work in conjunction with another component of the pet door 1300. As an illustrative example, the locking mechanism may operate in conjunction with the knob to form a secure closed state for the pet door 1300. The locking mechanism 1335 may provide a securing point between the door 1305 and the frame 1320 that provides sufficient rigidity to keep a double set of doors closed, whereas only securing the pet door 1300 by a knob-operated latching mechanism may still allow some leeway in the security of the pet door 1300 that allows the latching mechanism to slip or break when enough force is applied to the middle of the double doors.

In some embodiments, double doors 1305 may be nested into an outer frame 1320, wherein the outer frame 1320 may be at least partially embedded into a surface, such as a door or wall. In some implementations, double doors 1305 may have a locking mechanism wherein the door may lock once both are closed together, such as illustrated in FIGS. 14A-14D. In some aspects, the frame 1320 may comprise a locking mechanism that allows the door 1305 to be interchangeable.

Figure 14A:
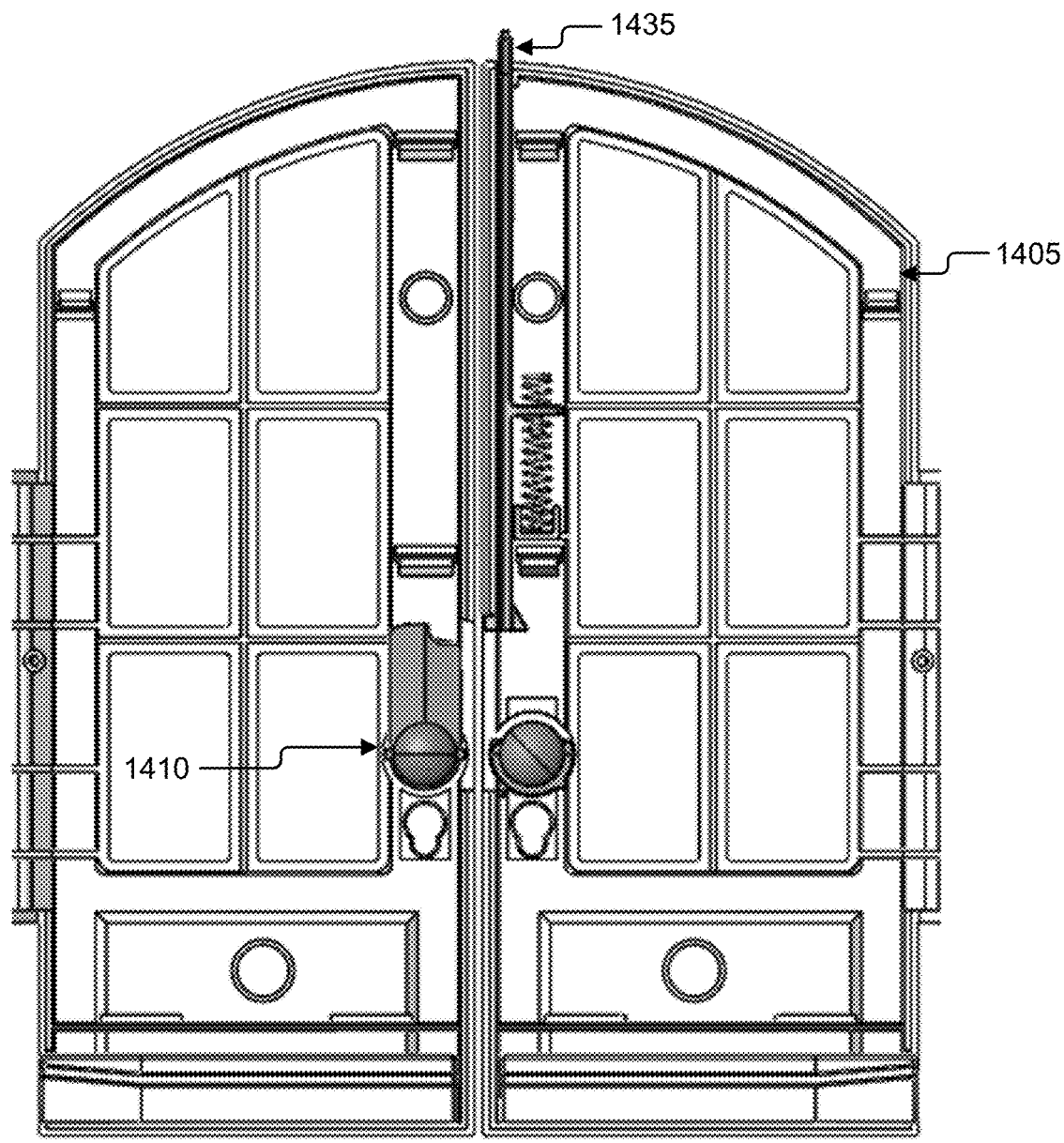
FIG. 14A illustrates a front view of an exemplary pet door comprising a locking mechanism, according to some embodiments of the present disclosure.
Figure 14B:
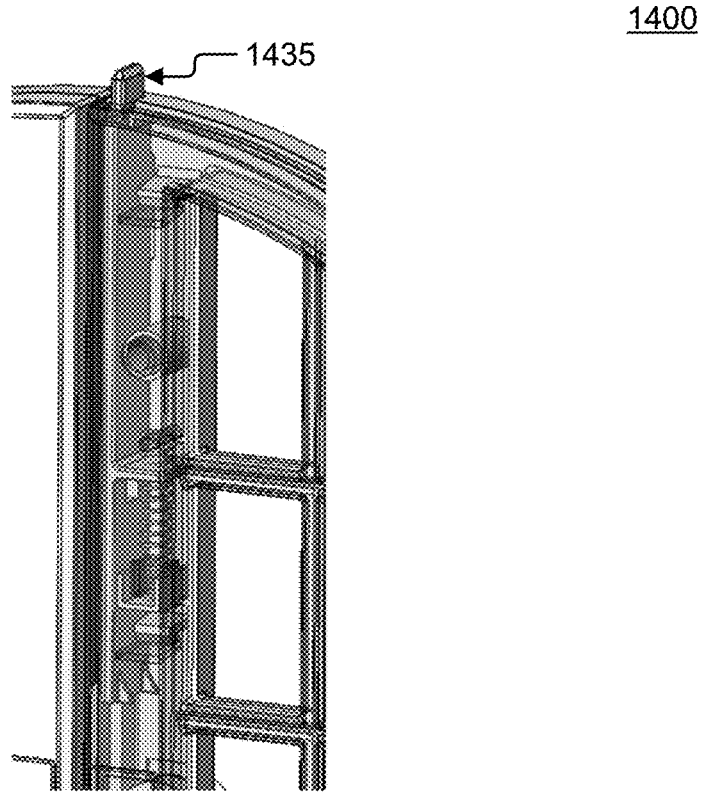
FIG. 14B illustrates a section view of an exemplary pet door comprising a locking mechanism, according to some embodiments of the present disclosure.
Figure 14C:
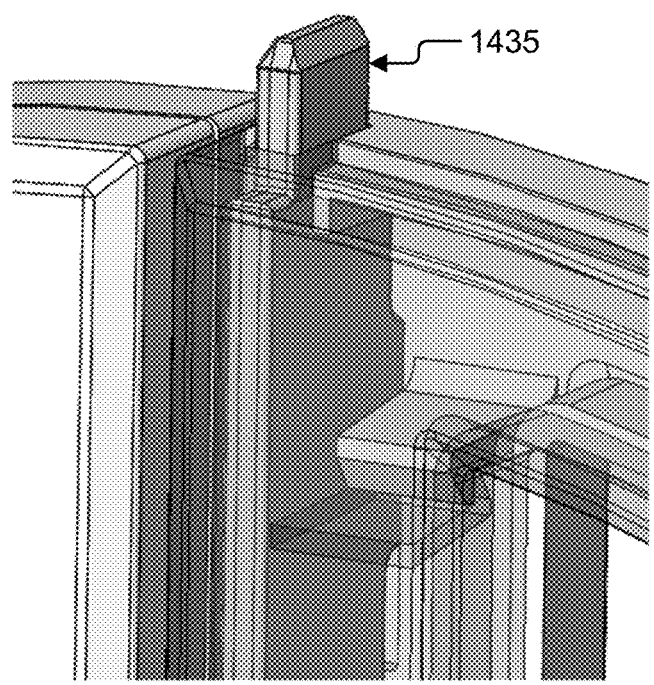
FIG. 14C illustrates a section view of an exemplary pet door comprising a locking mechanism, according to some embodiments of the present disclosure.

Referring now to FIGS. 14A-C, an exemplary pet door 1400 comprising a locking mechanism 1435 is illustrated. In some embodiments, the pet door 1400 may comprise a locking mechanism 1435. In some aspects, the locking mechanism 1435 may be spring-loaded. In some embodiments, the locking mechanism 1435 may secure the pet door 1400 in a closed state.

In some implementations, the locking mechanism 1435 may alter the size of the accessible entryway. For example, the locking mechanism 1435 may secure a singular door from a pair of French doors that restricts the size of the entryway from the size of two open doors to the size of one open door.

In some aspects, the locking mechanism 1435 may work in conjunction with another component of the pet door 1400. As an example, the locking mechanism may operate in conjunction with the knob 1410 to form a secure closed state for the pet door 1400. When there is a set of knobs 1410, one knob may rotate to secure the doors 1405 with a latch that secures the rotating knob 1410 against a second, fixed knob 1410.

The locking mechanism 1435 may provide a securing point between the door 1405 and the frame that provides sufficient rigidity to keep a double set of doors closed, whereas only securing the pet door 1400 by a knob-operated latching mechanism may still allow some leeway in the security of the pet door 1400 that allows the latching mechanism to slip or break when enough force is applied to the middle of a double set of doors 1405.

In some embodiments, double doors 1405 may be nested into an outer frame, wherein the outer frame may be at least partially embedded into a surface, such as a door or wall. In some implementations, double doors 1405 may have a locking mechanism 1435 wherein the door 1405 may lock once both are closed together.

Referring now to FIGS. 15A-C, an exemplary locking mechanism 1500 in an unlocked position. Referring now to FIG. 15D, an exemplary locking mechanism 1500 in a locked position is illustrated. In some embodiments, a locking mechanism 1500 may comprise a latching mechanism 1510 and a positioning mechanism 1505. In some implementations, the positioning mechanism 1505 may limit the rotation of the latching mechanism 1510 to prevent or allow for locking. In some aspects, the positioning mechanism 1505 may be lifted to allow for the rotation of the latching mechanism 1510 onto the adjacent knob. In some embodiments, a locking mechanism 1500 may allow for locking of double doors, such as illustrated, or locking of a door to a door frame, not illustrated.

Referring now to FIGS. 16A-B, an exemplary pet door 1600 comprising a locking mechanism 1635 is illustrated. In some aspects, the locking mechanism 1635 may be alterable between a locked state and an unlocked state. In some embodiments, the locking mechanism 1635 may comprise at least one latch 1660. In some implementations, the pet door 1600 may comprise at least one frame 1620. In some aspects, the frame 1620 may comprise at least one latch receiver 1665.

In some implementations, the latch receiver 1665 may be internal to the at least one frame 1620. In some aspects, at least one surface of the latch receiver 1665 may be substantially parallel with the outer surface of the frame 1620. In some embodiments at least one surface of the latch receiver 1625 may be substantially coplanar with the outer surface of the frame 1620. In some implementations, the latch receiver 1665 may be at least partially external to the frame 1620. By way of example and not limitation, the latch receiver 1665 may be mounted on or secured to the outer surface of the frame 1620, such as via one or more screws, nails, bolts, pins, or similar fastening elements, as non-limiting examples.

In some embodiments, the latch 1660 may be removably inserted into at least a portion of the latch receiver 1665 to form a locked state for the pet door 1600 such that at least a portion of the latch 1660 may physically contact the latch receiver 1665 when movement of at least one door 1605 of the pet door 1600 may be attempted. In some aspects, the latch receiver 1665 may at least partially enclose the received latch 1660 therein. In some implementations, at least one knob 1610 may be configured to facilitate movement of at least a portion of the latch 1660 into the latch receiver 1665. In some embodiments, at least a portion of the latch 1660 may be configured to slidably move into and out of the latch receiver 1665 as the knob 1610 is rotated in at least one direction. In some aspects, rotation of the knob 1610 may manipulate one or more gears, detents, or similar mechanisms to transfer the rotational movement of the knob 1610 to substantially linear translational movement of the latch 1660

In some implementations, the locked state of the locking mechanism 1635 may comprise an orientation of the knob 1610 such that unintentional rotation of the knob 1610 may not be imitated by gravitational forces so that the locking mechanism 1635 is not inadvertently altered to an at least partially unlocked state without the intent of a user. In some embodiments, the knob 1610 may only be rotatable on one side of the door 1605 to improve security by only allowing users on that side of the door, such as may be associated with the interior of a home or other residence, to be able to alter the pet door 1600 between the locked state and an unlocked state while denying this ability to individuals, some of whom may be bad actors, on an exterior side of the pet door 1600.

In some aspects, the door 1605 portion of the pet door 1600 may be substantially prevented from opening when the latch 1660 is at least partially received by the latch receiver 1665. In some implementations, the knob 1610 may be placed in a locked state wherein the knob 1610 may be substantially unable to rotate. In some embodiments, the knob 1610 may be altered between the locked state and the rotatable unlocked state via at least one of: a key, a switch, a liver, and a dial.

Figure 17B:
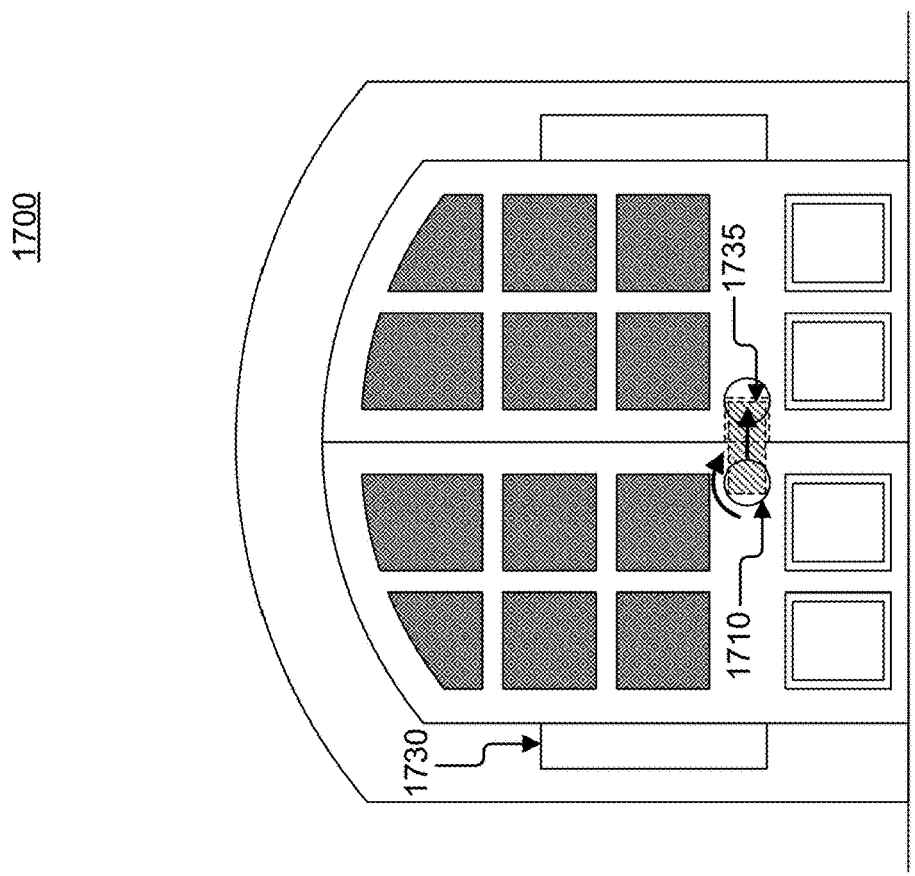
FIG. 17B illustrates a front view of an exemplary pet door comprising a locking mechanism, according to some embodiments of the present disclosure.
Figure 17A:
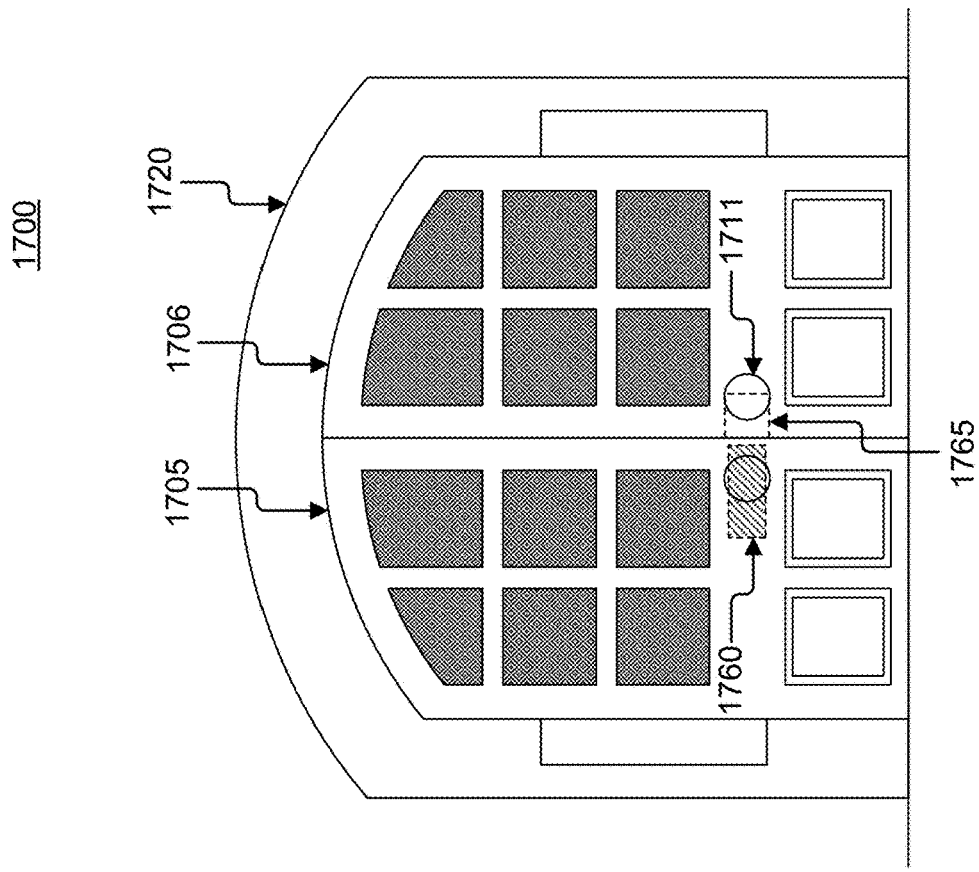
FIG. 17A illustrates a front view of an exemplary pet door comprising a locking mechanism, according to some embodiments of the present disclosure.

Referring now to FIGS. 17A-B, an exemplary pet door 1700 comprising a locking mechanism 1735 is illustrated. In some aspects, the locking mechanism 1735 may be alterable between a locked state and an unlocked state. In some embodiments, the locking mechanism 1735 may comprise at least one latch 1760. In some implementations, the pet door 1700 may comprise at least one frame 1720. In some aspects, the frame 1720 may comprise at least one latch receiver 1765.

In some embodiments, the latch 1760 may be removably inserted into at least a portion of the latch receiver 1765 to form a locked state for the pet door 1700. In some implementations, at least one knob 1710 may be configured to facilitate movement of at lest a portion of the latch 1760 into and out of the latch receiver 1765. In some aspects, the door 1705 portion of the pet door 1700 may be substantially prevented from opening when the latch 1760 is at least partially received by the latch receiver 1765.

In some aspects, the locking mechanism 1735 may be configured to work in conjunction with one or more additional components of the pet door 1700. As an illustrative example, the locking mechanism 1735 may operate in conjunction with the knob to 1710 form a secure locked state for the pet door 1700. In some implementations, the locking mechanism 1735 may provide a securing point between a first door 1705 and a second door 1706 of a pet door 1700 that may provide sufficient rigidity to keep the double set of doors 1705, 1706 closed. In some implementations, the latch 1760 may extend from the first door 1705 to the second door 1706 at sufficient length to secure both doors 1705, 1706 in a closed state without risk of fracture, slip, or other non-limiting forms of mechanical failure by an excessive localized force at the center of the double doors 1705, 1706.

In some embodiments, double doors 1705, 1706 may be at least partially nested within an outer frame 1720, wherein the outer frame 1720 may be at least partially embedded within a surface, such as a larger door or wall, as non-limiting examples. In some implementations, double doors 1705, 1706 may comprise a locking mechanism 1735 configured to place the pet door 1700 in a locked state once both doors 1705, 1706 are closed together.

In some aspects, the locking mechanism 1735 may work in conjunction with one or more additional components of the pet door 1700. As an example, the locking mechanism 1735 may operate in conjunction with the knob 1710 to form a secure locked state for the pet door 1700. In some embodiments wherein the pet door 1700 may comprise a set of two knobs 1710, 1711, a first knob 1710 may be configured to rotate to facilitate translational movement of a latch 1760 that may secure the rotating knob 1710 against a second, fixed knob 1711. As another example, in some implementations the frame 1720 may comprise at least one extruding projection that may be configured to substantially prevent the alignment of the doors 1705, 1706 required to place the locking mechanism 1735 in the locked state.

Figure 18A:
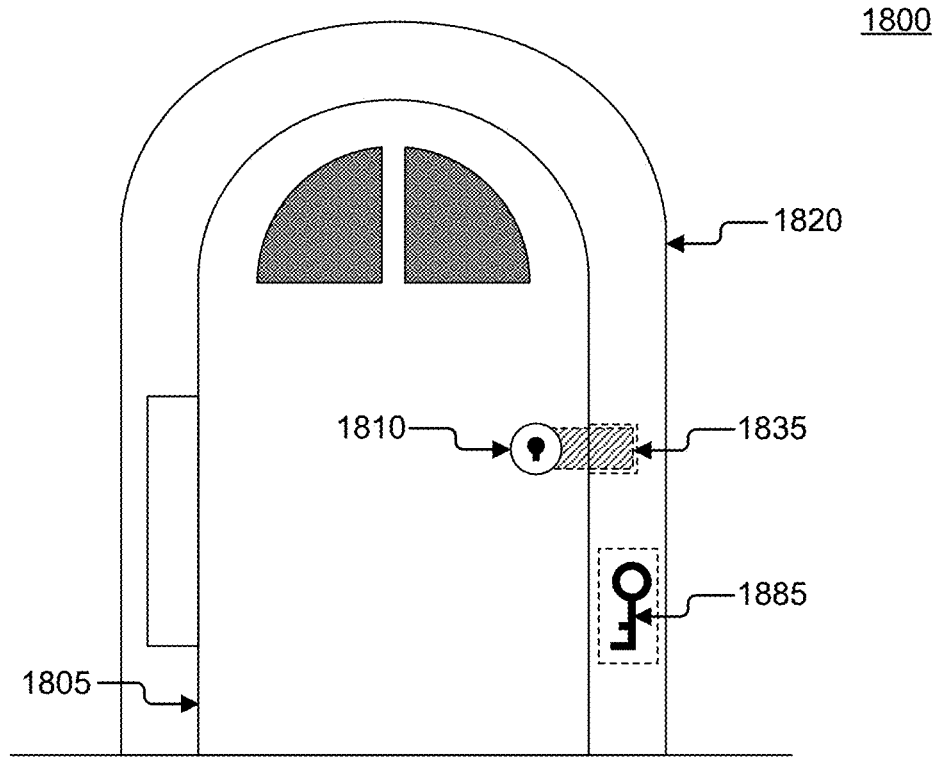
FIG. 18A illustrates a front view of an exemplary pet door comprising a locking mechanism and an access device, according to some embodiments of the present disclosure.
Figure 18B:
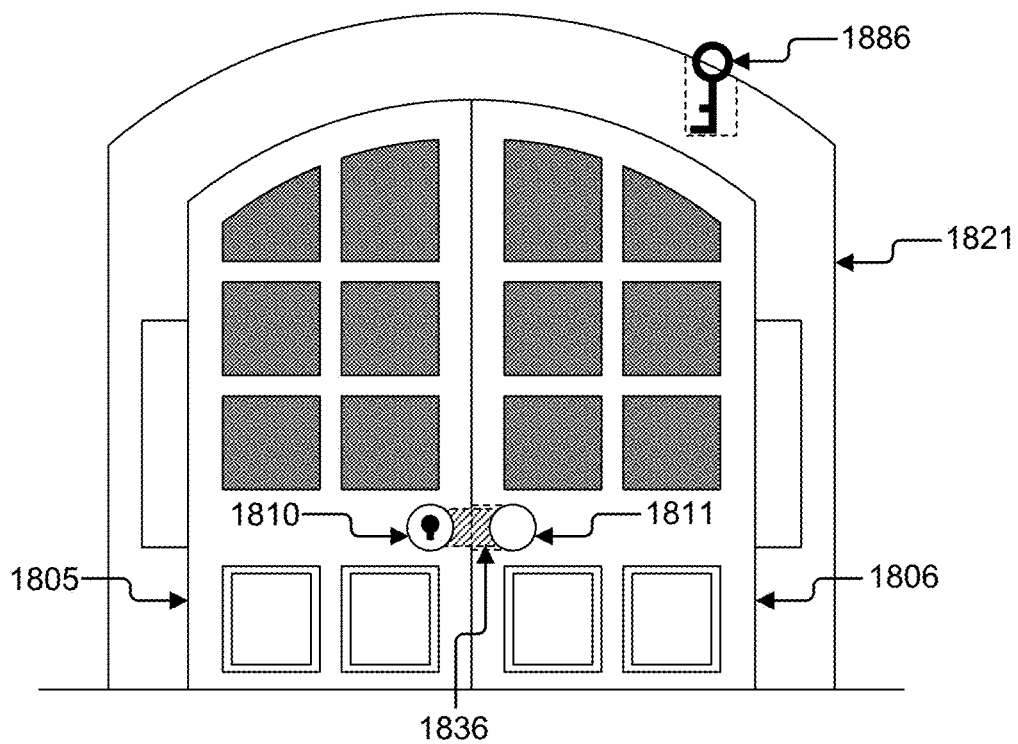
FIG. 18B illustrates a front view of an exemplary pet door comprising a locking mechanism and an access device, according to some embodiments of the present disclosure.

Referring now to FIGS. 18A-B, an exemplary pet door 1800 comprising a locking mechanism 1835, 1836 and an access device 1885, 1886 is illustrated. In some aspects, the pet door 1800 may comprise at least one locking mechanism 1835, 1836 that may be alterable between a locked state and an unlocked state via at least one access device 1885, 1886. In some embodiments, the locking mechanism 1835, 1836 may comprise at least one latch. In some implementations, the pet door 1800 may comprise at least one frame 1820. In some aspects, the frame 1820 may comprise at least one latch receiver.

In some embodiments, the latch may be removably inserted into at least a portion of the latch receiver to form a locked state for the pet door 1800. In some aspects, the locking mechanism 1835 may comprise, by way of example and not limitation, a keyed lock. In some implementations, at least a portion of at least one knob 1810 connected to the locking mechanism may be configured to rotate in at least one direction to facilitate translational movement of at least a portion of the latch into and out of the latch receiver. In some aspects, at least one door 1805 of the pet door 1800 may be substantially prevented from opening when the locking mechanism 1835, 1836 is placed in the locked state via the interaction of the access device 1885, 1886 with an interior portion of the locking mechanism 1835, 1836, such as, by way of example and not limitation, a keyhole.

In some aspects, the locking mechanism 1836 may work in conjunction with one or more additional components of the pet door 1800. As an illustrative example, the locking mechanism 1836 may operate in conjunction with a portion of at least one knob 1810, such as a lock keyhole, to establish a secure locked state for the pet door 1800. The locking mechanism 1836 may provide a securing point between a first door 1805 and a second door 1806 that may provide sufficient rigidity to keep a double set of doors 1805, 1806 closed. In some implementations, at least one latch may extend from the first door 1805 to the second door 1806 at sufficient length to secure both doors 1805, 1806 in a closed state without risk of fracture, slip, or other non-limiting forms of mechanical failure by an excessive localized force at the center of the double doors 1805, 1806.

In some embodiments, double doors 1805, 1806 may be at least partially nested within an outer frame 1820, wherein the outer frame 1820 may be at least partially embedded within a surface, such as a larger door or wall. In some implementations, double doors 1805, 1806 may comprise a locking mechanism 1836 that may be configured to place the pet door 1800 in a locked state once both doors 1805, 1806 are closed together.

In some aspects, the locking mechanism 1836 may be configured to work in conjunction with one or more additional components of the pet door 1800. As an example, the locking mechanism 1836 may be configured to operate in conjunction with the knobs 1810, 1811 to form a secure locked state for the pet door 1800. In some embodiments wherein the pet door may comprise a pair of knobs 1810, 1811, a portion of a first knob 1810 may be configured to rotate in at least one direction to facilitate translational movement of at least one latch that may secure the first rotating knob 1810 to a second, fixed knob 1811. As another example, in some implementations the frame 1820 may comprise at least one extruded projection that may substantially prevent movement of at least one of the doors 1805, 1806 to a position where the components of the locking mechanism 1836 may be substantially aligned, thereby preventing the locking mechanism 1836 from being altered to the locked state.

In some embodiments, the access device 1885, 1886 may be conveniently stored proximate to the pet door 1800 to facilitate alteration of the locking mechanism 1835, 1836 of the pet door 1800 between the locked state and the unlocked state. In some implementations, the frame 1820 of the pet door 1800 may comprise at least one storage location for the access device 1885, such as a cavity, recess, crevice, or similar at least partially open structure within a top portion of the frame 1820 to position the access device 1885, in a visible, easily-accessible location for storage and retrieval by at least one user.

In some aspects, the access device 1886 may be configured to removably attach to an external surface of the pet door 1800, such as an outside surface of the frame 1821, as a non-limiting example. In some embodiments, the access device 1885, 1886 may be stored on or within a location on an interior side of the pet door 1800, such as the inside of a home or other residence, as a non-limiting example. In some implementations, this placement may maintain ease-of-access to the access device 1885, 1886 while preventing undesired use of the pet door 1800 by an unauthorized user or potential bad actor.

Referring now to FIGS. 19A-B, an exemplary pet door 1900 comprising a locking mechanism 1935 is illustrated. In some aspects, the locking mechanism 1935 may be alterable between a locked state and an unlocked state. In some embodiments, the locking mechanism 1935 may comprise at least one latch 1960. In some implementations, the pet door 1900 may comprise at least one frame 1920. In some aspects, the frame 1920 may comprise at least one latch receiver 1965.

In some embodiments, at least one latch 1960 may be removably inserted into at least a portion of at least one latch receiver 1965 to configure at least one door 1905 of the pet door 1900 in a locked position. In some aspects, an additional latch 1960 may be removably inserted into at least a portion of at least one positioning mechanism 1940. In some implementations, at least one knob 1910 may be configured to facilitate translational movement of two or more latches 1960 in a substantially simultaneous manner. In some aspects, the door 1905 may be substantially prevented from opening when at least one of the latches 1960 is at least partially received by the latch receiver 1965, the positioning mechanism 1940, or both.

In some embodiments, the positioning mechanism 1940 may be configured to facilitate alignment of the locking mechanism 1935 for the purpose of directing the insertion of at least one latch 1960 into at least one latch receiver 1965. In some implementations, the positioning mechanism 1940 may function substantially as a latch receiver insomuch as the positioning mechanism 1940 may comprise a cavity or similar at least partially open structure wherein at least one latch 1960 may be removably inserted.

In some aspects, two or more latches 1960 may be secured in their respective locked states in a substantially subsequent fashion. For example, after the door 1905 has been moved to a closed position, at least partial rotation of the knob 1910 in at least one direction may instigate the extension of a first latch 1960 into a positioning mechanism 1940. After securing the first latch 1960 in the positioning mechanism 1940, the knob 1910 may be rotated further, thereby facilitating extension of a second latch 1960 into a latch receiver 1965. In some embodiments, the use of two or more latches 1960 may improve the security of the pet door 1900.

In some implementations, the use of two or more latches 1960 may prevent damage to the pet door 1900 from an attempted forced entrance by distributing the applied forces across two or more locations and helping to prevent unauthorized rotation of the knob 1910 and/or hinge(s) of the door 1905 via an excessive amount of applied force when the locking mechanism 1935 is in the locked state, such as, for example and not limitation, when the knob 1910 may comprise a keyed lock or similar mechanism.

Figure 20:
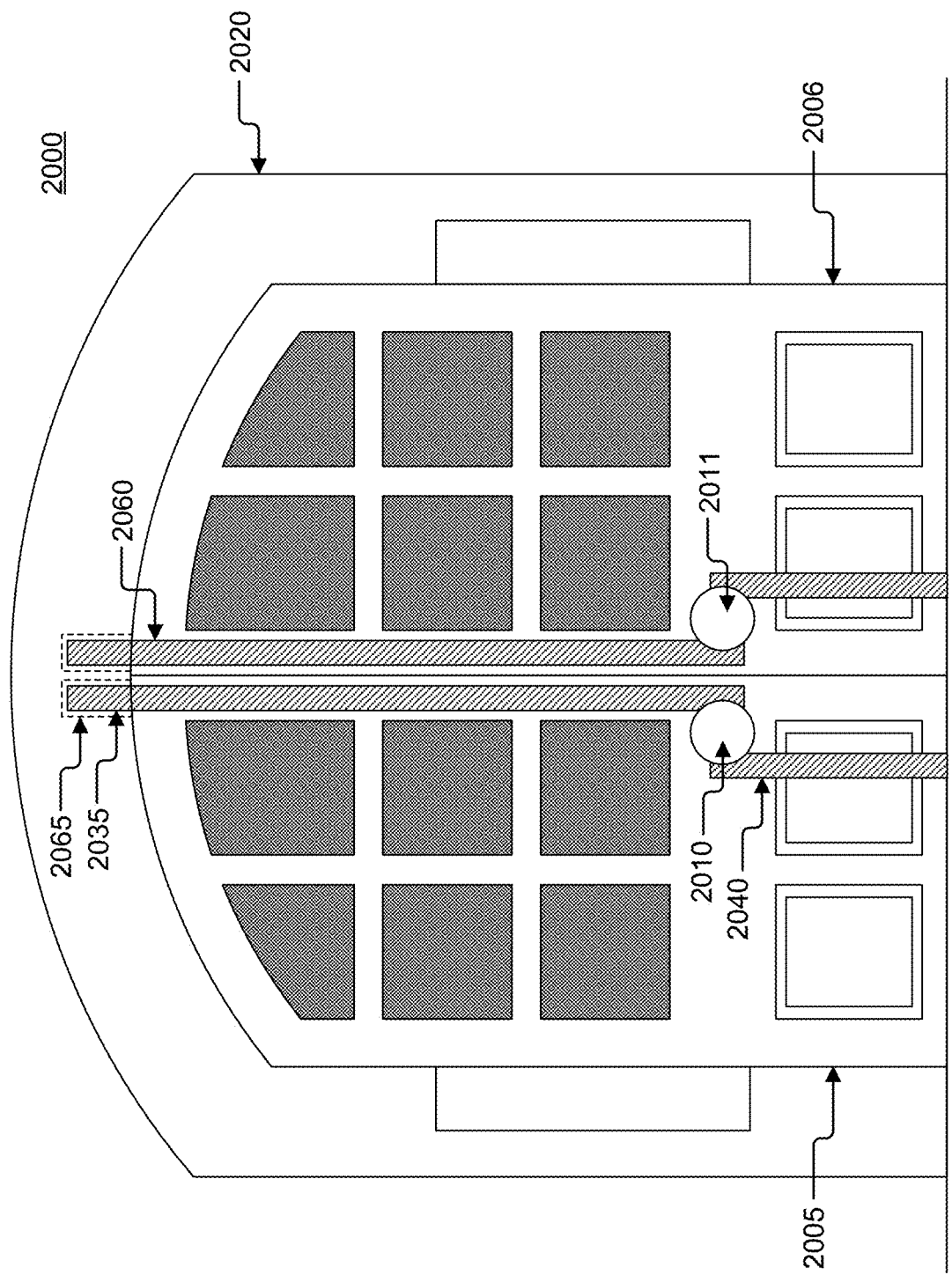
FIG. 20 illustrates a front view of an exemplary pet door comprising a locking mechanism, according to some embodiments of the present disclosure.

Referring now to FIG. 20, an exemplary pet door 2000 comprising a locking mechanism 2035 is illustrated. In some aspects, the locking mechanism 2035 may be alterable between a locked state and an unlocked state. In some embodiments, the locking mechanism 2035 may comprise at least one latch 2060. In some implementations, the pet door 2000 may comprise at least one frame 2020. In some aspects, the frame 2020 may comprise at least one latch receiver 2065.

In some embodiments, at least one latch 2060 may be inserted into at least one latch receiver 2065 to configure at least one door 2005, 2006 of the pet door 2000 in a locked position. In some aspects, an additional latch 2060 may be removably inserted into at least a portion of at least one positioning mechanism 2040. In some implementations, at least one knob 2010, 2011 may be configured to facilitate translational movement of two or more latches 2060 in a substantially simultaneous fashion. In some aspects, the doors 2005, 2006 may be substantially prevented from opening when at least one of the latches 2060 is at least partially received by the latch receiver 2065, the positioning mechanism 2040, or both.

In some embodiments, the positioning mechanism 2040 may be configured to facilitate alignment of the locking mechanism 2035 for the purpose of directing the insertion of at least one latch 2060 into at least one latch receiver 2065. In some implementations, the positioning mechanism 2040 may function substantially as a latch receiver insomuch as the positioning mechanism 2040 may comprise a cavity or similar at least partially open structure wherein at least one latch 2060 may be removably inserted.

In some aspects, two or more latches 2060 may be secured in their respective locked states in a substantially subsequent fashion. For example, after the doors 2005, 2006 have been moved to their closed positions, at least partial rotation of the knob 2010, 2011 in at least one direction may instigate the extension of a first latch 2060 into a positioning mechanism 2040. After securing the first latch 2060 in the positioning mechanism 2040, the knob 2010, 2011 may be rotated further, thereby facilitating extension of a second latch 2060 into a latch receiver 2065. In some embodiments, the use of two or more latches 2060 may improve the security of the pet door 2000.

In some implementations, the use of two or more latches 2060 may prevent damage to the pet door 2000 from an attempted forced entrance by distributing the applied forces across two or more locations and helping to prevent unauthorized rotation of the knob 2010, 2011 and/or hinge(s) of the door 2005, 2006 via an excessive amount of applied force when the locking mechanism 2035 is in the locked state, such as, for example and not limitation, when the knob 2010, 2011 may comprise a keyed lock or similar mechanism.

In some aspects, when the pet door 2000 may comprise two or more doors 2005, 2006, each door 2005, 2006 may be secured via a separate locking mechanism 2035. In some implementations, the separate securing of each door 2005, 2006 may allow a user to selectively secure one or both of doors 2005, 2006 in place. In some embodiments, the two or more doors 2005, 2006 may be secured together via at least one locking mechanism 2035.

As an example, the locking mechanism 2035 may operate in conjunction with at least one of the knobs 2010, 2011 to configure the doors 2005, 2006 of the pet door 2000 in a locked position. In some aspects wherein the pet door 2000 may comprise a pair of knobs 2010, 2011, a first knob 2010 may be configured to rotate in at least one direction to secure the doors 2005, 2006 to each other via at least one latch that may secure the rotatable knob 2010 to a second, fixed knob 2011.

Figure 21:
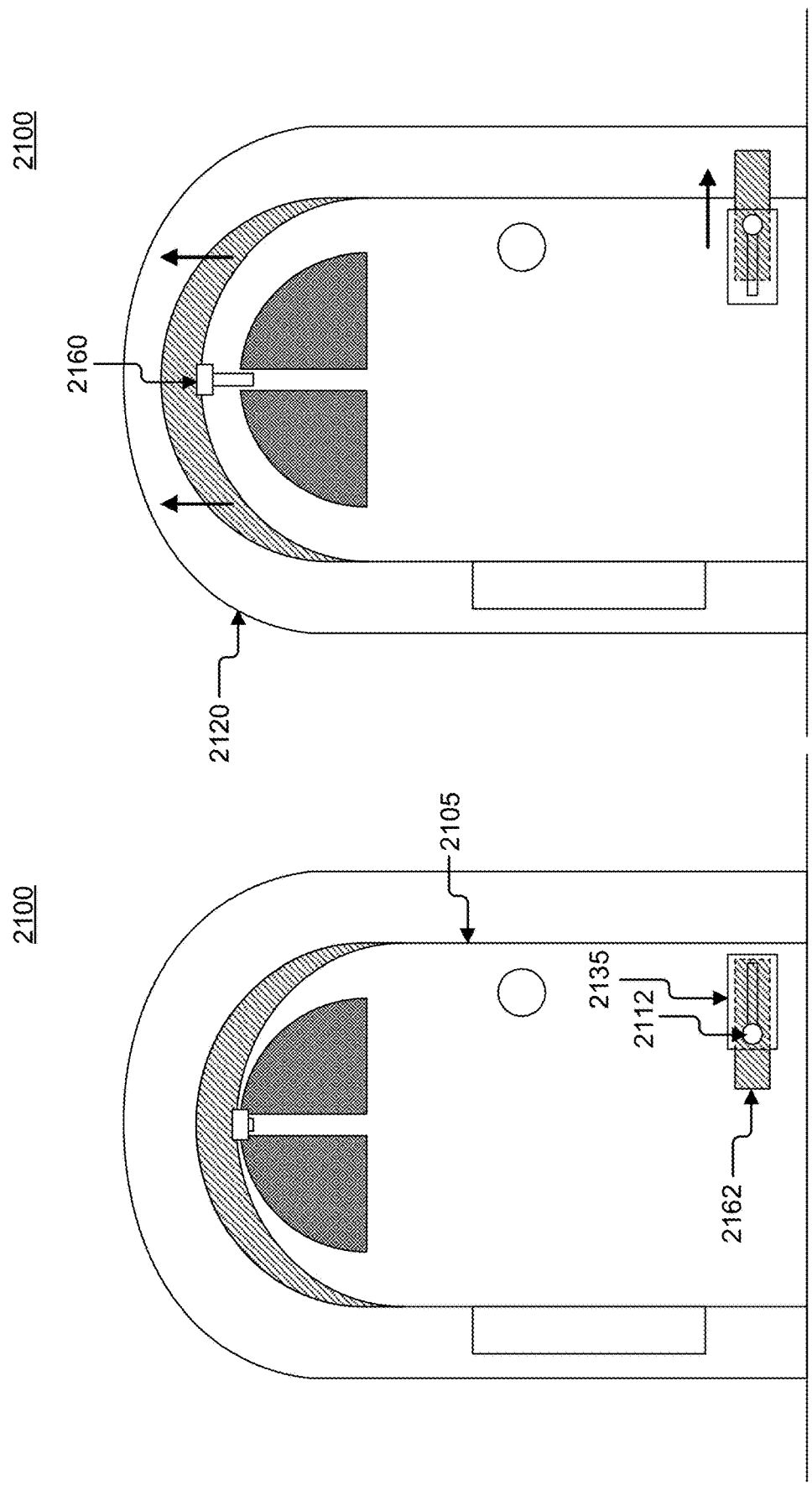
FIG. 21A illustrates a front view of an exemplary pet door comprising a locking mechanism, according to some embodiments of the present disclosure.
FIG. 21B illustrates a front view of an exemplary pet door comprising a locking mechanism, according to some embodiments of the present disclosure.

Referring now to FIGS. 21A-B, an exemplary pet door 2100 comprising a locking mechanism 2135 is illustrated. In some embodiments, the pet door 2100 may comprise at least one latch 2160. In some aspects, the pet door 2100 may comprise at least one locking mechanism 2135. In some implementations, the at least one locking mechanism 2135 may be alterable between a locked state and an unlocked state. In some implementations, the pet door 2100 may comprise at least one frame 2120.

In some embodiments, the latch 2160 may be slidable in at least one direction within a housing or along a track such that a distal end of the latch 2160 may be configured to interact with at least a portion of the frame 2120 to alter at least one door 2105 of the pet door 2100 between a locked position and an unlocked position. In some aspects, when at least one hinge of the door 2105 may be configured to allow for multidirectional movement of the door 2105, the latch 2160 may be configured to allow a user to selectively restrict one or more directions of movement of the door 2105. In some embodiments, the door 2105 may be substantially prevented from opening when the latch 2160 is moved to an extended state that may allow at least a portion of a distal end of the latch 2160 to make at least partial physical contact with at least a portion of the frame 2120.

In some implementations, the door 2105 may comprise at least one locking mechanism 2135 configured to interact with at least a portion of the frame 2120. In some aspects, the locking mechanism 2135 may comprise a substantially rigid elongated securing member 2162 that may be alterable between a retracted unlocked state and an extended locked state via at least one manipulation element 2112 protruding outwardly from an exterior surface of the securing member 2162.

In some embodiments, the locking mechanism 2135 may be alterable between the unlocked state and the locked state by sliding in at least two generally opposing directions within a housing or along a track, wherein the manipulation element 2112 may extend through at least one slit, slot, aperture, or similar opening within at least one surface of the housing or track. In some implementations, a distal end or distal portion of the securing member 2662 may make at least partial physical contact with at least a portion of the frame 2120 when the locking mechanism 2135 is in the locked state to substantially prevent the door 2105 from opening by hitting the frame 2120 and stopping rotation of the at least one hinge of the door 2105.

As an illustrative example, a latch 2160, a locking mechanism 2135, or both, configured within or upon a door 2105, may be physically manipulated by a user to an extended or locked state from a retracted or unlocked state and, as the door 2105 begins to rotate about the at least one hinge to open, a distal portion or distal end of the latch 2160 and/or securing member 2162 of the locking mechanism 2135 may physically contact the frame 2120, thereby preventing further movement of the door 2105 to the open position.

In some aspects, the door 2105 may be configured to rotate about the at least one hinge in at least two directions, and the door 2105 may comprise at least one latch 2160 and/or at least one locking mechanism 2135 on one side of the door 2105. In such aspects, the latch 2160 and/or locking mechanism 2135 may be adjusted to an extended or locked state, such that a distal portion or distal end of the latch 2160 and/or securing member 2162 of the locking mechanism 2135 may make at least partial physical contact with at least a portion of one side of the frame 2120 when movement of the door 2105 is attempted in a first direction, while allowing for free movement of the door 2105 about the at least one hinge in a second direction.

For example, a house may comprise a pet door 2100 that may comprise a door 2105 with a locking mechanism 2135 and a latch 2160 on an exterior surface of the door 2105. This configuration may allow a cat to exit an interior portion of the house through the pet door 2100 as the movement of the door may not be inhibited by the locking mechanism 2135 or the latch 2160 in that direction. However, by adjusting the locking mechanism 2135 and/or latch 2160 to an extended or locked position on the exterior surface of the door, a distal end or distal portion of the extended latch 2160 and/or securing member 2162 of the locking mechanism 2135 may physically contact the frame 2120 and prevent the door 2105 from opening in the opposite direction when the cat may attempt to reenter the home.

In some non-limiting exemplary embodiments, the pet door 2100 may further comprise at least one second locking mechanism 2135, latch 2160, or both on an interior surface of the pet door 2100 to prevent the door 2105 from moving in either direction when the locking mechanism(s) 2135 and/or latch(es) 2160 on both sides of the door 2105 may be in their respective extended or locked states.

Figure 22:
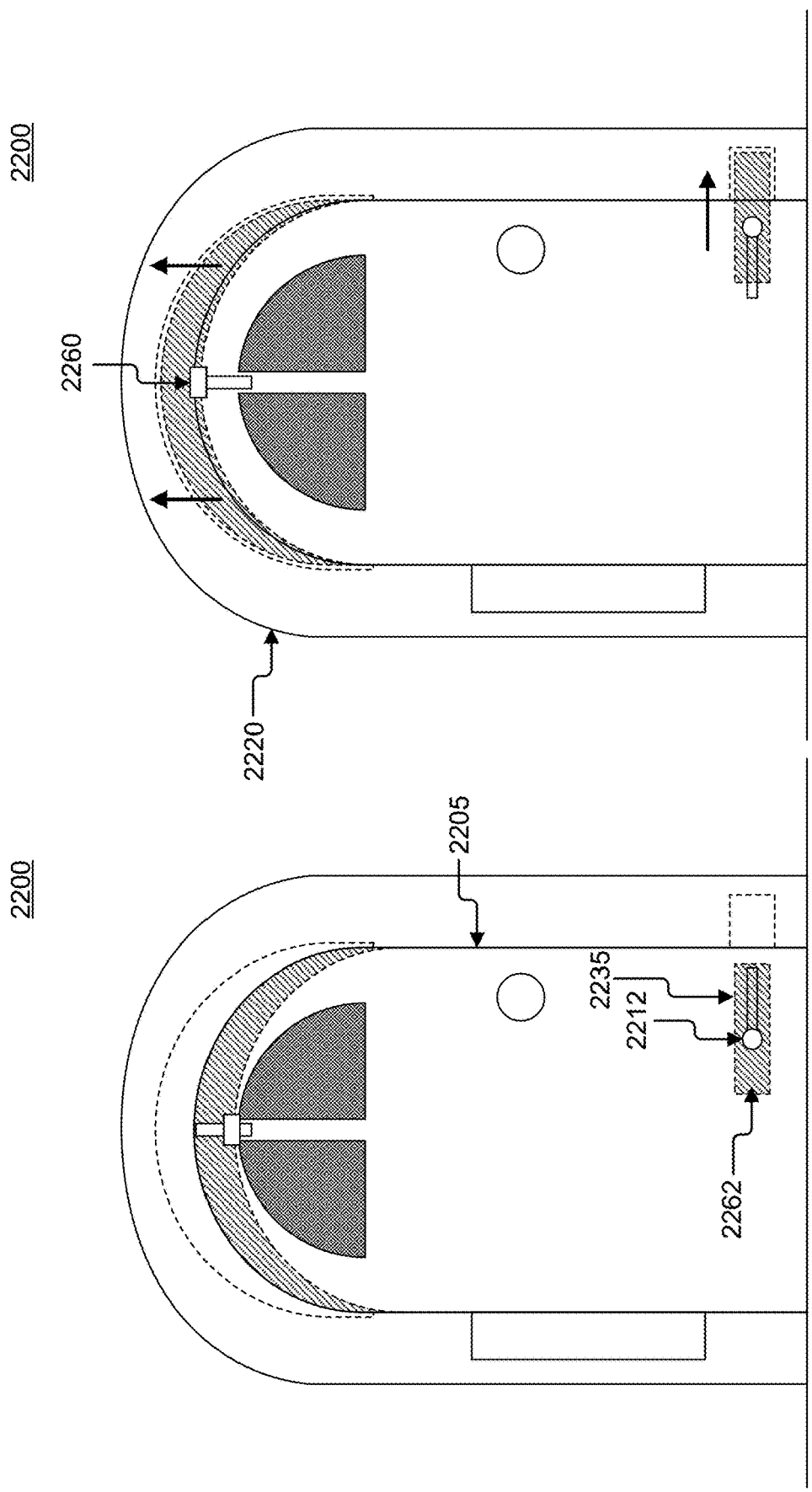
FIG. 22A illustrates a front view of an exemplary pet door comprising a locking mechanism, according to some embodiments of the present disclosure.
FIG. 22B illustrates a front view of an exemplary pet door comprising a locking mechanism, according to some embodiments of the present disclosure.

Referring now to FIGS. 22A-B, an exemplary pet door 2200 comprising a locking mechanism 2235 is illustrated. In some embodiments, the pet door 2200 may comprise at least one latch 2260. In some aspects, the pet door 2200 may comprise at least one locking mechanism 2235. In some implementations, the at least one locking mechanism 2235 may be alterable between a locked state and an unlocked state. In some embodiments, the pet door 2200 may comprise at least one frame 2220.

In some embodiments, the latch 2260 may be slidable in at least one direction within a housing or along a track such that at least a portion of a distal end of the latch 2260 may be configured to interact with at least a portion of the frame 2200 to alter at least one door 2205 of the pet door 2200 between a locked position and an unlocked position. In some aspects, the pet door 2200 may comprise at least one hinge that may facilitate rotational movement of the door 2205 about at least one axis in at least two directions.

In such aspects, the latch 2260 may be configured to restrict movement of the door 2205 in at least one direction when the latch 2260 is altered to an extended state that may allow at least a portion of a distal end of the latch 2260 to make at least partial physical contact with at least a portion of the frame 2220. In some embodiments, the door 2205 may be substantially prevented from opening when the latch 2260 is moved to an extended state that may allow at least a portion of a distal end of the latch 2260 to make at least partial physical contact with at least a portion of the frame 2220.

In some implementations, the door 2205 may comprise at least one locking mechanism 2235. In some aspects, the locking mechanism 2235 may comprise at least one substantially rigid elongated securing member 2262 that may be slidable within a housing or along a track within an internal portion of the door 2205 such that the locking mechanism 2235 may be alterable between a locked state with an additional extended securing member 2262 and an unlocked state with a retracted securing member 2262. In some embodiments, a distal end or distal portion of the securing member 2262 may interact with an interior portion of the frame 2220 when the locking mechanism 2235 is in the locked state.

In some aspects, the locking mechanism 2235 may substantially prevent opening of the door 2205 when in the locked state by physically contacting the frame 2220 and preventing substantial rotation of the at least one hinge. In some embodiments, the securing member 2262 may be slidable via at least one manipulation element 2212 extending from at least a portion of the securing member 2262 through a slot, slot, channel, aperture, or similar opening in one or more surfaces of the housing, track, and/or the door 2205.

Figure 23:
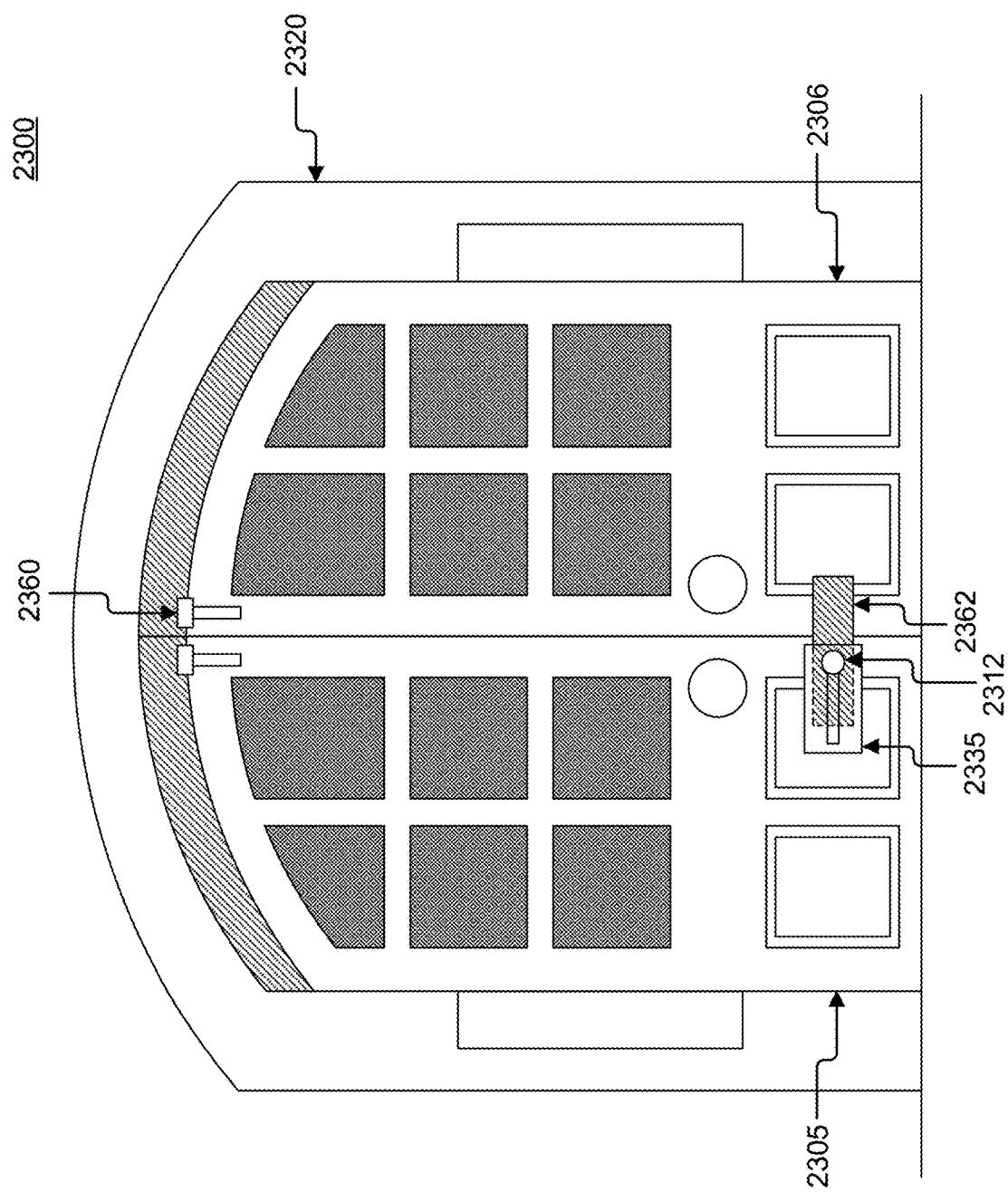
FIG. 23 illustrates a front view of an exemplary pet door comprising a locking mechanism, according to some embodiments of the present disclosure.

Referring now to FIG. 23, an exemplary pet door 2300 comprising a locking mechanism 2335 is illustrated. In some embodiments, the pet door 2300 may comprise at least one latch 2360. In some aspects, the pet door 2300 may comprise at least one locking mechanism 2335. In some implementations, the locking mechanism 2335 may be alterable between a locked state and an unlocked state. In some embodiments, the pet door 2300 may comprise at least one frame 2320. In some aspects, the pet door 2300 may comprise at least two doors 2305, 2306.

In some embodiments, one or more doors 2305, 2306 of the pet door 2300 may comprise at least one latch 2360 that may be slidable within a housing or along a track configured upon one or more surfaces of the door(s) 2305, 2306 between an extended state and a retracted state, such that a distal end or distal portion of each latch 2360 may interact with at least a portion of the frame 2320 to alter the associated door(s) 2305, 2306 of the pet door 2300 between a locked position and an unlocked position, respectively.

In some aspects, each door 2305, 2306 of the pet door 2300 may comprise at least one hinge that may allow each of the doors 2305, 2306 to rotate about at least one axis in at least one direction. In some implementations, each latch 2360 may be configured to restrict movement of the associated door 2305, 2306 in one or more directions when the latch 2360 is in the extended state. In some embodiments, a door 2305, 2306 may be substantially prevented from opening when the latch 2360 associated therewith may be in the extended state. In some aspects, each door 2305, 2306 of the pet door 2300 may comprise at least one latch 2360 so that a user may selectively secure each door 2305, 2306 in a locked state independently of other doors 2305, 2306.

In some implementations, a first door 2305 of the pet door 2300 may comprise at least one locking mechanism 2335 that may comprise at least one substantially rigid elongated securing member 2362 that may be slidable within a housing or upon a track configured upon at least one surface of one or more doors 2305, 2306 between an unlocked state wherein the securing member 2362 is retracted and a locked state wherein the securing member 2362 is extended, such that a distal end or distal portion of the securing member 2362 may at least partially interact with at least a portion of a second door 2306.

In some embodiments, the securing member 2362 may be slidable via at least one manipulation element 2312 extending from at least a portion of the securing member 2362 through a slot, slot, channel, aperture, or similar opening in one or more surfaces of the housing or track of the locking mechanism 2335. In some aspects, the locking mechanism 2335 may substantially couple the first door 2305 to the second door 2306 when the locking mechanism 2335 is in the locked state to prevent the doors 2305, 2306 from opening and thereby preventing substantial rotation of the at least one hinge of each door 2305, 2306.

Figure 24:
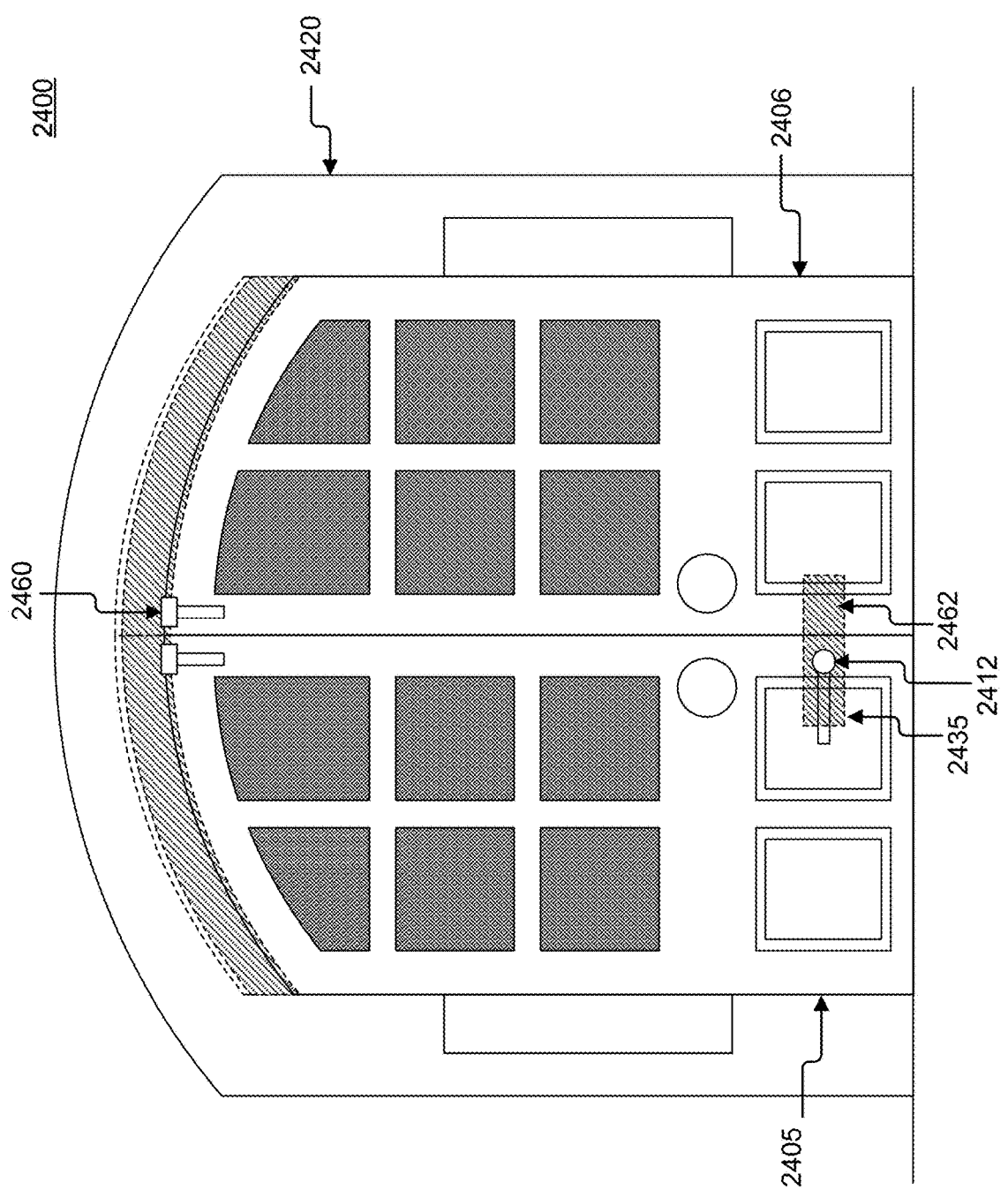
FIG. 24 illustrates a front view of an exemplary pet door comprising a locking mechanism, according to some embodiments of the present disclosure.

Referring now to FIG. 24, an exemplary pet door 2400 comprising a locking mechanism 2435 is illustrated. In some embodiments, the pet door 2400 may comprise at least one latch 2460. In some aspects, the pet door 2400 may comprise at least one locking mechanism 2435. In some implementations, the locking mechanism 2435 may be alterable between a locked state and an unlocked state. In some embodiments, the pet door 2400 may comprise at least one frame 2420. In some aspects, the pet door 2400 may comprise at least two doors 2405, 2406.

In some embodiments, one or more doors 2405, 2406 of the pet door 2400 may comprise at least one latch 2460 that may be slidable within a housing or along a track within one or more internal portions of the door(s) 2405, 2406 between an extended state and a retracted state, such that a distal end or distal portion of each latch 2460 may interact with at least a portion of the frame 2420 to alter the associated door(s) 2405, 2406 of the pet door 2400 between a locked position and an unlocked position, respectively. In some aspects, each door 2405, 2406 of the pet door 2400 may comprise at least one hinge that may allow each of the doors 2405, 2406 to rotate about at least one axis in at least one direction. In some implementations, each latch 2460 may be configured to restrict movement of the associated door 2405, 2406 in one or more directions when the latch 2460 is in the extended state. In some embodiments, a door 2405, 2406 may be substantially prevented from opening when the latch 2460 associated therewith may be in the extended state. In some aspects, each door 2405, 2406 of the pet door 2400 may comprise at least one latch 2460 so that a user may selectively secure each door 2405, 2406 in a locked state independently of other doors 2405, 2406.

In some implementations, a first door 2405 of the pet door 2400 may comprise at least one locking mechanism 2435 that may comprise at least one substantially rigid elongated securing member 2462 that may be slidable within a housing or upon a track configured within one or more internal portions of one or more doors 2405, 2406 between an unlocked state wherein the securing member 2462 is retracted and a locked state wherein the securing member 2462 is extended, such that a distal end or distal portion of the securing member 2462 may at least partially interact with at least a portion of a second door 2406.

In some embodiments, the securing member 2462 may be slidable via at least one manipulation element 2412 extending from at least a portion of the securing member 2462 through a slot, slot, channel, aperture, or similar opening in one or more surfaces of one or more housings, tracks, and/or doors 2405, 2406. In some aspects, the locking mechanism 2435 may substantially couple the first door 2405 to the second door 2406 when the locking mechanism 2435 is in the locked state to prevent the doors 2405, 2406 from opening and thereby preventing substantial rotation of the at least one hinge of each door 2405, 2406.

Figure 25A:
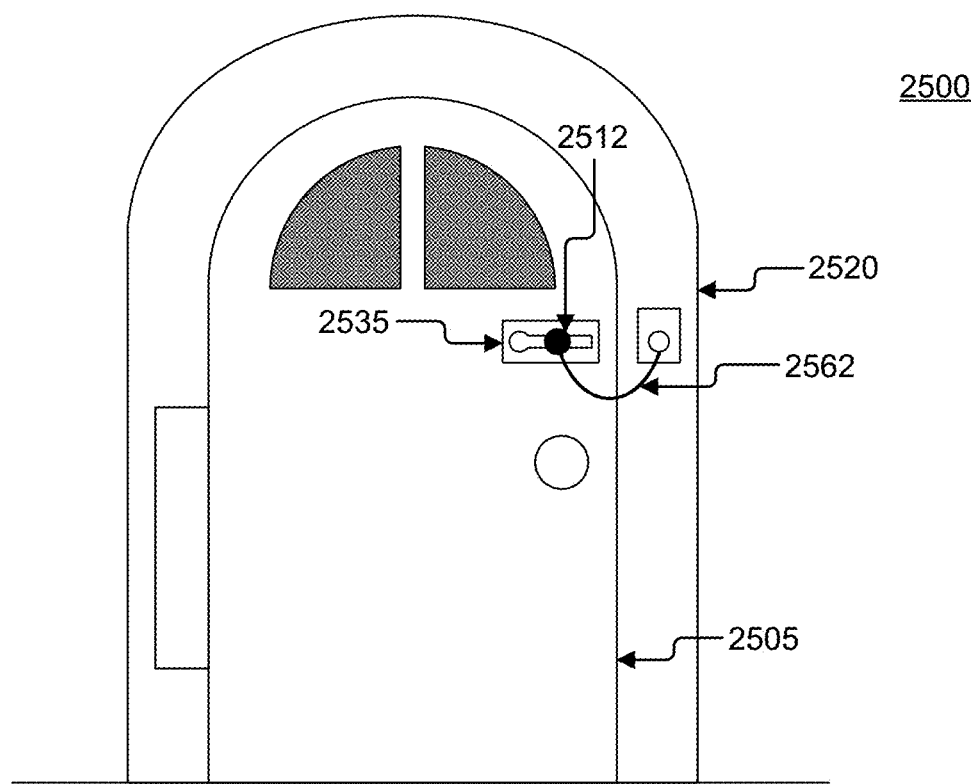
FIG. 25A illustrates a front view of an exemplary pet door comprising a locking mechanism, according to some embodiments of the present disclosure.
Figure 25B:
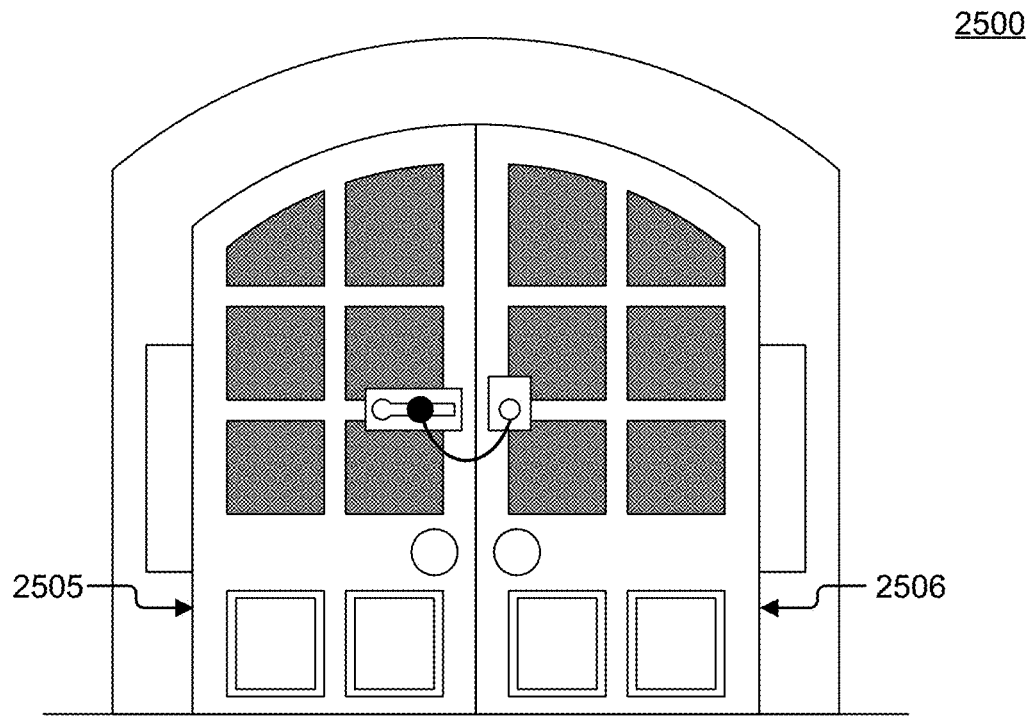
FIG. 25B illustrates a front view of an exemplary pet door comprising a locking mechanism, according to some embodiments of the present disclosure.

Referring now to FIGS. 25A-B, an exemplary pet door 2500 comprising a locking mechanism 2535 is illustrated. In some aspects, the locking mechanism 2535 may be alterable between a locked state and an unlocked state. In some embodiments, the locking mechanism 2535 may comprise at least one latch 2560. In some implementations, the pet door 2500 may comprise at least one frame 2520. In some aspects, the pet door 2500 may comprise at least one door 2505, 2506.

In some embodiments, the locking mechanism 2535 may comprise a chain lock or similar structure. In some aspects, the locking mechanism 2535 may comprise a housing affixed to a surface of the door 2505 and a base affixed to a portion of the frame 2520. In some implementations, an at least partially flexible elongated securing member 2562, such as, by way of example and not limitation, a chain, cable, rope, or similar element, may extend from or be secured to the base of the locking mechanism 2535. In some embodiments, an exposed distal end of the elongated member may comprise a manipulation element 2512 affixed thereto. In some aspects, the manipulation element 2512 may be removably secured within the housing of the locking mechanism 2535 such that the housing, and therefore the door 2505, may be tethered to the base, and therefore the frame 2520.

By way of example and not limitation, in some implementations the manipulation element 2512 may be removably receivable by the housing by being inserted into an aperture or opening on or within at least one surface of the housing. In some aspects, the cross section of the opening may be substantially similar to the cross section of a distal end of the manipulation element 2512. The manipulation element 2512 may then be slidable within a narrow channel or groove within the housing and adjacent and connected to the opening, wherein at least a portion of the chancel or groove comprises a cross section that is substantially similar to the cross section of the body of the manipulation element 2512 (which is smaller than the cross section of the opening and distal end of the manipulation element 2512) such that sliding the manipulation element 2512 away from the opening may configure the manipulation element 2512 in a position within a narrow portion of the channel or groove that may substantially prevent the manipulation element 2512 from being removed from the housing. In some implementations, the manipulation element 2512 may be slid back to the original larger opening in order to be removed from the housing.

In some aspects, the pet door 2500 may comprise at least two doors 2505, 2506. In such aspects, the housing of the locking mechanism 2535 may be affixed to a first door 2505 and the base of the locking mechanism 2535 may be affixed to a second door 2506 such that when the manipulation element 2512 of the locking mechanism 2535 is secured within the housing, the locking mechanism 2535 may comprise a locked state that may effectively tether the first door 2505 to the second door 2506.

Referring now to FIGS. 26A-B, an exemplary pet door 2600 comprising a locking mechanism 2635 is illustrated. In some aspects, the pet door 2600 may comprise at least one locking mechanism 2635. In some implementations, the locking mechanism 2635 may alterable between a locked state and an unlocked state. In some embodiments, the locking mechanism 2635 may comprise at least one manipulation element 2612. In some implementations, the pet door 2600 may comprise at least one door 2605 and at least one frame 2620. In some aspects, the locking mechanism 2635 may comprise at least one securing member 2662. In some aspects, at least a portion of the securing member 2662 may be configured to interact with at least a portion of the frame 2620 to place the locking mechanism 2635 in a locked state and substantially prevent opening of the at least one door 2605.

In some embodiments, the locking mechanism 2635 may comprise at least one housing affixed to a surface of the door 2605 or integrated within an interior portion of the door 2605. In some implementations, the securing member 2662 may comprise a substantially rigid element configured to slidably achieve translational movement within the housing that may allow at least a portion of a distal end of the securing member 2662 to at least partially interact with at least a portion of the frame 2660. In some aspects, the locking mechanism 2635 may comprise at least one base affixed to a surface of the frame 2620 or integrated within an interior portion of the frame 2620. In some embodiments, at least a portion of the distal end of the securing member 2662 may be slidably received within an opening, recess, channel, or similar structure within a side of the base of the locking mechanism 2635 proximate to the door 2605 to place the locking mechanism 2635 in a locked state, such that the securing member 2662 may physically contact at least a portion of the base when movement of the door 2605 may be attempted.

In some aspects, slidable movement of the securing member 2662 may be facilitated by at least one protruding manipulation element 2612 extending from a portion of the securing member 2662 through at least one channel, groove, or similar open structure within a surface of the housing of the locking mechanism 2635. In some implementations, a user may be able to manipulate the manipulation element 2612 to slide the securing member 2662 to a desired position and adjust the locking mechanism 2635 between the locked state and an unlocked state wherein the door 2605 may be free to move without any portion of the securing member 2662 physically contacting any portion of the frame 2620 or base of the locking mechanism 2635 enough to substantially prohibit substantial movement of the door 2605.

Figure 27:
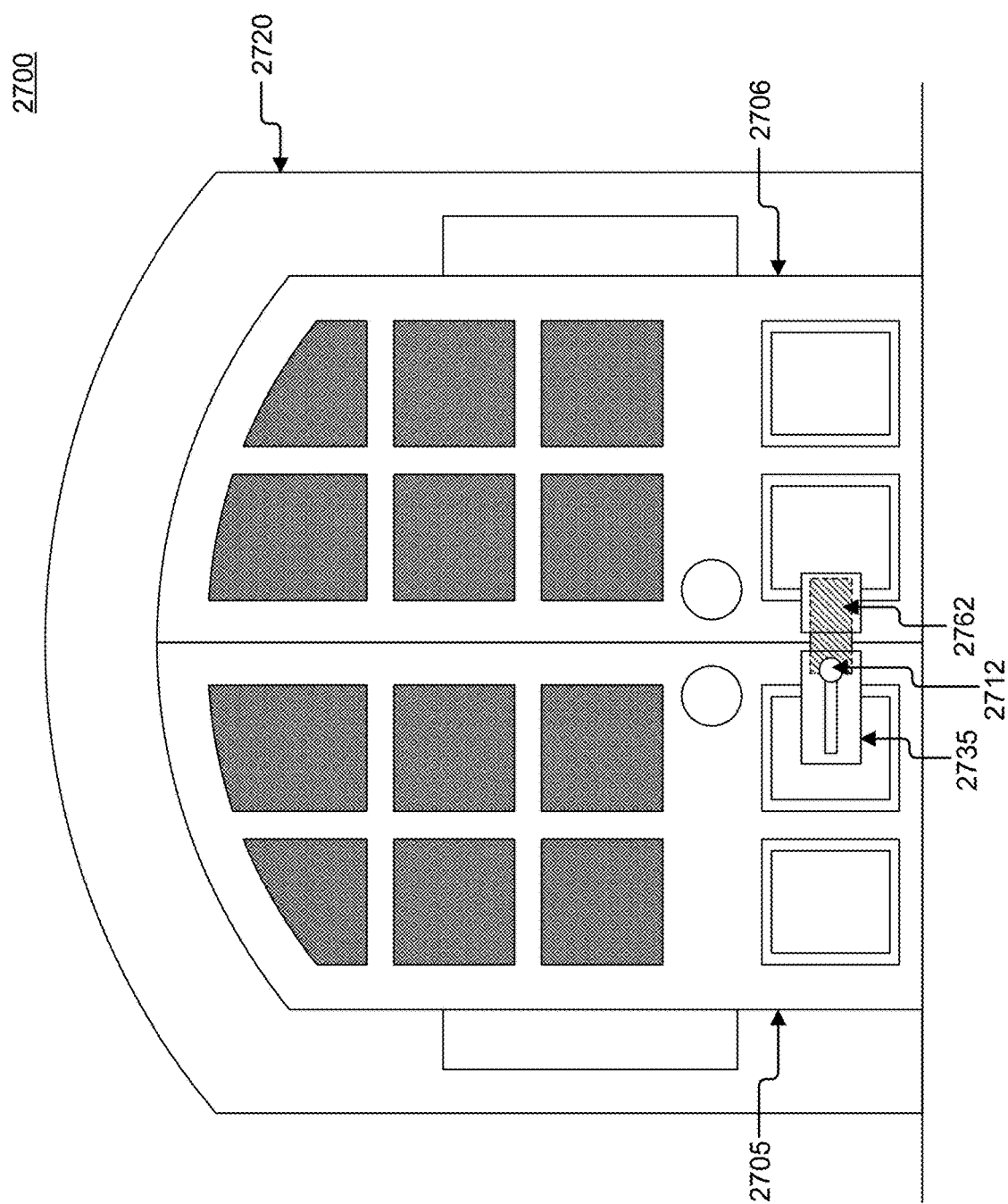
FIG. 27 illustrates a front view of an exemplary pet door comprising a locking mechanism, according to some embodiments of the present disclosure.

Referring now to FIG. 27, an exemplary pet door 2700 comprising a locking mechanism 2735 is illustrated. In some aspects, the pet door 2700 may comprise at least one locking mechanism 2735. In some implementations, the locking mechanism 2735 may be alterable between a locked state and an unlocked state. In some embodiments, the locking mechanism 2735 may comprise at least one manipulation element 2712. In some implementations, the pet door 2700 may comprise at least one frame 2720. In some embodiments, the locking mechanism 2735 may comprise at least one securing member 2762. In some aspects, the pet door 2700 may comprise a first door 2705 and a second door 2706. In some embodiments, at least a portion of the securing member 2762 may be configured to interact with at least a portion of the first door 2705 and at least a portion of the second door 2706 to place the locking mechanism 2735 in a locked state and substantially prevent opening of the doors 2705, 2706.

In some aspects, the locking mechanism 2735 may provide a securing point between the first door 2705 and the second door 2706 that may provide sufficient rigidity to keep the double set of doors 2705, 2706 closed. In some implementations, the securing member 2762 may extend from the first door 2705 to the second door 2707 at sufficient length to secure both doors 2705, 2706 in a closed state without risk of fracture, slip, or other non-limiting forms of mechanical failure by an excessive localized force at the center of the double doors 2705, 2706. In some embodiments, double doors 2705, 2706 may be nested into an outer frame 2720, wherein the outer frame 2720 may be at least partially embedded into a surface, such as a door or wall, as non-limiting examples.

In some implementations, double doors 2705, 2706 may comprise at least one locking mechanism 2735 wherein the doors 2705, 2706 may lock together once the doors 2705, 2706 are closed. In some embodiments, the locking mechanism 2735 may comprise at least one housing affixed to a surface of the first door 2705 or integrated within an interior portion of the first door 2705. In some implementations, the securing member 2762 may comprise a substantially rigid element configured to slidably achieve translational movement within the housing that may allow at least a portion of a distal end of the securing member 2762 to at least partially interact with at least a portion of the second door 2706.

In some aspects, the locking mechanism 2735 may comprise at least one base affixed to a surface of the second door 2706 or integrated within an interior portion of the second door 2706. In some embodiments, at least a portion of the distal end of the securing member 2762 may be slidably received within an opening, recess, channel, or similar open structure within a side of the base of the locking mechanism 2735 proximate to the first door 2705 to place the locking mechanism 2735 in a locked state.

In some aspects, slidable movement of the securing member 2762 may be facilitated by at least one protruding manipulation element 2712 extending from a portion of the securing member 2762 through at least one channel, groove, or similar open structure within a surface of the housing of the locking mechanism 2735. In some implementations, a user may be able to manipulate the manipulation element 2712 to slide the securing member 2762 to a desired position and adjust the locking mechanism 2735 between the locked state and an unlocked state wherein at least one of the doors 2705, 2706 may be free to move without any portion of the securing member 2762 physically contacting any portion of the adjacent door 2705, 2706 or the base of the locking mechanism 2735 enough to substantially prohibit substantial movement of the first door 2705 and/or the second door 2706.

Figure 28:
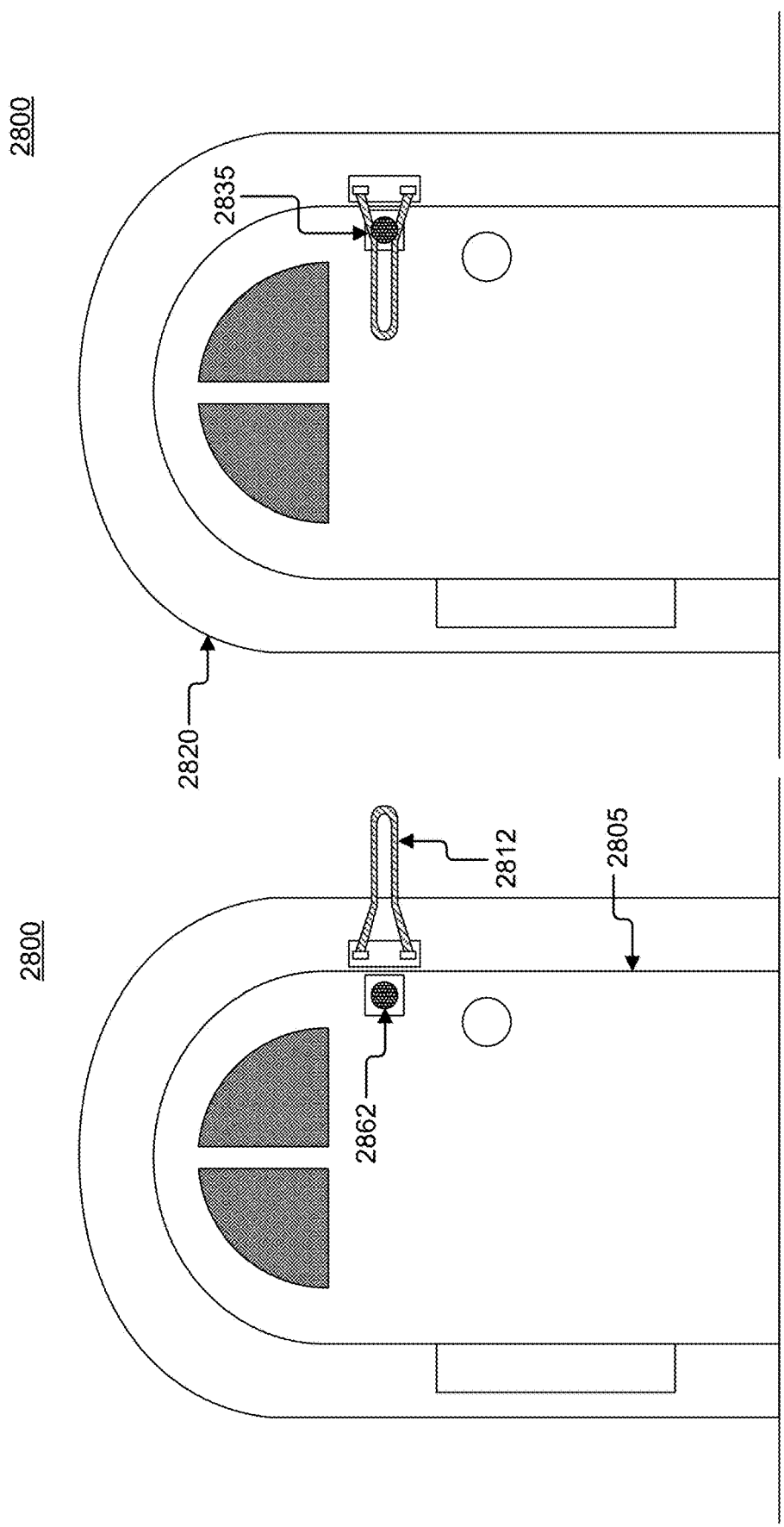
FIG. 28A illustrates a front view of an exemplary pet door comprising a locking mechanism, according to some embodiments of the present disclosure.
FIG. 28B illustrates a front view of an exemplary pet door comprising a locking mechanism, according to some embodiments of the present disclosure.

Referring now to FIGS. 28A-B, an exemplary pet door 2800 comprising a locking mechanism 2835 is illustrated. In some aspects, the pet door 2800 may comprise at least one locking mechanism 2835. In some implementations, the locking mechanism 2835 may be alterable between a locked state and an unlocked state. In some embodiments, the locking mechanism 2835 may comprise at least one manipulation element 2812. In some implementations, the pet door 2800 may comprise at least one door 2805 and at least one frame 2820. In some aspects, the locking mechanism 2835 may comprise at least one securing member 2862. In some aspects, at least a portion of the securing member 2862 may be configured to interact with at least a portion of the frame 2820 to place the locking mechanism 2835 in a locked state and substantially prevent opening of the at least one door 2805.

In some embodiments, the locking mechanism 2835 may comprise at least one housing affixed to a surface of the frame 2820. In some implementations, the manipulation element 2812 may comprise a substantially rigid element configured such that an end of the manipulation element 2812 proximate to the frame 2820 may pivot about at least one axis via at least one hinge integrated with the housing. In some aspects, the locking mechanism 2835 may comprise at least one base affixed to a surface of the door 2805 or integrated within an interior portion of the door 2805.

In some embodiments, at least one securing member 2862 may comprise a protrusion that projects outwardly from the base such that the securing member 2862 may be received by a distal end be of a slot, groove, recess, channel, track, or similar open structure within the manipulation element 2812. In some implementations, the distal end of the opening within the manipulation element 2812 may comprise a cross section that is larger than the cross section(s) other portion(s) of the opening and a distal end of the securing member 2862 may comprise a cross section that is larger than the cross section of a body of the securing member 2862 such that the securing member 2862 may be able to slide within the opening of the manipulation element 2812 while only being removably receivable by the manipulation element 2812 at the distal end of the opening thereof. This configuration may allow for partial opening of the door 2805 while preventing the door 2805 from achieving a fully opened position.

Figure 29:
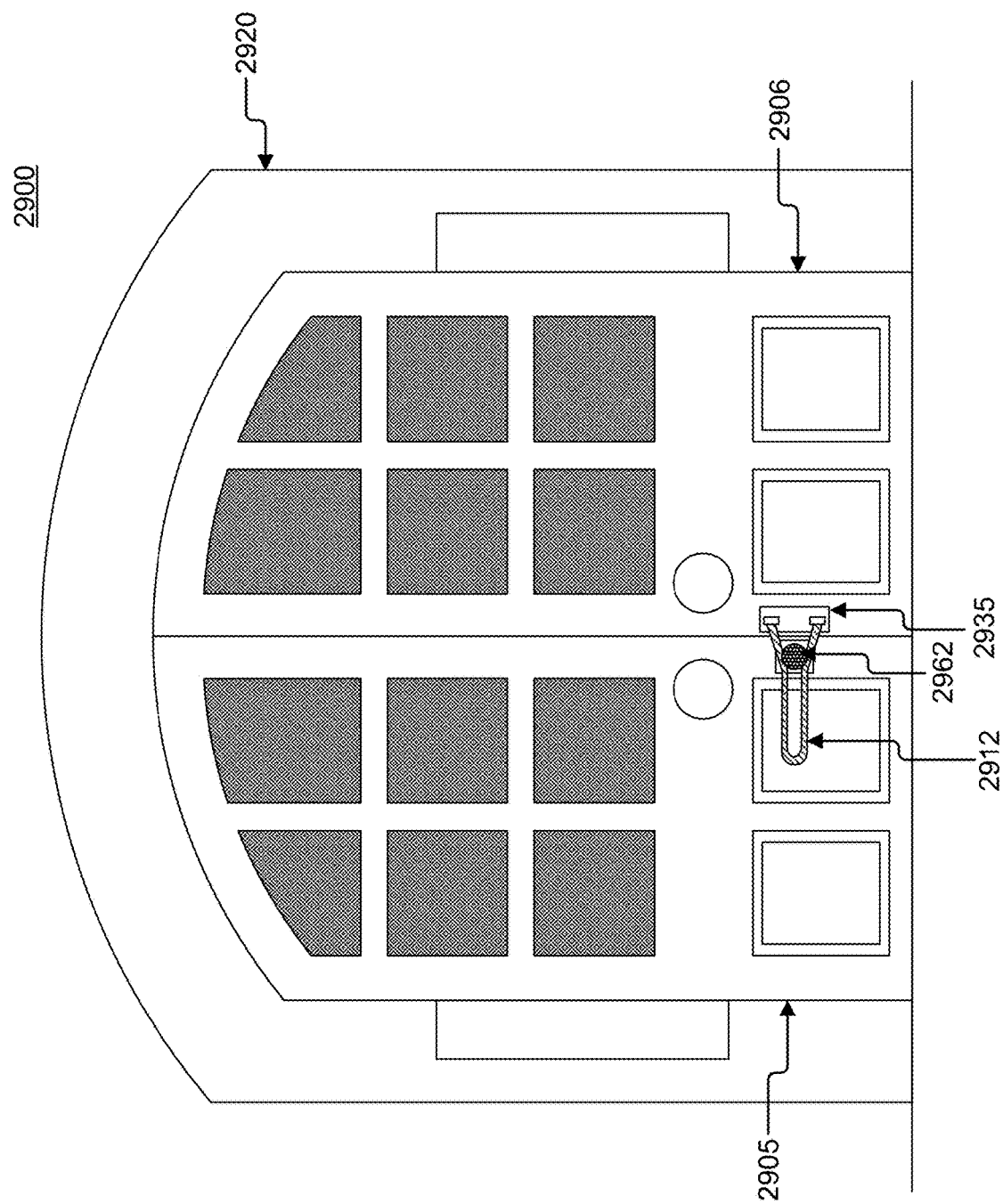
FIG. 29 illustrates a front view of an exemplary pet door comprising a locking mechanism, according to some embodiments of the present disclosure.

Referring now to FIG. 29, an exemplary pet door 2900 comprising a locking mechanism 2935 is illustrated. In some aspects, the pet door 2900 may comprise at least one locking mechanism 2935. In some implementations, the locking mechanism 2935 may be alterable between a locked state and an unlocked state. In some embodiments, the locking mechanism 2935 may comprise at least one manipulation element 2912. In some implementations, the pet door 2900 may comprise at least one frame 2920. In some embodiments, the locking mechanism 2935 may comprise at least one securing member 2962. In some aspects, the pet door 2900 may comprise a first door 2905 and a second door 2906. In some embodiments, at least a portion of the securing member 2962 may be configured to interact with at least a portion of the first door 2905 and at least a portion of the second door 2906 to place the locking mechanism 2935 in a locked state and substantially prevent opening of the doors 2905, 2906.

In some aspects, the locking mechanism 2935 may provide a securing point between the first door 2905 and the second door 2906 that may provide sufficient rigidity to keep the double set of doors 2905, 2906 closed. In some implementations, the manipulation element 2912 may extend from the second door 2906 to the first door 2905 at sufficient length to secure both doors 2905, 2906 in a closed state without risk of fracture, slip, or other non-limiting forms of mechanical failure by an excessive localized force at the center of the double doors 2905, 2906. In some embodiments, double doors 2905, 2906 may be nested into an outer frame 2920, wherein the outer frame 2920 may be at least partially embedded into a surface, such as a door or wall, as non-limiting examples. In some implementations, double doors 2905, 2906 may comprise at least one locking mechanism 2935 wherein the doors 2905, 2906 may lock together once the doors 2905, 2906 are moved to their respective closed positions.

In some embodiments, the locking mechanism 2935 may comprise at least one housing affixed to a surface of the second door 2906. In some implementations, the manipulation element 2912 may comprise a substantially rigid element configured such that an end of the manipulation element 2912 proximate to the second door 2906 may pivot about at least one axis via at least one hinge integrated with the housing. In some aspects, the locking mechanism 2935 may comprise at least one base affixed to a surface of the first door 2905 or integrated within an interior portion of the first door 2905. In some embodiments, at least one securing member 2962 may protrude or project outwardly from the base such that the securing member 2962 may be received by a distal end be of a slot, groove, recess, channel, track, or similar open structure within the manipulation element 2912.

In some implementations, the distal end of the opening within the manipulation element 2912 may be larger than the other portion(s) of the opening and a distal end of the securing member 2962 may be larger than a body of the securing member 2962 such that the securing member 2962 may be able to slide within the opening of the manipulation element 2912 while only being removably receivable by the manipulation element 2912 at the distal end of the opening thereof. This configuration may allow for partial opening of the first door 2905 relative to the second door 2906 while simultaneously preventing the first door 2905 from achieving a fully opened position relative to the second door 2906 that may, for example and not limitation, facilitate unwanted movement of at least one pet through the pet door 2900.

Figure 30:
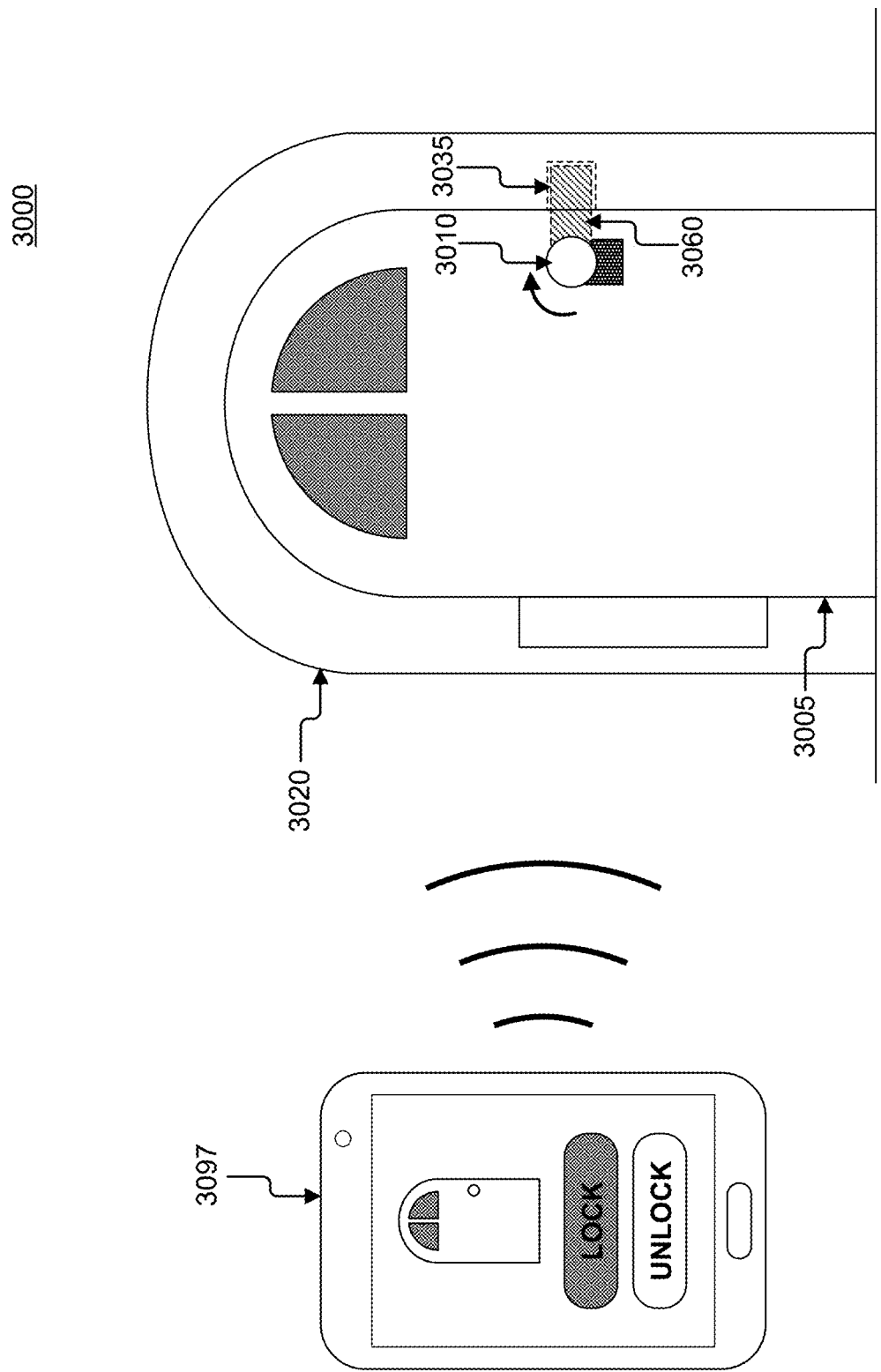
FIG. 30 illustrates a front view of an exemplary pet door comprising a locking mechanism and an external device, according to some embodiments of the present disclosure.

Referring now to FIG. 30, an exemplary pet door 3000 comprising a locking mechanism 3035 and an external device 3097 is illustrated. In some embodiments, the pet door 3000 may comprise at least one door 3005. In some implementations, the pet door 3000 may comprise at least one frame 3020. In some aspects, the pet door 3000 may comprise at least one knob 3010.

In some embodiments, the pet door 3000 may comprise at least one locking mechanism 3035. In some aspects, the locking mechanism 3035 may be alterable between a locked state and an unlocked state. In some implementations, the pet door 3000 may be configured to interface with at least one external device 3097. By way of example and not limitation, the external device 3097 may comprise at least one computing device, such as a mobile computing device, a laptop computing device, a desktop computing device, a tablet computing device, or a smartphone, as non-limiting examples. In some aspects, the external device 3097 may allow a user to open or secure the door 3005 of the pet door 3000 remotely. In some embodiments, the external device 3097 may control actuation of the locking mechanism 3035 via one or more electrical and/or electromechanical components.

For example, the external device 3097 may be communicatively coupled, either wirelessly or via one or more wired connections, to one or more controllers, wherein the one or more controllers may be communicatively coupled, either wirelessly or via one or more wired connections, to at least one motor embedded within or configured proximate to the knob 3010. This configuration may allow the external device 3097 to activate the motor(s) associated with the knob 3010 to engage rotation of the knob 3010, wherein the rotation of the knob 3010 may extend at least one securing member of the locking mechanism from the door 3005 so that at least a portion of a distal end of the securing member may make at least partial physical contact with the frame 3020 or a base structure affixed thereto or integrated therewith.

In some implementations, the electrical activation of the locking mechanism 3035 may allow the locking mechanism 3035 to perform one or more mechanical operations that may otherwise be difficult or cumbersome to instigate by manual, physical manipulation. For example, the locking mechanism 3035 may comprise a rotatable, retracted piston that, upon activation, first rotates to alignment with a receiver embedded within the frame 3020 and then extends into said receiver. Such a configuration may reduce the storage capacity of the locking mechanism 3035 within the pet door 3000 without sacrificing the strength of the locking mechanism 3035 and may also make operation of the locking mechanism 3035 easier or more convenient for users, especially those that may experience difficulty with dexterity.

In some aspects, the use of an external device 3097 may allow users to control security of the pet door 3000 remotely. For example, a family on extended vacation may be able to allow the family dog to enter the backyard during the day, while still being able to secure the pet door 3000 at night.

Figure 31:
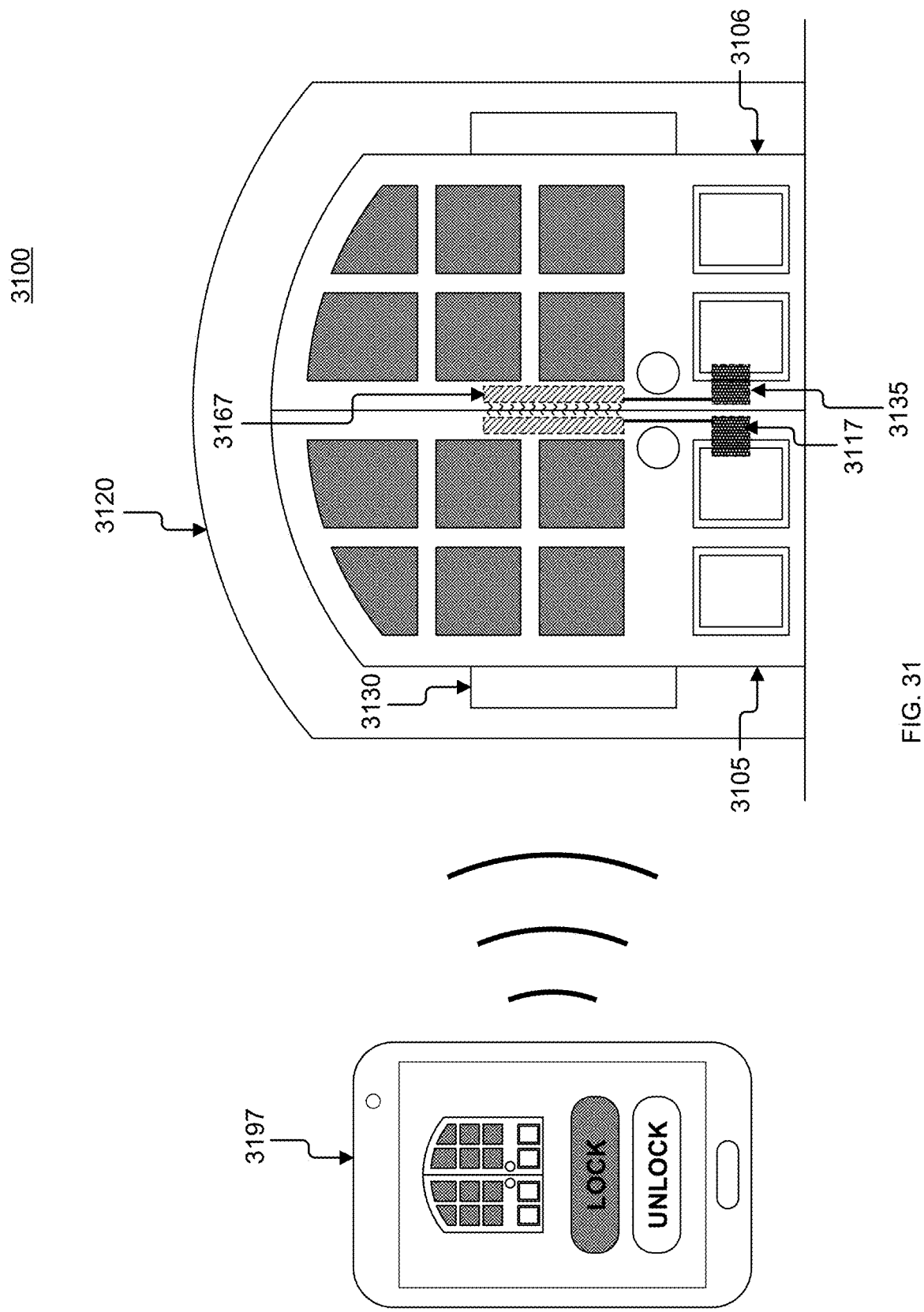
FIG. 31 illustrates a front view of an exemplary pet door comprising a locking mechanism and an external device, according to some embodiments of the present disclosure.

Referring now to FIG. 31, an exemplary pet door 3100 comprising a locking mechanism 3135 and an external device 3197 is illustrated. In some embodiments, the pet door 3100 may comprise at least one door 3105, 3106. In some implementations, the pet door 3100 may comprise at least one frame 3120. In some aspects, the pet door 3100 may comprise at least one knob 3110. In some implementations, the door(s) 3105, 3106 of the pet door 3100 may be configured to rotate about in at least one direction about at least one axis via at least one hinge 3130.

In some embodiments, the pet door 3100 may comprise at least one locking mechanism 3135. In some aspects, the locking mechanism 3135 may be alterable between a locked state and an unlocked state. In some implementations, the pet door 3100 may be configured to interface with at least one external device 3197. By way of example and not limitation, the external device 3097 may comprise at least one computing device, such as a mobile computing device, a laptop computing device, a desktop computing device, a tablet computing device, or a smartphone, as non-limiting examples. In some aspects, the external device 3197 may allow a user to open or secure the door(s) 3105, 3106 remotely. In some embodiments, the external device 3197 may control actuation of the locking mechanism 3135 via one or more electrical or electromechanical components.

In some embodiments, the locking mechanism 3135 may comprise one or more electromagnets 3167. In some implementations, using electromagnets 3167 may reduce wear from friction generated during use of the locking mechanism 3135, thereby increasing the longevity of the locking mechanism 3135 and the pet door 3100. In some aspects, electromagnets 3167 may increase the security of the pet door 3100 by decreasing physical structural vulnerabilities of the pet door 3100 that may be associated with a latch or physical lock.

In some implementations, each electromagnet 3167 may be powered by and/or controlled by one or more control units 3117, wherein each control unit 3117 may comprise at least one controller and at least one power supply. By way of example and not limitation, each power supply may comprise at least one of: a battery, at least one photovoltaic cell, an amount of alternating electrical current, and an amount of direct electrical current. In some embodiments, each control unit may be communicatively coupled to one or more electromagnets 3167 and the external device 3197 via at least one wireless or wired connection. By using the external device 3197 to alter the locking mechanism 3135 between the locked state and unlocked state from a remote location, a user may be able to control a pet's use of the pet door 3100 while being physically absent from the pet's location.

Figure 32A:
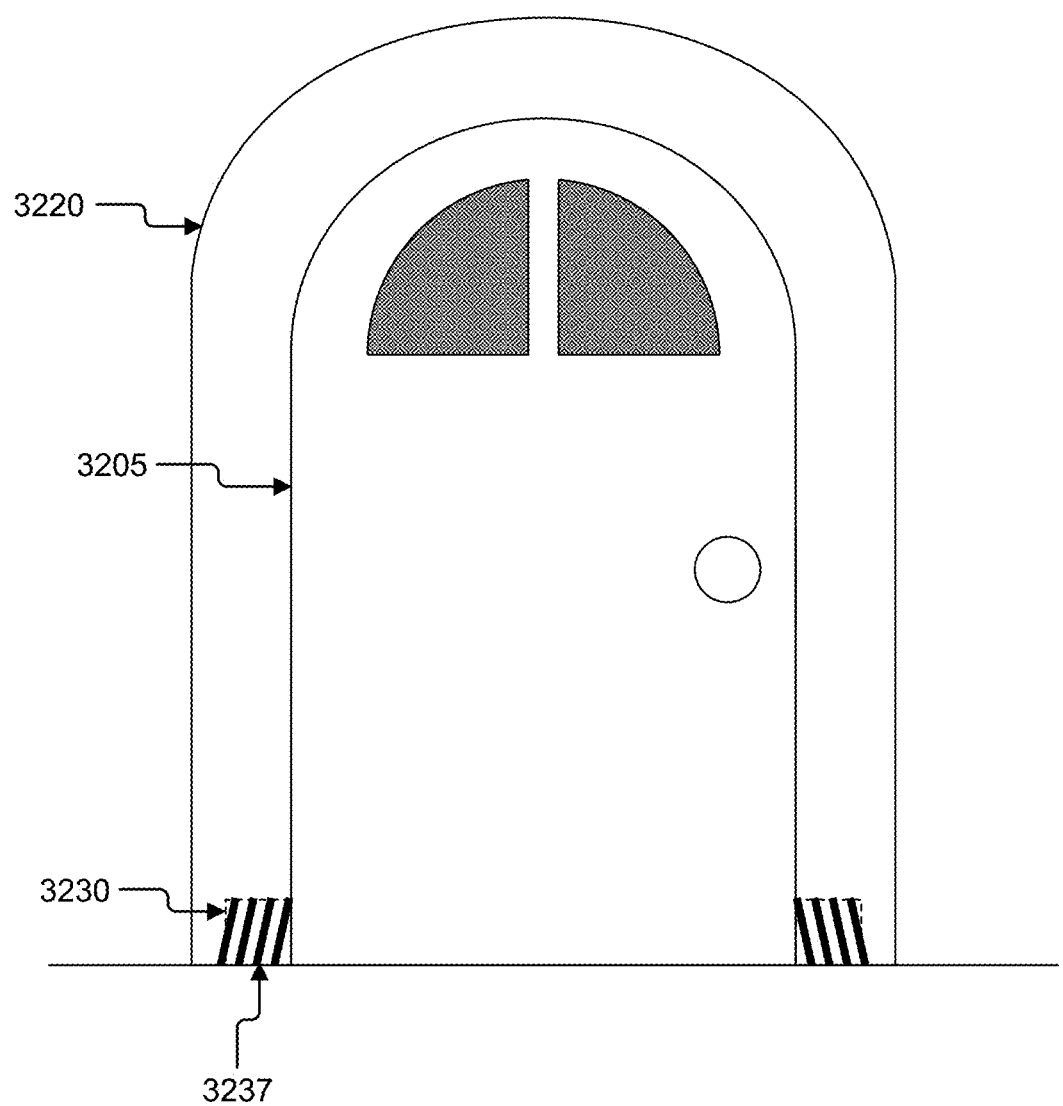
FIG. 32A illustrates a front view of an exemplary pet door comprising a locking mechanism, according to some embodiments of the present disclosure.
Figure 32C:
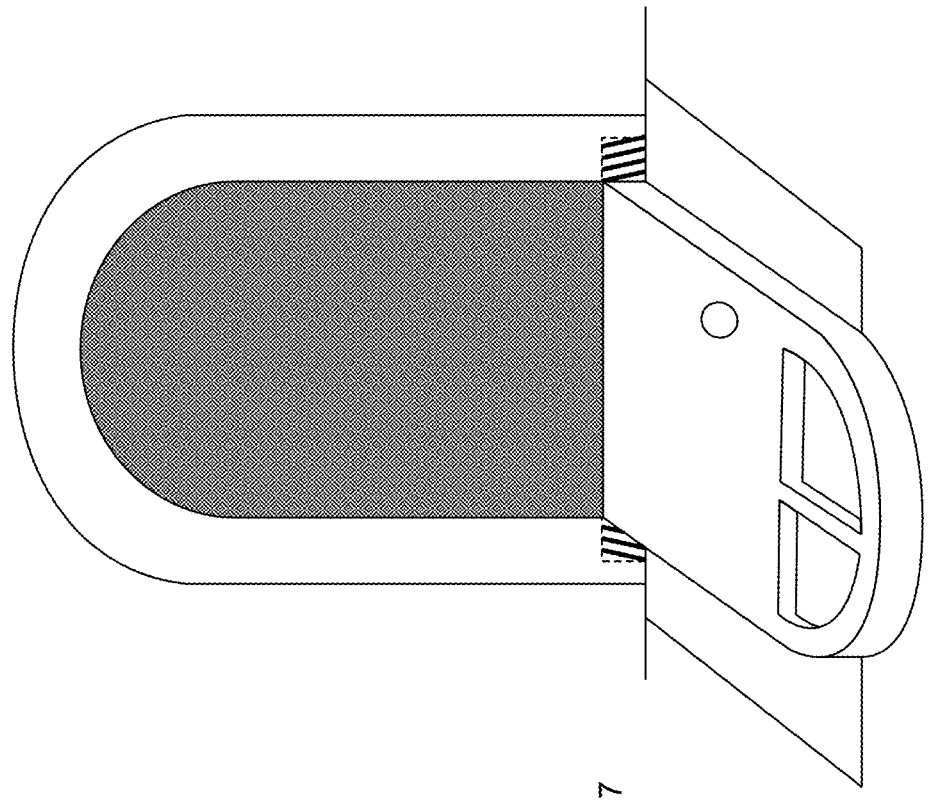
FIG. 32C illustrates a front perspective view of an exemplary pet door comprising a locking mechanism, according to some embodiments of the present disclosure.
Figure 32B:
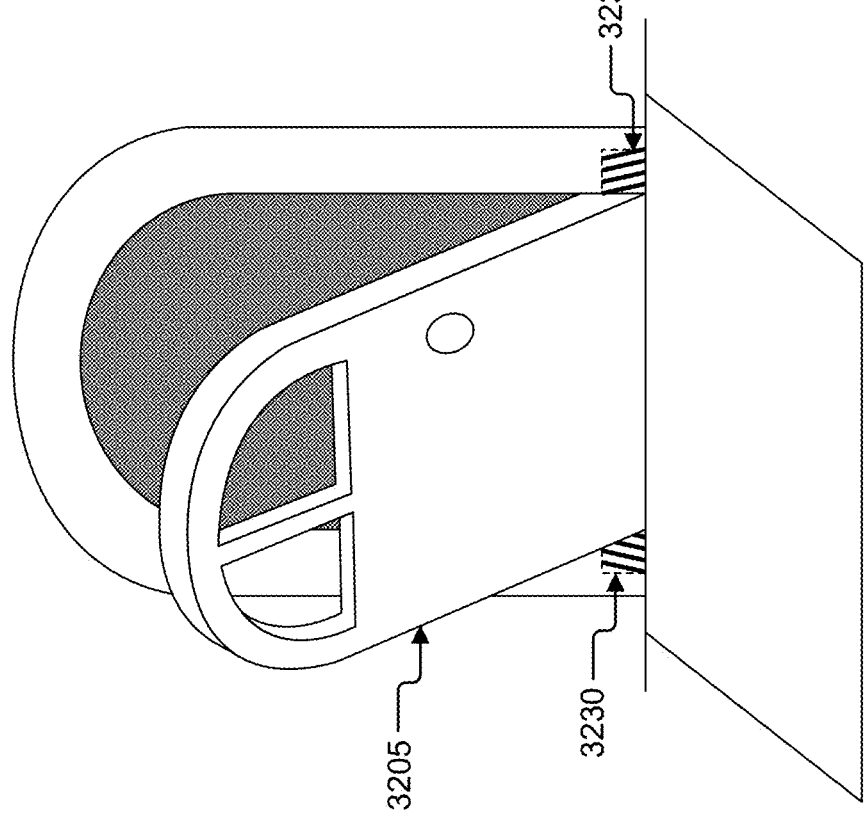
FIG. 32B illustrates a front perspective view of an exemplary pet door comprising a locking mechanism, according to some embodiments of the present disclosure.

Referring now to FIGS. 32A-C, an exemplary pet door 3200 comprising a locking mechanism is illustrated. In some embodiments, the pet door 3200 may comprise at least one door 3205. In some implementations, the pet door 3200 may comprise at least one frame 3220. In some aspects, the pet door 3200 may comprise at least one knob 3210. In some implementations, the pet door 3200 may be configured to rotate in at least one direction about at least one axis via at least one hinge 3230.

In some aspects, the hinge 3230 may comprise a rotational retention force, such as that may be provided by at least one torsional spring 3237, that may bias the door 3205 toward a closed position except when a sufficient amount of force is applied to the door 3205. In some embodiments, at least one locking mechanism in the form of a clasp, clamp, or similar mechanical device may be physically integrated with each hinge 3230, wherein the locking mechanism(s) may be altered between a locked state and an unlocked state such that rotation of the hinge(s) 3230 may be at least partially restricted when the locking mechanism(s) is in the locked state. In some implementations, the locking mechanism(s) may completely prevent rotation of the hinge(s) 3230 when in the locked state.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A securable pet door configured to be installed within at least one surface, the securable pet door comprising:
   a first frame, wherein at least a portion of the first frame is configured to embed within a first external surface;
   at least one connector, wherein the at least one connector is attached to the first frame to provide a securable connection to the first external surface;
   at least one connector point connectable to one or both the first frame or the first external surface;
   at least one door, wherein at least a portion of the at least one door is connectable to the at least one connector point, and wherein a position of the at least one door is based on a relative position to the at least one connector point;
   a first connector frame extending from the first frame, wherein the first connector frame is configured to be fully embedded within the first external surface;
   a second frame, wherein at least a portion of the second frame is configured to embed within a second external surface, wherein embedding the first frame within the first external surface and embedding the second frame within the second external surface creates a portal from the first external surface to the second external surface; and
   a second connector frame extending from the second frame, wherein the second connector frame is connectable on a distal end to the first connector frame, and wherein the second connector frame is configured to be fully embedded within the second external surface.

2. The securable pet door of claim 1, further comprising:
   at least one locking mechanism, wherein the at least one locking mechanism is alterable between a locked state and an unlocked state, wherein the at least one locking mechanism is configured to prevent the at least one door from opening when the at least one locking mechanism is in the locked state.

3. The securable pet door of claim 2, wherein the at least one locking mechanism comprises at least one manipulation element and at least one securing member.

4. The securable pet door of claim 3, wherein the at least one locking mechanism further comprises at least one housing.

5. The securable pet door of claim 4, wherein the at least one securing member comprises a substantially rigid elongated member and the at least one manipulation element comprises a protrusion extending from a portion of the securing member.

6. The securable pet door of claim 5, wherein the at least one securing member is slidable within the at least one housing and the at least one manipulation element extends through an opening within a surface of the at least one housing.

7. The securable pet door of claim 6, wherein the locked state of the at least one locking mechanism comprises a configuration wherein at least a portion of a distal end of the securing member physically contacts at least a portion of at least one of: the first frame, the second frame, the first connector frame, and the second connector frame.

8. The securable pet door of claim 6, wherein the at least one locking mechanism further comprises at least one base, wherein the at least one base is affixed to an external surface of at least one of: the first frame and the second frame or is integrated within an interior portion of the at least one of: the first frame and the second frame, wherein the locked state of the at least one locking mechanism comprises a configuration wherein at least a portion of a distal end of the securing member physically contacts at least a portion of the at least one base.

9. The securable pet door of claim 4, wherein the at least one locking mechanism further comprises at least one base affixed to at least one of: the first frame, the second frame, the first connector frame, the second connector frame, and a second at least one door, wherein the at least one securing member comprises a flexible elongated member extending from the at least one base, wherein the at least one housing is affixed to a surface of the at least one door.

10. The securable pet door of claim 9, wherein the at least one manipulation element is configured at a distal end of the at least one securing member, wherein the at least one manipulation element is removably receivable within an opening within a surface of the at least one housing.

11. The securable pet door of claim 10, wherein a distal end of the at least one manipulation element comprises a larger cross section than a cross section of a body of the at least one manipulation element and the distal end of the opening within the surface of the at least one housing comprises a larger cross section than a cross section of at least one portion of a groove adjacent and connected to the opening such that the at least one manipulation element is slidable within the groove while only being removably receivable by the opening.

12. The securable pet door of claim 4, wherein at least one housing is affixed to at least one of: the first frame, the second frame, and a second at least one door, wherein a first end of the at least one manipulation element is connected to the at least one housing by at least one hinge, wherein the at least one manipulation element is configured to rotate in at least one direction about at least one axis via the at least one hinge.

13. The securable pet door of claim 12, wherein the at least one locking mechanism further comprises at least one base affixed to the at least one door, wherein the at least one securing member comprises a protrusion extending from the at least one base.

14. The securable pet door of claim 13, wherein a distal end of the at least one securing member comprises a cross section that is larger than a cross section of a body of the at least one securing member and the at least one manipulation element comprises an opening, wherein the opening comprises a distal end that comprises a cross section that is larger than a cross section of at least a portion of the opening such that the at least one securing member is removably receivable by the distal end of the opening and the body of the at least one securing member is slidable within the opening.

15. The securable pet door of claim 2, wherein the at least one locking mechanism comprises one or more electrical components configured to be actuated by at least one external device.

16. The securable pet door of claim 2, wherein the at least one door comprises at least one knob and the at least one locking mechanism comprises at least one latch, wherein rotating the at least one knob in at least one direction causes the at least one latch to achieve linear translational movement.

17. The securable pet door of claim 16, wherein the locked state of the at least one locking mechanism comprises a configuration wherein at least a portion of a distal end of the at least one latch physically contacts at least one latch receiver and rotation of the at least one knob is substantially prevented.

18. The securable pet door of claim 16, wherein the at least one latch receiver is configured within at least one of:

the first frame, the second frame, the first connector frame, the second connector frame, and a second at least one door.

19. The securable pet door of claim 16, wherein the at least one locking mechanism further comprises at least one positioning mechanism configured to facilitate alignment of the at least one locking mechanism.

20. The securable pet door of claim 1, wherein the connector point comprises at least one hinge, wherein the at least one hinge is configured to pivot about at least one axis in at least one direction.

* * * * *